US012103846B2

(12) United States Patent
Thompson et al.

(10) Patent No.: US 12,103,846 B2
(45) Date of Patent: Oct. 1, 2024

(54) NANOSTRUCTURED ARTICLE

(71) Applicant: 3M INNOVATIVE PROPERTIES COMPANY, St. Paul, MN (US)

(72) Inventors: David S. Thompson, Bayport, MN (US); Chad M. Amb, Roberts, WI (US); Moses M. David, Wells, TX (US); Richard J. Pokorny, Maplewood, MN (US); Thomas P. Klun, Lakeland, MN (US); Jonah Shaver, St. Paul, MN (US); Joan M. Noyola, Maplewood, MN (US); Hannah E. Walsh, Woodbury, MN (US); Jon P. Nietfeld, Woodbury, MN (US); John A. Wheatley, Stillwater, MN (US); Joseph D. Rule, Woodbury, MN (US); Ryan M. Braun, St. Paul, MN (US); Michael A. Johnson, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 386 days.

(21) Appl. No.: 17/603,071

(22) PCT Filed: May 4, 2020

(86) PCT No.: PCT/IB2020/054226
§ 371 (c)(1),
(2) Date: Oct. 12, 2021

(87) PCT Pub. No.: WO2020/225717
PCT Pub. Date: Nov. 12, 2020

(65) Prior Publication Data
US 2022/0177303 A1 Jun. 9, 2022

Related U.S. Application Data

(60) Provisional application No. 62/845,081, filed on May 8, 2019.

(51) Int. Cl.
*B82B 1/00* (2006.01)
*B08B 17/06* (2006.01)
(Continued)

(52) U.S. Cl.
CPC ............ *B82B 1/005* (2013.01); *B08B 17/065* (2013.01); *B32B 3/30* (2013.01); *B32B 27/40* (2013.01);
(Continued)

(58) Field of Classification Search
CPC ....... B32B 3/30; B32B 27/40; B32B 2255/10; B32B 2307/712; B32B 2307/73;
(Continued)

(56) References Cited

U.S. PATENT DOCUMENTS 3,250,808 A 5/1966 Moore, Jr.
5,417,515 A 5/1995 Hachey
(Continued)

FOREIGN PATENT DOCUMENTS

AU 2015227483 10/2015
JP 2008184556 8/2008
(Continued)

OTHER PUBLICATIONS

"The Coating Of Lens", Gino Optical, [retrieved from the internet on Apr. 19, 2019], URL,<http://www.ginoptic.com/technology/the-coating-of-lens.html>, 2019, pp. 1-3.
(Continued)

*Primary Examiner* — Jasper Saberi
(74) *Attorney, Agent, or Firm* — Clifton F. Richardson

(57) ABSTRACT

A nanostructured article includes a substrate; a plurality of first nanostructures disposed on, and extending away from, the substrate; and a covalently crosslinked fluorinated polymeric layer disposed on the plurality of first nanostructures. The plurality of first nanostructures includes polyurethane.
(Continued)

The polymeric layer at least partially fills spaces between the first nanostructures to an average minimum height above the substrate of at least 30 nm such that the polymeric layer has a nanostructured surface defined by, and facing away from, the plurality of first nanostructures.

15 Claims, 19 Drawing Sheets

(51) Int. Cl.
B32B 3/30 (2006.01)
B32B 27/40 (2006.01)
B82Y 30/00 (2011.01)
B82Y 40/00 (2011.01)
G02B 1/18 (2015.01)
G02B 27/00 (2006.01)

(52) U.S. Cl.
CPC .............. *B82Y 30/00* (2013.01); *B82Y 40/00* (2013.01); *G02B 1/18* (2015.01); *G02B 27/0006* (2013.01); *B32B 2255/10* (2013.01); *B32B 2307/21* (2013.01); *B32B 2307/412* (2013.01); *B32B 2307/712* (2013.01); *B32B 2307/73* (2013.01); *B32B 2307/754* (2013.01); *B32B 2375/00* (2013.01)

(58) Field of Classification Search
CPC .......... B32B 2307/754; B32B 2375/00; B82Y 30/00; B82Y 40/00; G02B 1/18; G02B 27/0006; B08B 17/065; B82B 1/005
See application file for complete search history.

(56) References Cited

U.S. PATENT DOCUMENTS

| | | | |
|---|---|---|---|
| 5,620,775 A | 4/1997 | LaPerre | |
| 5,798,409 A | 8/1998 | Ho | |
| 5,888,594 A | 3/1999 | David | |
| 6,277,485 B1* | 8/2001 | Invie | C09D 183/12 427/166 |
| 6,376,082 B1 | 4/2002 | Edmond | |
| 6,677,028 B1 | 1/2004 | Lasch | |
| 7,396,866 B2 | 7/2008 | Jariwala | |
| 7,718,264 B2 | 5/2010 | Klun | |
| 7,732,497 B2 | 6/2010 | Cumberland | |
| 8,147,966 B2 | 4/2012 | Klun | |
| 8,158,264 B2 | 4/2012 | David | |
| 8,420,217 B2 | 4/2013 | Johnson | |
| 8,476,398 B2 | 7/2013 | Klun | |
| 8,507,632 B2 | 8/2013 | Hara | |
| 8,551,279 B2 | 10/2013 | Johnson | |
| 8,634,146 B2 | 1/2014 | David | |
| 8,728,623 B2 | 5/2014 | Pokorny | |
| 8,729,211 B2 | 5/2014 | Klun | |
| 8,741,158 B2 | 6/2014 | Aytug | |
| 8,753,736 B2 | 6/2014 | Johnson | |
| 8,765,263 B2 | 7/2014 | Ho | |
| 8,932,424 B2 | 1/2015 | Johnson | |
| 8,974,590 B2 | 3/2015 | Russell | |
| 8,981,151 B2 | 3/2015 | Klun | |
| 8,992,718 B2 | 3/2015 | Johnson | |
| 9,085,019 B2 | 7/2015 | Zhang | |
| 9,175,188 B2 | 11/2015 | Buckanin | |
| 9,206,335 B2 | 12/2015 | Hager | |
| 9,296,918 B2 | 3/2016 | Olson | |
| 9,340,683 B2 | 5/2016 | Jing | |
| 9,556,338 B2 | 1/2017 | Jing | |
| 9,650,499 B2 | 5/2017 | Walker, Jr. | |
| 9,656,442 B2 | 5/2017 | Johnson | |
| 9,780,318 B2 | 10/2017 | Johnson | |
| 10,005,264 B2 | 6/2018 | Leatherdale | |
| 10,090,480 B2 | 10/2018 | Johnson | |
| 10,119,190 B2 | 11/2018 | David | |
| 10,134,566 B2 | 11/2018 | David | |
| 2004/0077775 A1 | 4/2004 | Audenaert | |
| 2004/0174601 A1 | 9/2004 | Smith | |
| 2008/0212181 A1 | 9/2008 | Wu | |
| 2009/0029129 A1* | 1/2009 | Pellerite | C08J 7/044 526/288 |
| 2010/0033819 A1* | 2/2010 | Schulz | G02B 1/118 359/507 |
| 2010/0035039 A1 | 2/2010 | Jing | |
| 2010/0165276 A1* | 7/2010 | David | B32B 37/02 977/773 |
| 2011/0248223 A1 | 10/2011 | Zheng | |
| 2012/0012557 A1 | 1/2012 | David | |
| 2012/0204566 A1 | 8/2012 | Hartzell | |
| 2012/0225301 A1 | 9/2012 | Hunt | |
| 2012/0288675 A1 | 11/2012 | Klun | |
| 2013/0038949 A1 | 2/2013 | David | |
| 2013/0216784 A1 | 8/2013 | Zhang | |
| 2013/0229378 A1 | 9/2013 | Iyer | |
| 2013/0251961 A1 | 9/2013 | Johnson | |
| 2013/0261209 A1 | 10/2013 | Kim | |
| 2013/0295327 A1 | 11/2013 | Zhang | |
| 2014/0092360 A1 | 4/2014 | Zheng | |
| 2014/0193612 A1 | 7/2014 | Yu | |
| 2014/0208978 A1 | 7/2014 | Sunder | |
| 2014/0272295 A1* | 9/2014 | Deshpande | G02B 27/0006 428/141 |
| 2015/0209198 A1 | 7/2015 | Aizenberg | |
| 2015/0322223 A1 | 11/2015 | Woo | |
| 2016/0141149 A1 | 5/2016 | David | |
| 2016/0145458 A1 | 5/2016 | Walker, Jr. | |
| 2016/0289454 A1 | 10/2016 | Jing | |
| 2016/0347042 A1 | 12/2016 | Walker, Jr. | |
| 2016/0370506 A1 | 12/2016 | David | |
| 2016/0370605 A1 | 12/2016 | Ain-Kedem | |
| 2017/0003502 A1 | 1/2017 | Couderc | |
| 2017/0016590 A1 | 1/2017 | Watkins | |
| 2017/0045284 A1 | 2/2017 | Meuler | |
| 2017/0058131 A1 | 3/2017 | Sigmund | |
| 2017/0067150 A1 | 3/2017 | David | |
| 2017/0107398 A1 | 4/2017 | Ho | |
| 2017/0122524 A1 | 5/2017 | Wu | |
| 2017/0170416 A1* | 6/2017 | Johnson | B32B 27/281 |
| 2017/0174854 A1 | 6/2017 | Clark | |
| 2017/0348614 A1 | 12/2017 | Zeiger | |
| 2018/0229420 A1* | 8/2018 | Couderc | G02B 27/0006 |
| 2018/0264790 A1 | 9/2018 | Leatherdale | |
| 2018/0297321 A1 | 10/2018 | Jin | |
| 2020/0025893 A1* | 1/2020 | Jang | H01S 5/0071 |
| 2021/0070008 A1 | 3/2021 | Nietfeld | |

FOREIGN PATENT DOCUMENTS

| | | |
|---|---|---|
| KR | 20140067503 | 6/2014 |
| WO | WO 2009-120548 | 10/2009 |
| WO | WO 2011-025963 | 3/2011 |
| WO | WO 2011-056396 | 5/2011 |
| WO | WO 2012-058086 | 5/2012 |
| WO | WO 2014-092422 | 6/2014 |
| WO | WO 2017-105850 | 6/2017 |
| WO | WO 2017-105908 | 6/2017 |
| WO | WO 2017-165950 | 10/2017 |
| WO | WO 2017-172888 | 10/2017 |
| WO | WO 2017-214105 | 12/2017 |
| WO | WO 2018-057774 | 3/2018 |
| WO | WO 2018-059725 | 4/2018 |
| WO | WO 2018-080830 | 5/2018 |
| WO | WO 2018-101999 | 6/2018 |
| WO | WO 2018-102607 | 6/2018 |
| WO | WO 2018-112181 | 6/2018 |
| WO | WO 2018-234841 | 12/2018 |
| WO | WO 2019-012677 | 1/2019 |
| WO | WO 2019-016754 | 1/2019 |
| WO | WO 2019-111207 | 6/2019 |

(56) References Cited

FOREIGN PATENT DOCUMENTS

| WO | WO 2019-136433 | 7/2019 |
| WO | WO 2020-044164 | 3/2020 |

OTHER PUBLICATIONS

Deng, "Fabrication And Applications Of Superhydrophobic And Superamphiphobic Surface", 2013, pp. 1-118.
Korhonen, "Reliable Measurement Of The Receding Contact Angle", Langmuir, 2013, vol. 29, pp. 3858-3863.
Kota, "The Design And Applications Of Superomniphobic Surfaces", NPG Asia Materials, 2014, vol. 06, pp. 1-16.
Miller, "A New Derivation Of Post Gel Properties Of Network Polymers", Macromolecules, 1976, vol. 09, No. 02, pp. 206-211.
Zhang, "Smart Wetting Control on Shape Memory Polymer Surfaces", Chemistry A European Journal, 2019, vol. 25, pp. 3979-3992.
International Search Report for PCT International Application No. PCT/IB2020/054226, mailed on Jul. 10, 2020, 4 pages.
Essential Guide to Conformal Coating | Techspray, https://www.techspray.com/the-essential-guide-to-conformal-coating, downloaded Apr. 24, 2024.

\* cited by examiner

NANOSTRUCTURED ARTICLE

CROSS REFERENCE TO RELATED APPLICATIONS

This application is a national stage filing under 35 U.S.C. 371 of PCT/IB2020/054226, filed May 4, 2020, which claims the benefit of Provisional Application No. 62/845,081, filed May 8, 2019, the disclosure of which is incorporated by reference in its/their entirety herein.

BACKGROUND

Articles having nanostructured surfaces are known. In some cases, a nanostructured surface may be hydrophobic.

SUMMARY

In some aspects of the present description, a nanostructured article including a substrate; a plurality of first nanostructures disposed on, and extending away from, the substrate; and a covalently crosslinked fluorinated polymeric layer disposed on the plurality of first nanostructures is provided. The plurality of first nanostructures includes polyurethane. The polymeric layer at least partially fills spaces between the first nanostructures to an average minimum height above the substrate of at least 30 nm such that the polymeric layer has a nanostructured surface defined by, and facing away from, the plurality of first nanostructures.

In some aspects of the present description, a nanostructured article including a substrate and a plurality of first nanostructures disposed on the substrate is provided. The plurality of first nanostructures includes covalently crosslinked polyurethane having a crosslink concentration in a range from 0.3 to 1.05 mol/kg. The plurality of first nanostructures extends away from the substrate along a length of the first nanostructures. The plurality of first nanostructures has an average length L1 and an average width W1. W1 is preferably in a range of 5 nm to 500 nm. L1/W1 is preferably at least 1.

In some aspects of the present description, a nanostructured article including a polyurethane layer and a plurality of first nanostructures integrally formed with the polyurethane layer is provided. The polyurethane layer includes covalently crosslinked polyurethane having a crosslink concentration in a range from 0.3 to 1.05 mol/kg. The plurality of first nanostructures extend away from the polyurethane layer along a length of the first nanostructures. The plurality of first nanostructures have an average length L1 and an average width W1. W1 is preferably in a range of 5 nm to 500 nm. L1/W1 is preferably at least 1.

In some aspects of the present description, a nanostructured article including a plurality of coated polymeric nanostructures defining a nanostructured surface having an advancing water contact angle of at least 150 degrees and an advancing hexadecane contact angle of at least 90 degrees is provided. The nanostructured article preferably has an average optical transmittance of at least 90% and an optical haze of less than 5%.

DETAILED DESCRIPTION

Figure 1:
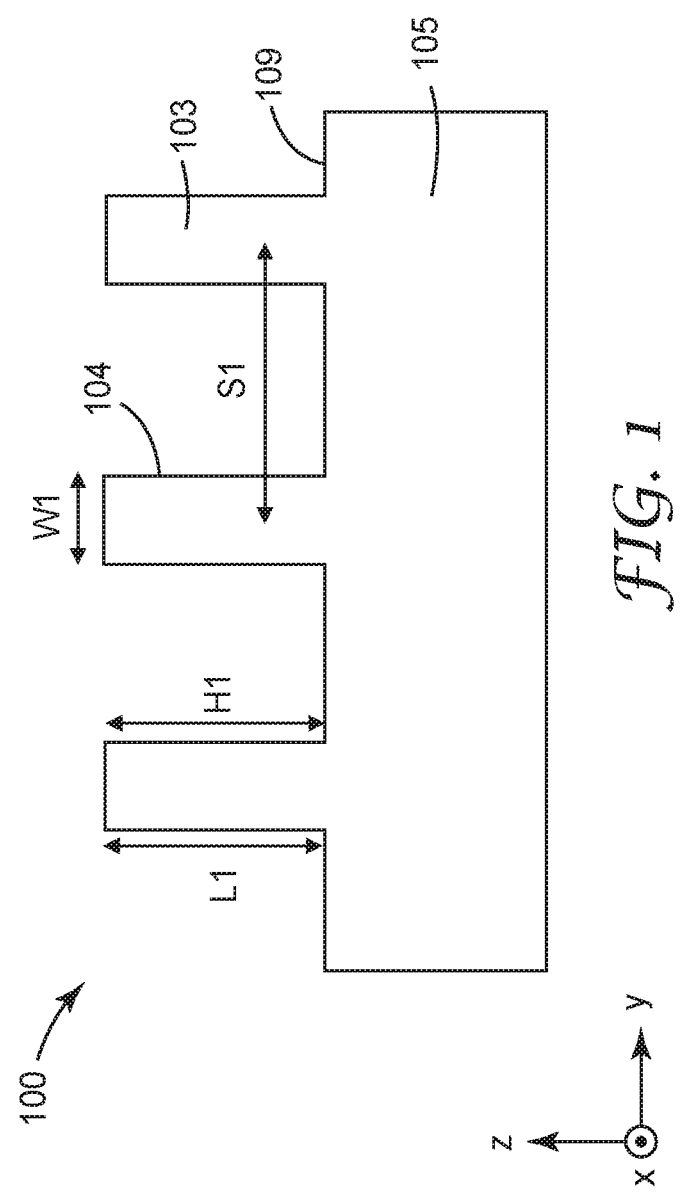
FIGS. 1-6 are schematic cross-sectional views of nanostructured articles.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Nanostructured articles described herein have been found to provide a hydrophobic or superhydrophobic, or omniphobic or superomniphobic, surface that has improved mechanical performance (e.g., abrasion resistance and/or durability) and/or optical performance (e.g., low haze and/or high optical transmittance) compared to traditional nanostructured surfaces. In some embodiments, the nanostructured articles are protective cover films that protect a surface of interest from water or ice build-up, for example, that could otherwise affect performance of a device proximate to the surface of interest. In some embodiments, the nanostructured article is a flexible film that includes an adhesive layer for attaching the film to the surface. In some embodiments, the nanostructured article may be integrally formed with an exterior layer of a structural member (e.g., an injection molded part).

In some embodiments, a nanostructured article includes a polymeric layer which exhibits the ability to be deformed by an external implement (for example by a Delrin stylus or pencil) and recover its original shape with either time or the application of heat. It has been found that polyurethane layers, such as covalently crosslinked (crosslinked via covalent bonds) polyurethane layers, are useful for this polymeric layer. Such layers have been found to provide useful hydrophobicity even without the addition of a fluorinated coating when the layer is nanostructured. Further, according to some embodiments, such nanostructured layers have been found to have a high optical transmittance (e.g., an average optical transmittance of at least 80%, or at least 85%, or at least 90%, or at least 92%), a low haze (e.g., a haze of less than 5%, or less than 3%, or less than 2%, or less than 1%), and a high durability. In addition, it has been found that overcoating the nanostructures with a covalently crosslinked fluorinated polymeric layer substantially improves the durability and omniphobicity of the nanostructured surface. For example, it has been found that the nanostructures of a covalently crosslinked shape memory polyurethane layer may not recover their shape when pushed down into contact with one another (e.g., due to an impact) since the nanostructures can stick together and this can prevent their recovery. However, it has been found that when coated with a covalently crosslinked fluorinated polymeric layer that the nanostructures are prevented from sticking together and can recover their initial shape even after an impact presses the nanostructures together.

Nanostructured articles described herein may be made by imparting a suitable nanostructure to a substrate (e.g., a polyurethane layer or a multilayer film including a polyurethane layer). This structure can be imparted via any suitable method. One suitable method for imparting this structure includes casting urethane material onto a nanostructured liner such that the urethane material conforms to the nanostructured surface of the liner and cures into a solid polyurethane film having a complementary structure. Such structured liners can be made via known tooling methods using processes such as diamond turning, photolithographic processes, deposition of an etch resist material and followed by plasma etching, or direct write reactive ion etching processes, for example. Other suitable methods of imparting a random nanostructure onto the surface of a layer are based on plasma processing techniques as described in U.S. Pat. No. 5,888,594 (David et al.), U.S. Pat. No. 10,119,190 (David et al.) and U.S. Pat. No. 10,134,566 (David et al.), for example, and in U.S. Pat. Appl. Pub. Nos. 2012/0012557 (David et al.), 2016/0370605 (David et al.), 2013/0038949 (David et al.), and 2017/0067150 (David et al.), for example. In some embodiments, the nanostructure can be imparted by the combination of creating randomly placed silica islands on the surface of the layer which act as etch resists in a subsequent plasma etching process to create posts on a surface of the layer.

As used herein, the term "nanostructure" or "nanostructured" refers to an article or surface having at least one nanoscale feature or structure having dimensions on the order of about 5 nm to about 500 nm. The nanostructured surface can have a nanostructured anisotropic surface. The nanostructured anisotropic surface can include nanoscale features having a height to width ratio of at least 1, or at least 2, or at least 3, or at least 5, or at least 10, or at least 20. For example, the height to width ratio may be in a range of 1 to 100, or 1 to 50, or 3 to 20. The nanostructured anisotropic surface can include nanofeatures such as, for example, nano-pillars or nano-columns. In some embodiments, the nanostructures have steep side walls that may be perpendicular to the substrate or may extend at a predetermined oblique angle to the substrate. In some embodiments, at least a majority of the nanostructures are capped with mask material (e.g., an inorganic silica nanoparticle or an inorganic silica island).

In some embodiments, a nanostructured article includes a nanostructured polyurethane layer having a nanostructured surface. In some embodiments, the nanostructured surface is hydrophobic. Surfaces may be hydrophobic due to the chemical nature of the film. Alternatively, or additionally, surfaces can be made hydrophobic using treatments on the surface, coatings on the surface or, potentially, by incorporating (e.g., melt) additives. For example, the films can be processed as described in U.S. Pat. No. 8,974,590 (Russell et al.); U.S. Pat. No. 8,741,158 (Aytug et al.); U.S. Pat. No. 7,396,866 (Jariwala et al.); and U.S. Pat. No. 9,085,019 (Zhang et al.).

The nanostructured surface may be one or more of hydrophobic (e.g., advancing water contact angle of at least 100 degrees and a water contact angle hysteresis of less than 40 degrees), superhydrophobic (e.g., advancing water contact angle of at least 150 degrees and a water contact angle hysteresis of less than 20 degrees), omniphobic (e.g., hydrophobic and having an advancing hexadecane contact angle of at least 70 degrees), or superomniphobic (e.g., superhydrophobic and having an advancing hexadecane contact angle of at least 90 degrees). The degree of hydrophobicity or omniphobicity can be increased by increasing the fluorine content, for example, in the nanostructured surface. In some embodiments, a suitable degree of hydrophobicity or omniphobicity is obtained by nanostructuring a polyurethane as described herein. In some embodiments, additional treatments and/or coatings may be applied to the nanostructured surface to make the surface additionally hydrophobic and/or additionally omniphobic. In some embodiments, the nanostructured surface is coated with a conformal glass like layer or a diamond like glass (DLG) layer as described further elsewhere herein. In some such embodiments, a low surface energy layer (e.g., a covalently crosslinked fluorinated polymeric layer) is coated over the DLG layer. In other embodiments, the low surface energy layer may be coated over the nanostructures without using a DLG layer or with using a different layer that can function as a tie layer for improving the bonding of the low surface energy layer to the nanostructured substrate.

Advancing, receding, and static contact angles can be measured with a goniometer. Contact angle measurements are described in U.S. Pat. No. 9,085,019 (Zhang et al.), for example. The contact angle hysteresis is the difference between the advancing and receding contact angles. In some embodiments, the nanostructured surface has an advancing water contact angle of at least 100 degrees, or at least 120 degrees. In some preferred embodiments, the advancing water contact angle is at least 130 degrees, or at least 140 degrees, or at least 150 degrees, or at least 155 degrees, or even at least 160 degrees. In some embodiments, the static water contact angle is also in one of these ranges. For example, in some embodiments, the nanostructured surface has a static water contact angle of at least 100 degrees, or at least 120 degrees, or at least 130 degrees, or at least 140 degrees, or at least 150 degrees, or at least 155 degrees, or at least 160 degrees. In some embodiments, the water contact angle hysteresis is less than 40 degrees, or less than 30 degrees, or less than 20 degrees, or less than 15 degrees, or less than 10 degrees, or less than 5 degrees. In some embodiments, the nanostructured surface has an advancing hexadecane contact angle of at least 70 degrees, or at least 80 degrees or at least 90 degrees, or at least 100 degrees. In some embodiments, the nanostructured surface has a water roll-off angle of no more than 30 degrees, no more than 20 degrees, or no more than 15 degrees, or no more than 10 degrees, or no more than 8 degrees.

Traditional nanostructured polymeric films that are capable of providing a high degree of omniphobicity have sacrificed optical properties such as transparency and/or haze. According to some embodiments of the present description, a nanostructured article can include a plurality of polymeric nanostructures defining a nanostructured surface having an advancing water contact angle of at least 150 degrees and an advancing hexadecane contact angle of at least 90 degrees, and at the same time the nanostructured article can have an average optical transmittance of at least 90% and an optical haze of less than 5%. In some such embodiments, the optical haze is less than 3%, or less than 2%, or less than 1%. In some such embodiments or in other embodiments, the nanostructured article has an optical clarity of at least 90%, or at least 95%, or at least 98%, or at least 99%. The average optical transmittance can be determined by averaging (unweighted mean) the transmittance in the visible range (wavelengths in the range from 400 nm to 700 nm) for normally incident light. The average optical transmittance can alternatively be determined as the luminous transmittance as described in the ASTM D1003-13 test standard. The optical haze can be determined as described in the ASTM D1003-13 test standard. The optical clarity can be determined according to the ASTM D1746-15 test standard. The average optical transmittance, optical haze and optical clarity may be determined with the nanostructured surface facing toward or away from the light source. In some embodiments, the optical clarity is determined with the nanostructured surface facing away from the light source, and the average optical transmittance and optical haze are determined with the nanostructured surface facing the light source. Luminous transmission, clarity, and haze can be measured using a BYK-Gardner Haze-Gard Plus model 4725 or a BYK-Gardner Haze-Gard i (available from BYK-Gardner Columbia, MD), for example. In some embodiments, the nanostructured article has a transmittance for normally incident light at one or more predetermined wavelengths of at least 90% where the one or more predetermined wavelengths includes at least one non-visible wavelength (e.g., an infrared wavelength). For example, the nanostructured article may be used to protect a sensor system (e.g., LIDAR) that operates at a wavelength of about 830 nm or about 905 nm, for example, and the nanostructured article may have a transmittance of at least 90% for this operating wavelength.

FIG. 1 is a schematic cross-sectional view of a nanostructured article 100 including a substrate 105 and a plurality of first nanostructures 103 disposed on, and extending away from, the substrate 105. In the illustrated embodiment, the substrate 105 extends generally in the x-y plane and the first nanostructures extend generally along the z-direction (out of plane direction). The plurality of first nanostructures 103 extend to an average height H1 from the substrate 105 and have an average width W1 and an average spacing S1 (e.g., mean of center-to-center distance or edge-to-edge distance). Averages refers to unweighted means unless indicated differently. The plurality of first nanostructures 103 extend away from the substrate along a length of the first nanostructures 103 and have an average length L1. In the illustrated embodiment, L1 and H1 are substantially equal.

The substrate 105 has a major surface 109 (planar top surface portion of the substrate 105) and the first nanostructures 103 extend from the major surface 109 along a direction substantially normal to the major surface 109. The nanostructured article 100 has a nanostructured surface 104 which includes the major surface 109 and the outer surface of the first nanostructures 103.

Figure 2:
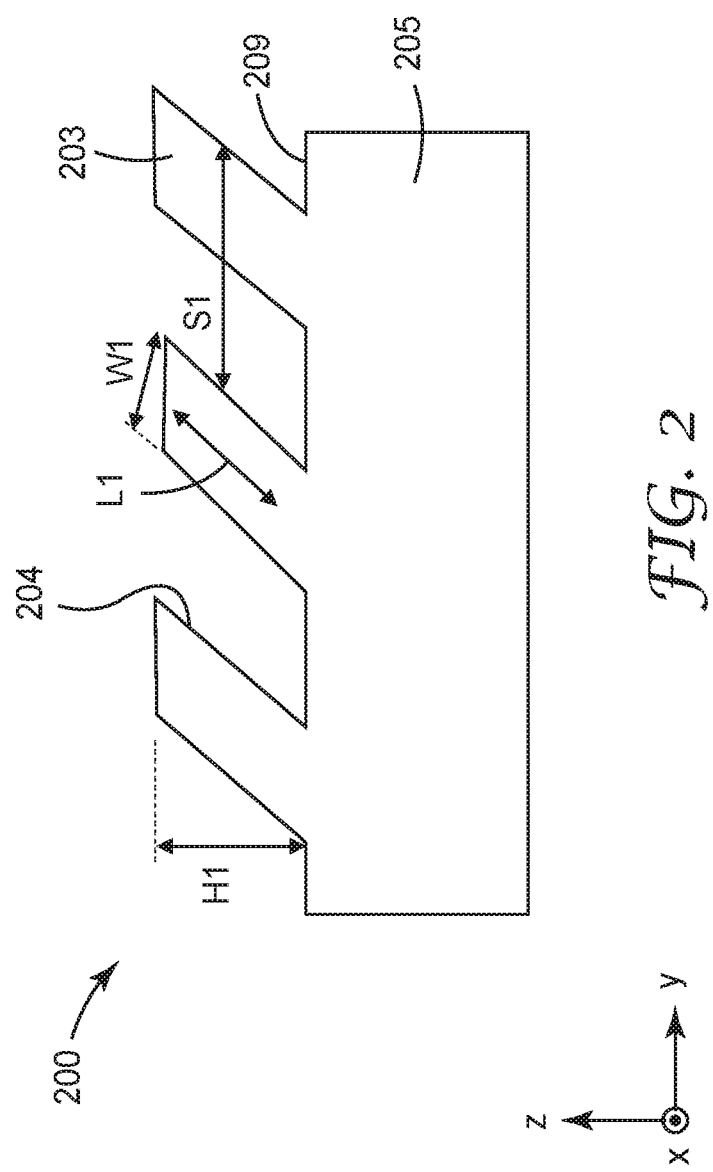

FIG. 2 is a schematic cross-sectional view of a nanostructured article 200 including a substrate 205 and a plurality of first nanostructures 203 disposed on, and extending away from, the substrate 205. In the illustrated embodiment, the substrate 205 extends generally in the x-y plane and the first nanostructures extend in a direction tilted from the z-direction. The plurality of first nanostructures 203 extend to an average height H1 from the substrate 205 and have an average width W1 and an average spacing S1. The plurality of first nanostructures 203 extend away from the substrate along a length of the first nanostructures 203 and have an average length L1. In the illustrated embodiment, L1 is larger than H1 due to the tilt of the first nanostructures 203 from the z-axis.

The substrate 205 has a major surface 209 and the first nanostructures 203 extend from the major surface 209 along a direction making an oblique angle with the major surface 209. The nanostructured article 200 has a nanostructured surface 204 which includes the major surface 209 and the outer surface of the first nanostructures 203.

The nanostructured surface 104 or 204 may be one or more of hydrophobic, superhydrophobic, omniphobic, or superomniphobic.

The width of a nanostructure is the smallest lateral dimension of the nanostructure (smallest diameter in a cross-section orthogonal the length of the nanostructure where the diameter is a line from opposing edges of the cross-section that passes through a center of the cross-section). For example, the first nanostructures 103 or 203 may be circular cylinders where the width is the diameter, or the first nanostructures 103 or 203 may be elliptical cylinders where the width is the minor diameter of the ellipse. The nanostructures may have other shapes such as square, rectangular or irregular cross-sections. The nanostructures may have a constant cross-section or may have a taper (e.g., narrower at the top than at the bottom or vice versa). The width can be understood to be the width where the nanostructure is widest along the length of the nanostructure.

The first nanostructures may be arranged in a substantially random pattern, a substantially ordered pattern, or in a partially ordered pattern, for example. In some cases, the first nanostructures may be approximately hexagonally packed posts (e.g., when a high density of posts are present). In some embodiments, the average spacing S1 is greater than the average width W1. In some embodiments, the average spacing S1 is at least 1.5 times, or at least 2 times or at least 3 times, or at least 4 times the average width W1. In some embodiments, the spacing and/or sizes of the nanostructures varies (e.g., randomly) over the nanostructured surface.

In some embodiments, the plurality of first nanostructures extend away from the substrate along a length of the first nanostructures where the plurality of first nanostructures have an average length L1 and an average width W1 with W1 being in a range of 5 nm to 500 nm, and L1/W1 being at least 1. W1 may be in a range of 10 nm to 300 nm, or 20 nm to 250 nm, for example. L1/W1 may be at least 2, 3, 5, 10, or 20, for example. For example, L1/W1 may be in a range of 1 to 100, or 1 to 50, or 3 to 20. L1 may be equal to an average height H1 of the first nanostructures (e.g., when the first nanostructures extend perpendicular to the substrate) or L1 may be greater than H1 (e.g., when the first nanostructures extend in a direction making an oblique angle to the substrate or when the first nanostructures extend irregularly from the substrate (see, e.g., FIG. 10)). L1 and/or H1 may be in a range of 10 to 500 nm, or 100 to 450 nm, or 150 nm to 400 nm, for example.

The nanostructured article 100 or 200 can be made by etching (e.g., plasma etching or reactive ion etching) as described further elsewhere herein. The nanostructured article 200 can be made by anisotropically etching generally along a direction parallel to the first nanostructures 203 using reactive ion etching, for example. In some embodiments, the layer etched to form the nanostructures 103 or 203 include a polyurethane described elsewhere herein. In some embodiments, the mask used in the etching is retained in a top portion of the first nanostructures as described further elsewhere herein. For example, a thin, approximately horizontal inorganic discrete islands may be disposed at the top of the first nanostructures 103 or 203, or an inorganic nanoparticle may be disposed at the top of the first nanostructures 103 or 203, for example. The lengths of the first nanostructures 103 or 203 may be approximately constant or there may be a distribution of the lengths as described further elsewhere herein. In some embodiments, each nanostructure in at least a majority of the plurality of first nanostructures has a substantially same length (e.g., within 30%, or within 20% of a same length). In some embodiments, the plurality of first nanostructures has a distribution of nanostructure lengths such that at least one nanostructure in the plurality of first nanostructures has a length at least 1.5 times a length of at least one other nanostructure in the plurality of first nanostructures.

The substrates 105 or 205 may include a plurality of layers. For example, the substrate layer illustrated in FIG. 1 or 2 may be the top or outer layer of a multilayer film substrate as described further elsewhere herein.

Figure 3:
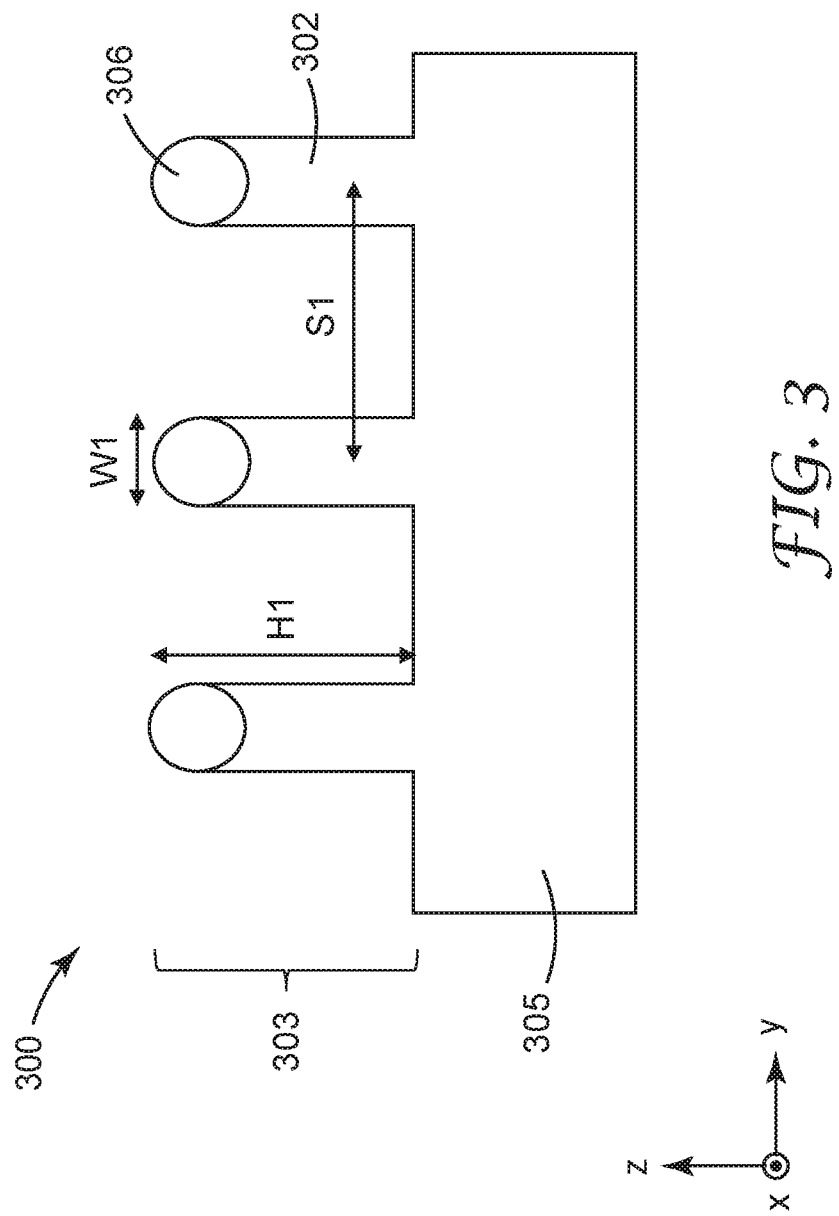

FIG. 3 is a schematic cross-sectional view of a nanostructured article 300 including a substrate 305 and a plurality of first nanostructures 303. The first nanostructures 303 include a lower portion 302 and an upper portion 306. The upper portion 306 may be or include an inorganic nanoparticle used to form the first nanostructures 303. For example, a monolayer of nanoparticles may be disposed on a substrate and used as an etching mask for forming the nanostructures 303 on the substrate. The use of a monolayer of nanoparticles as an etching mask is described in U.S. Pat. Appl. Pub. No. 2012/0012557 (David et al.) and in International Appl. Pub. No. 2018/080830 and corresponding U.S. patent application Ser. No. 16/340,472 filed Oct. 17, 2017. In some embodiments, the monolayer of nanoparticles is provided in a binder which may be retained between the upper portion 306 and the lower portion 302. In such embodiments, the heights and lengths of the first nanostructures 303 may be approximately constant. The nanoparticles may be substantially randomly arranged in the nanolayer resulting in an irregular arrangement of the first nanostructures 303. The first nanostructures 303 may be characterized by an average height H1 (and/or an average length L1), an average width W1, and/or an average spacing S1 as described further elsewhere herein.

Figure 4:
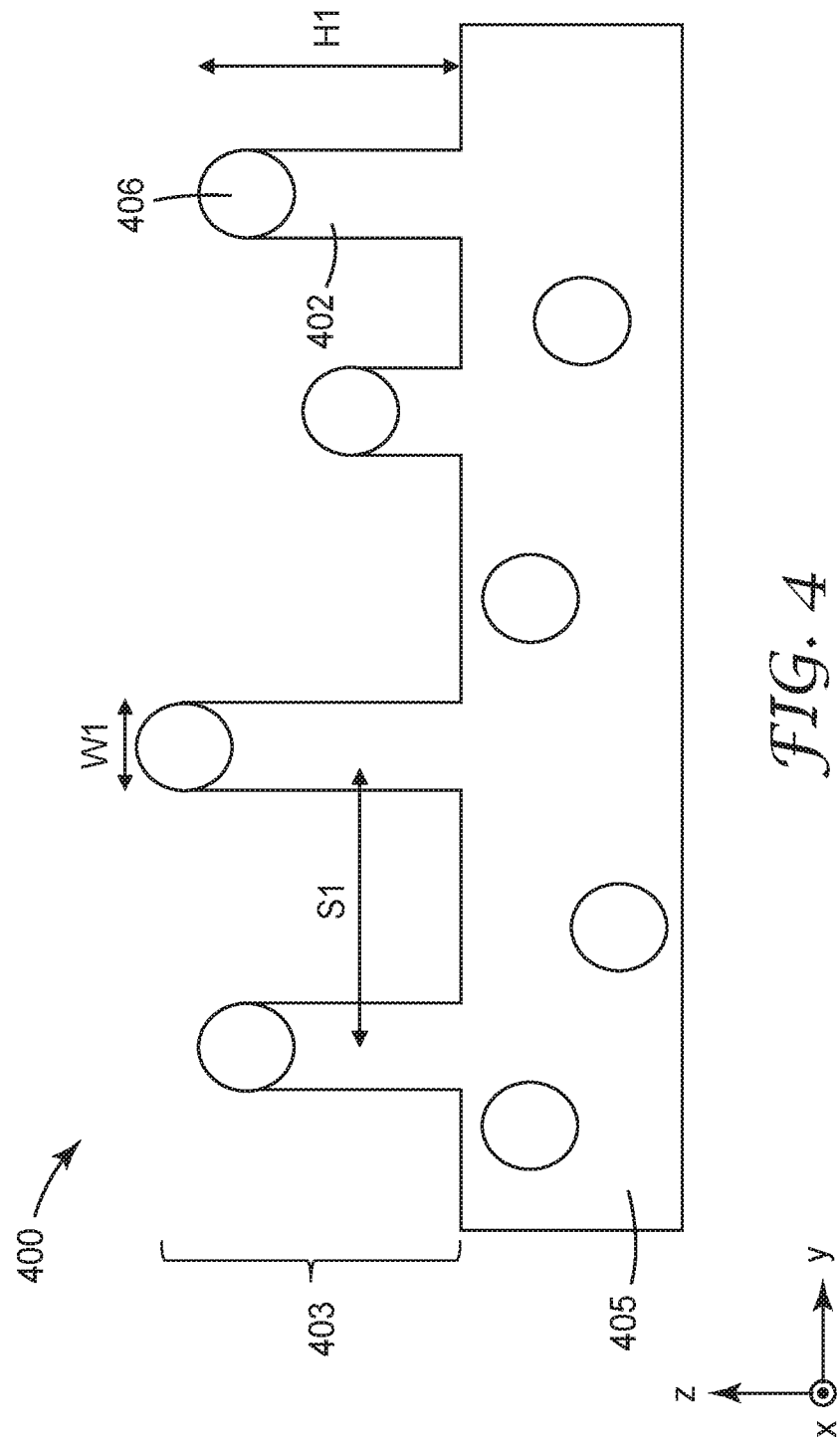

FIG. 4 is a schematic cross-sectional view of a nanostructured article 400 including a substrate 405 and a plurality of first nanostructures 403. The first nanostructures 403 include a lower portion 402 and an upper portion 406. The upper portion 406 may be or include a nanoparticle used to form the first nanostructures 403 and the substrate 405 may include a plurality of the nanoparticles dispersed therein. A polymeric layer is a layer that include a continuous phase of organic polymeric material. A polymeric layer may include nonpolymeric filler (e.g., inorganic nanoparticles) dispersed in the continuous phase. In some embodiments, a polymeric layer may include a plurality of inorganic nanoparticles dispersed in a polymeric material to form a layer that is etched to form the first nanostructures 403 on the substrate 405. The nanoparticles act as an etch mask in forming the first nanostructures 403 as generally described in U.S. Pat. Appl. Pub. No. 2016/0370605 (David et al.). Typically, when nanostructures are formed in this way, the nanostructures have a distribution of heights (e.g., having an average height H1 and a standard deviation about the average height greater than an average width W1 of the nanostructures 403) and a distribution of spacings (e.g., having an average center-to-center spacing S1) may be irregular.

Nanoparticles used to make the first nanostructures in the embodiments illustrated in FIGS. 3-4 may be inorganic (e.g., metal oxide) nanoparticles such as silica. A polymeric layer including nanoparticles may be used to form the first nanostructures in the embodiment illustrated in FIG. 4, for example. The nanoparticles may be included in the polymeric layer at 1 to 40 volume percent, or 5 to 40 volume percent, or 5 to 30 volume percent, or 5 to 20 volume percent, for example. The nanoparticles may be included in the layer at 5 to 65, weight percent, for example, where the desired range may depend upon the particle size (e.g., 5 to 20 weight percent for 5 to 30 nanometer particles, 5 to 50 weight percent for 30 to 100 nanometer particles, or 5 to 65 weight percent for 100 to 500 nanometer particles).

Figure 5:
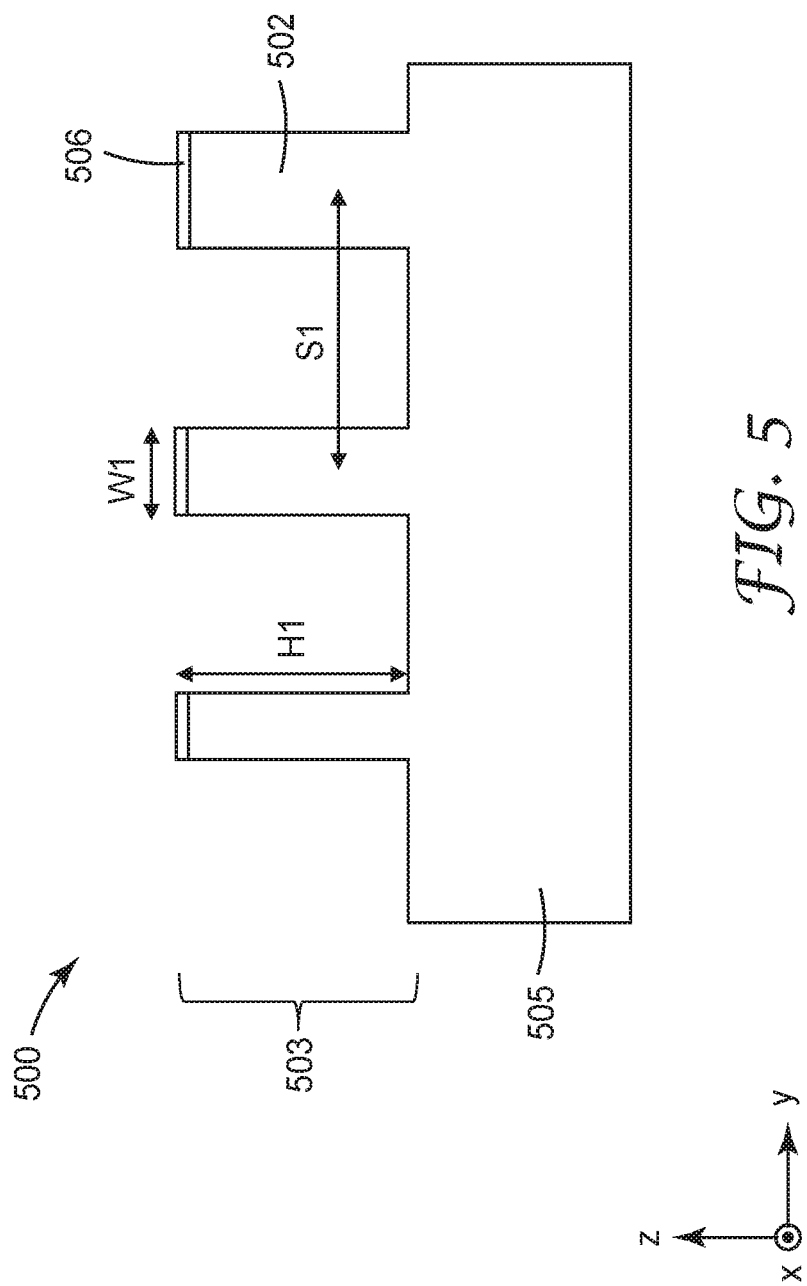

FIG. 5 is a schematic cross-sectional view of a nanostructured article 500 including a substrate 505 and a plurality of first nanostructures 503. The first nanostructures 503 include a lower portion 502 and an upper portion 506. For example, the first nanostructures 503 may be made by applying a thin, random, discontinuous masking layer to a major surface of a substrate by plasma chemical vapor deposition, for example, and etching via reactive ion etching, for example, as described in U.S. Pat. Appl. Pub. No. 2013/0038949 (David et al.) to form the first nanostructures 503 on the substrate 505. In this case, the upper portions 506 results from the discontinuous masking layer. The resulting heights (and/or lengths) of the first nanostructures 503 may be approximately constant and the resulting spacing between first nanostructures may be irregular. The first nanostructures 503 have an average height H1, and average center-to-center spacing S1 and an average width W1. The widths of the first nanostructures may be randomly distributed about the average width W1 and the spacings between nanostructures may be randomly distributed about the average spacing S1.

Figure 6:
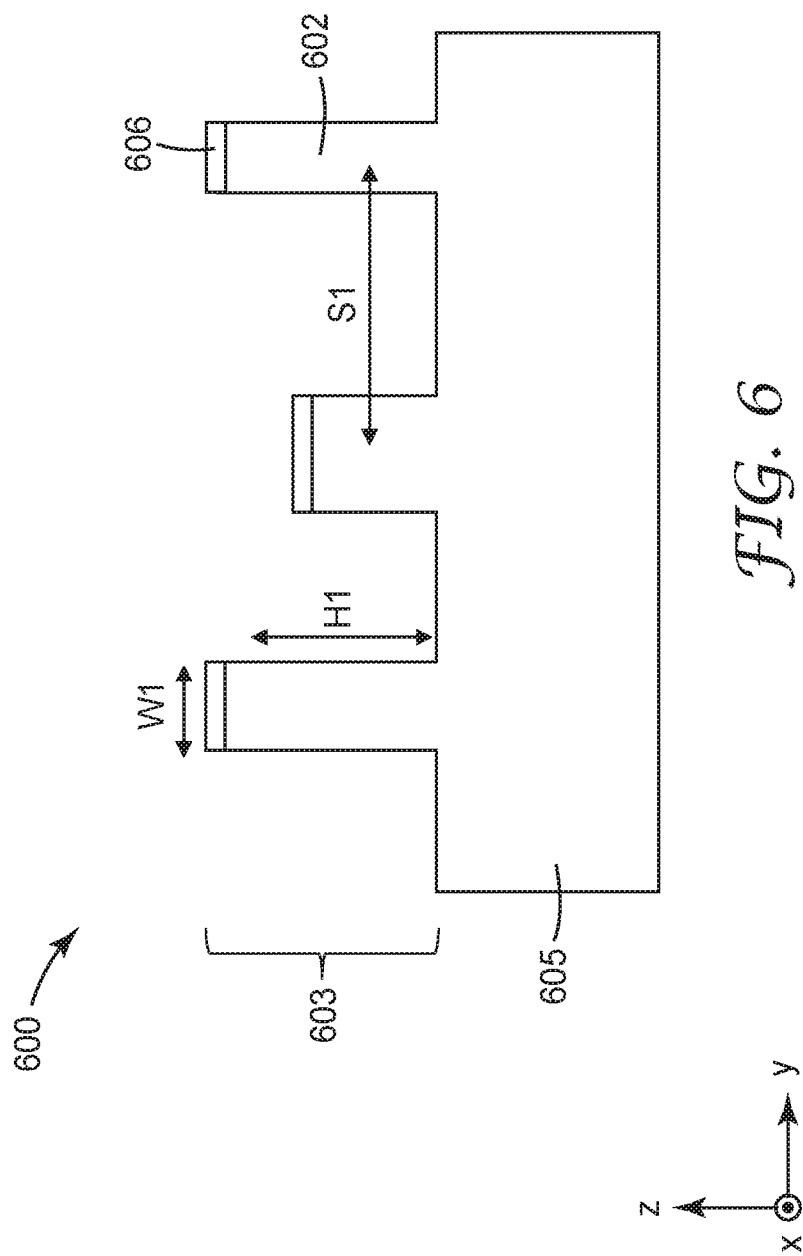

FIG. 6 is a schematic cross-sectional view of a nanostructured article 600 including a substrate 605 and a plurality of first nanostructures 603. The first nanostructures 603 include a lower portion 602 and an upper portion 606. For example, an inorganic masking layer may be deposited during etching as described in U.S. Pat. Appl. Pub. No. 2017/0067150 (David et al.). The resulting first nanostructures 603 have distributions of height, width, and spacing. An average height H1, average center-to-center spacing S1, and an average width W1 are indicated.

In some embodiments, a coating (e.g., a fluorinated and/or low surface energy coating) may be disposed over any of the nanostructured surfaces of FIGS. 1 to 6. Such low surface energy coatings may be applied by any suitable method, for example plasma assisted vapor deposition, solvent coating methods, dip coating methods or spray coating methods. Suitable coating materials are described elsewhere herein. In some cases, a glass like or Diamond Like Glass (DLG) layer (e.g., a thin carbon containing silica layer) can be deposited onto the nanostructured surface prior to coating with a low surface energy material. In some embodiments, a DLG layer is preferred due to its flexibility and robust adhesion, for example. Processes for depositing DLG layers are described in U.S. Pat. No. 5,888,594 (David et al.); U.S. Pat. No. 9,340,683 (Jing et al.); U.S. Pat. No. 9,206,335 (Hager et al.); and U.S. Pat. No. 9,556,338 (Jing et al.), for example, and in U.S. Pat. Appl. Pub. Nos. 2010/0035039 (Jing et al.); 2016/0289454 (Jing et al.); and 2017/0045284 (Meuler et al.), for example. The DLG layer may conform to the nanostructured surface.

Figure 7:
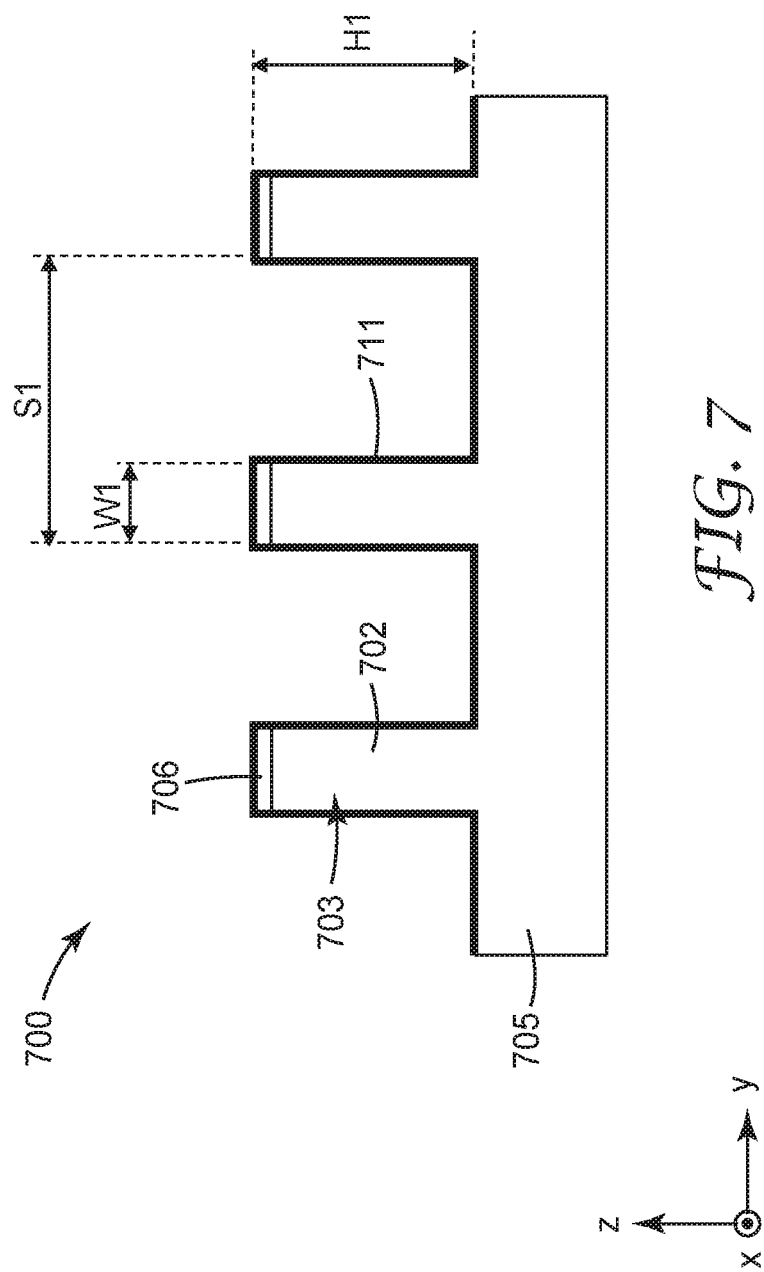
FIG. 7 is a schematic cross-sectional view of a nanostructured article including a conformal layer.

A conformal layer (e.g., a monolayer, a tie layer and/or a glass like or DLG layer) may be disposed over any of the nanostructured articles of FIGS. 1 to 6. An illustrative example is provided in FIG. 7 which is a schematic cross-sectional view of a nanostructured article 700 including a substrate 705 and a plurality of first nanostructures 703 disposed on, and extending away from, the substrate 705. A conformal layer 711 is disposed on the nanostructures 703 which include a lower portion 702 and an upper portion 706.

A fluorinated and/or low surface energy layer may be disposed over the conformal layer 711 or over the first nanostructures of an of FIG. 1-6 with or without including a conformal layer over the first nanostructures.

Figure 8:
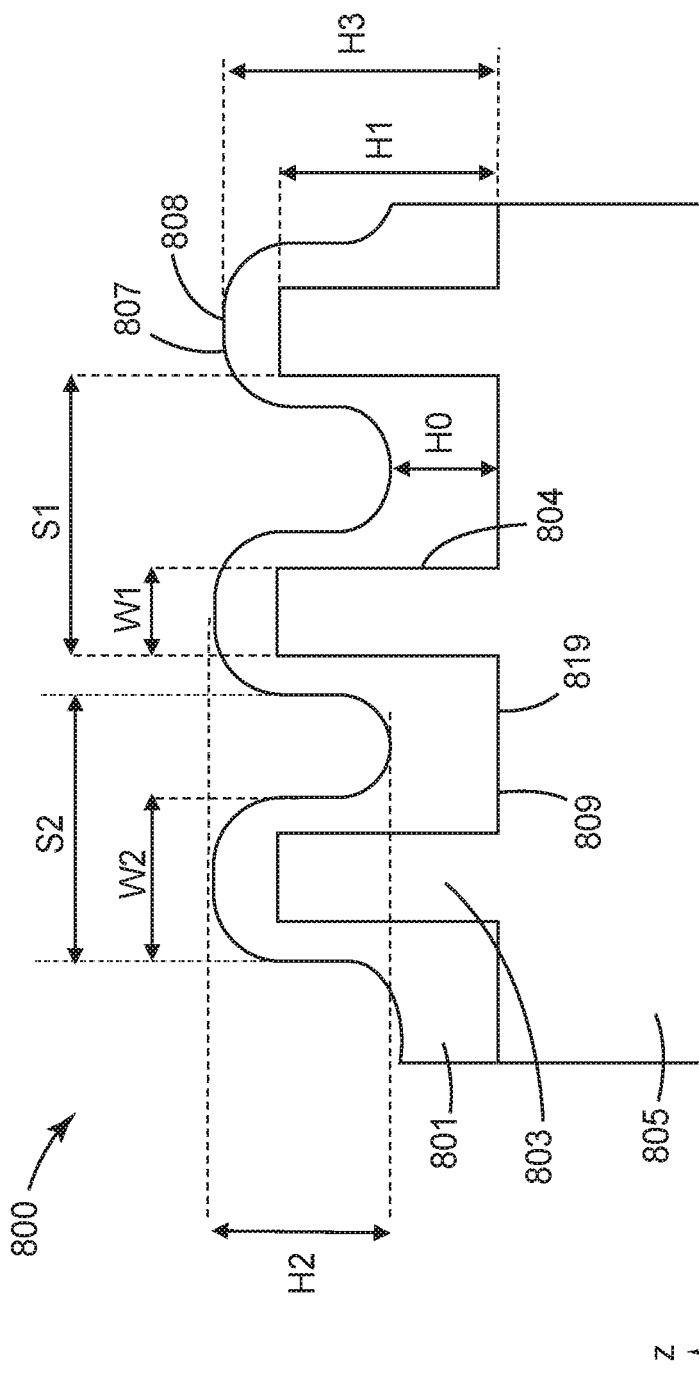
FIGS. 8-12 are schematic cross-sectional views of nanostructured articles that include a layer disposed on a plurality of nanostructures.

FIG. 8 is a schematic cross-sectional view of a nanostructured article 800 including a substrate 805, a plurality of first nanostructures 803 disposed on, and extending away from, the substrate 805, and a layer 801 (e.g., a fluorinated and/or low surface energy layer) disposed on the plurality of first nanostructures 803 and at least partially filling spaces between the first nanostructures to an average minimum height above the substrate 805 of H0 such that the layer 801 has a nanostructured surface 807 defined by, and facing away from, the plurality of first nanostructures 803. The nanostructured surface 807 may be defined by the first nanostructures 803 by coating the layer 801 onto the first nanostructures 803 such that the shape of the first nanostructures 803 results in the nanostructure of the surface 807. The layer 801 also has a nanostructured surface 819 opposite the nanostructured surface 807 and facing the first nanostructures 803. The nanostructured surface 807 includes a plurality of second nanostructures 808. The layer 801 has local minimum heights above the substrate 805 in spaces between the second nanostructures 808 and the average minimum height H0 is the average of the local minimum heights. In some embodiments, the average minimum height H0 is at least 30 nm, or at least 40 nm, or at least 50 nm. In some embodiments, H0 is no more than 250 nm, or no more than 200 nm, or no more than 150 nm. In some embodiments, the layer 801 is a polymer layer which may be a fluoropolymer layer. In some embodiments, the layer 801 is a covalently crosslinked fluorinated polymeric layer.

The first nanostructures 803 have an average height H1, an average width W1 and an average (e.g., center-to-center) spacing S1. The substrate 805 has a major surface 809 (planar portion of the top surface of the substrate 805) and the first nanostructures 803 extend from the major surface 809. The layer 801 may contact the major surface 809 or may contact a coating (e.g., glass like DLG coating) applied to the major surface 809 (alternatively, the coating on the major surface 809, if present, may be considered to be part of the substrate 805 so that the layer 801 contacts the substrate). The major surface may have a roughness (e.g., an Ra roughness) on the order of 1 to 10 nm, for example. In some embodiments, the layer 801 at least partially fills spaces between the first nanostructures from the substrate (e.g., from surface 809 or from a coating applied to surface 809) to an average minimum height above the substrate of H0. The nanostructured article 800 has a nanostructured surface 804 which includes the major surface 809 and the outer surface of the first nanostructures 803.

The nanostructured surface 807 includes a plurality of second nanostructures 808 which have an average peak to valley height H2, an average height H3 above the substrate 805, an average width W2, and an average spacing (e.g., center-to-center spacing) S2. It has been found that the layer 801 can improve the durability of nanostructured surface. In some embodiments, the thickness of the layer 801 in the regions between the first nanostructures is increased, reducing the peak-to-valley height H2. This may be desired in some embodiments for improved durability. It has been found that the height H2 in such embodiments can still be sufficient to provide a desired (super)hydrophobic (hydrophobic or superhydrophobic) or (super)omniphobic (omniphobic or superomniphobic) effect. In some embodiments, H2 is less than H1, or less than 0.95 H1, or less than 0.9 H1, or less than 0.8 H1, or less than 0.7 H1. In some such embodiments or in other embodiments, H2 is at least 0.1 H1, or at least 0.2 H1, or at least 0.3 H1. In some embodiments, H2 is about H1, or H2 is less than H1, or H2 is less than 0.7 H1, or H2 is less than 0.5 H1. In some embodiments, H2 is in a range of 0.5 to 0.7 times H1.

Figure 9:
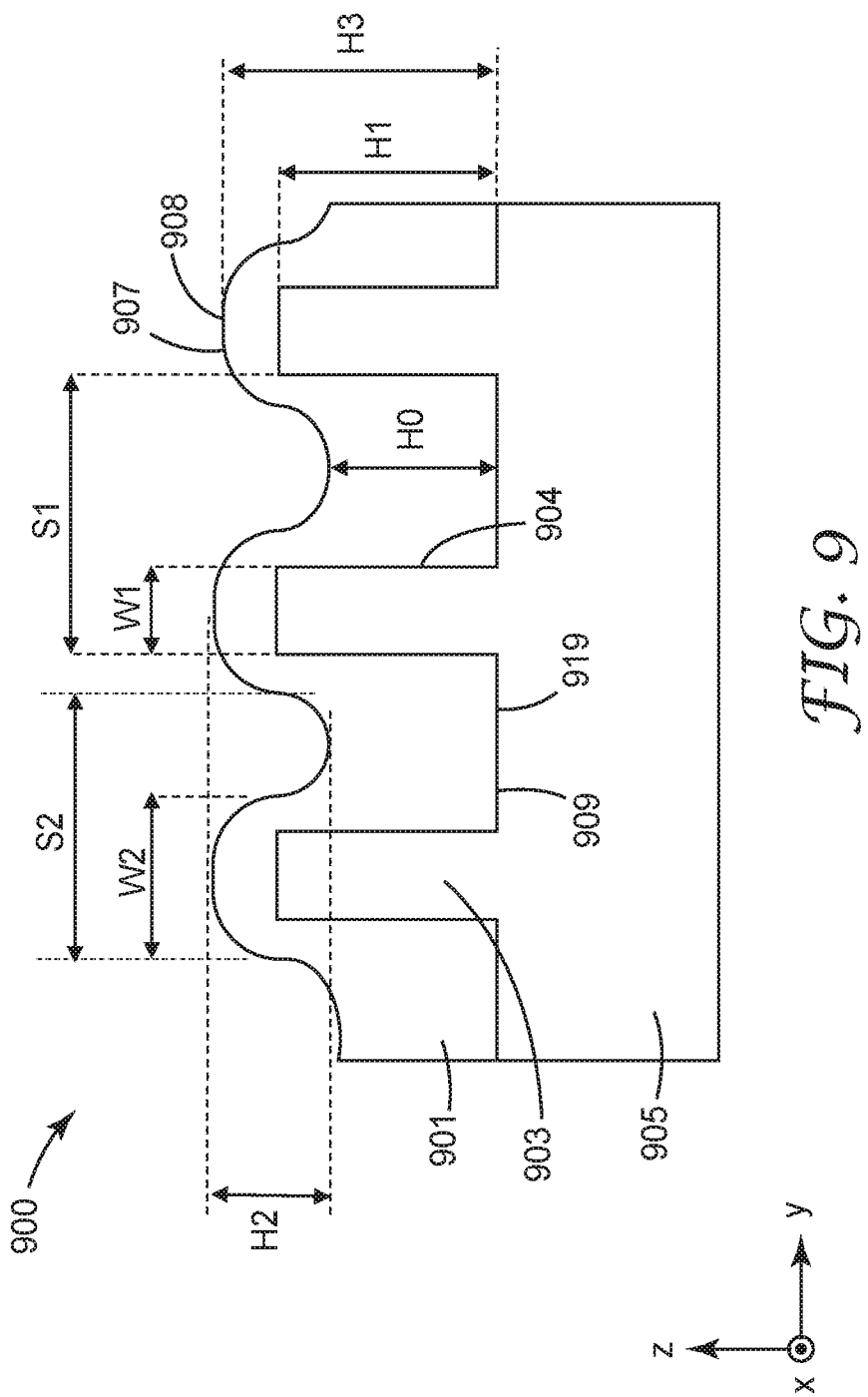

The relative thicknesses of H0 and H1, for example, may be different than schematically illustrated in FIG. 8. For example, a nanostructured article 900 with a reduced H2 and increased H0 relative to the nanostructured article 800 is schematically illustrated in FIG. 9. Elements 901, 903, 904, 905, 907, 908, 909, 919 correspond to elements 801, 803, 804, 805, 807, 808, 809, 819 respectively. The layers 801 and 901 can be applied as a coating which is subsequently dried and cured. The thickness H0 can be increased by using a coating with a higher solids concentration, for example.

In some embodiments, the first nanostructures 803 (resp., 903) extend to an average height H1 from the substrate 805 (resp., 905) and have an average width W1, and the nanostructured surface 807 (resp., 907) includes a plurality of second nanostructures 808 (resp., 908) having an average peak-to-valley height H2 and an average width W2. In some embodiments, H2/W2 is no more than 0.95 H1/W1, or no more than 0.9 H1/W1, or no more than 0.8 H1/W1. In some such embodiments or in other embodiments, H2/W2 is at least 0.1 H1/W1, or at least 0.2 H1/W1, or at least 0.3 H1/W1. In some embodiments, H2/W2 is at least 1, 2, 3, 5, 10, or 20, for example. H2/W2 may be in a range of 1 to 100, or 1 to 50, or 3 to 20, for example.

Figure 10:
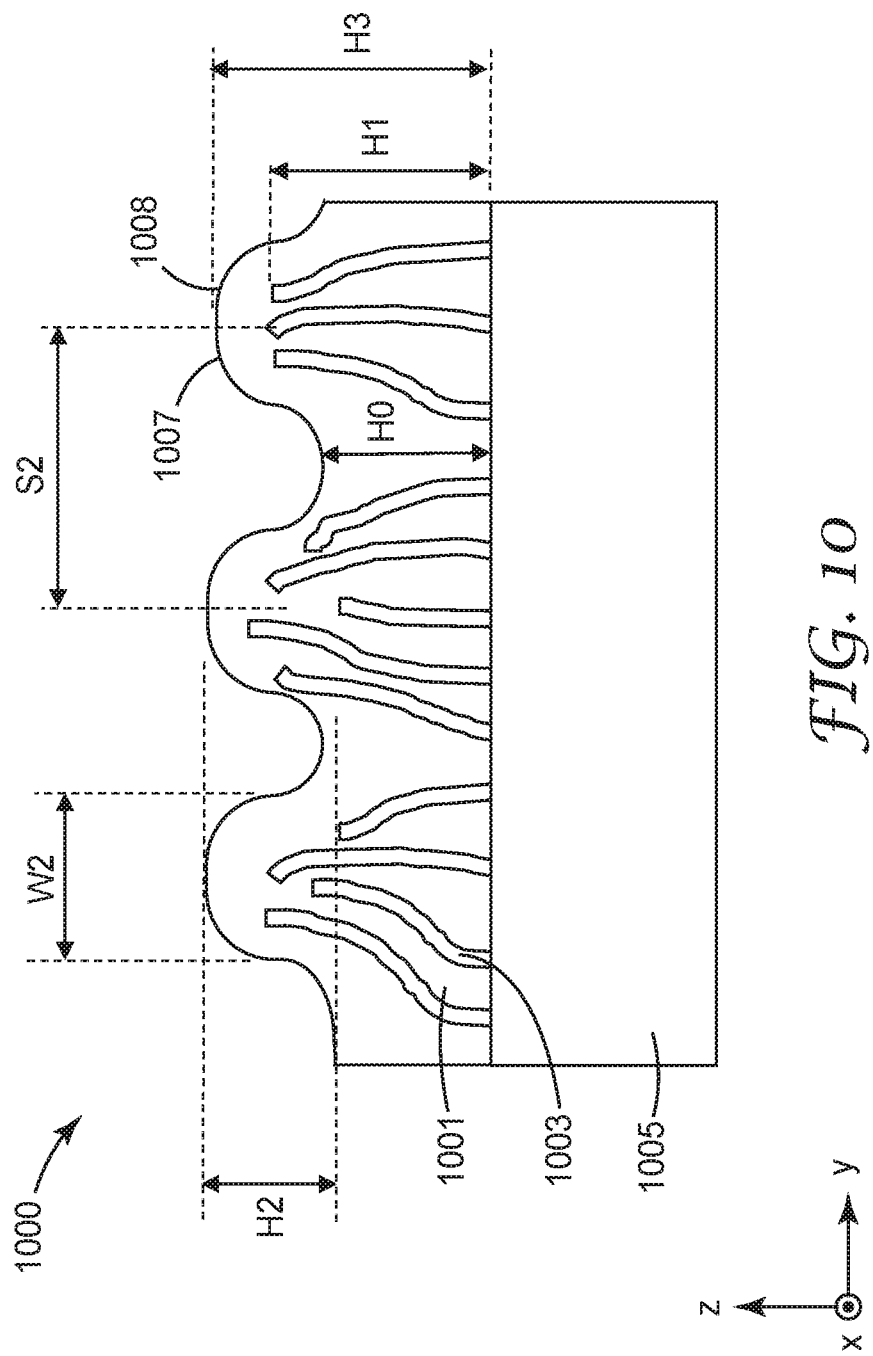

In some embodiments, the plurality of first nanostructures form into groups partially clumped together before or during coating with the fluorinated and/or low surface energy layer. This can occur, for example, when the aspect ratio of the first nanostructures is high (e.g., at least 10 or at least 20) and the nanostructures extend irregularly (e.g., in directions that vary along the length of the nanostructures). This is schematically illustrated in FIG. 10 which is a schematic cross-sectional view of a nanostructured article 1000 including a substrate 1005, a plurality of first nanostructures 1003 disposed on, and extending away from, the substrate 1005, and a layer 1001 (e.g., a fluorinated and/or low surface energy layer) disposed on the plurality of first nanostructures 1003 and at least partially filling spaces between the first nanostructures to an average minimum height above the substrate 1005 of H0 such that the layer 1001 has a nanostructured surface 1007 defined by, and facing away from, the plurality of first nanostructures 1003. In the illustrated embodiment, some of the spaces between first nanostructures 1003 are completely filled with the layer 1001. The nanostructured surface 1007 includes a plurality of second nanostructures 1008. The layer 1001 has local minimum heights above the substrate 1005 in spaces between the second nanostructures 1008 and the average minimum height H0 is the average of the local minimum heights. In some embodiments, each second nanostructure in at least a majority (or at least 60%, or at least 70%, or at least 80%) of the second nanostructures 1008 partially surrounds a plurality of the first nanostructures 1003.

The first nanostructures 1003 have an average height H1 above the substrate 1005. In the illustrated embodiment, the first nanostructures 1003 have an average length (measured along an axis of the first nanostructures) greater than the average height H1 since at least some of the first nanostructures 1003 are curved along at least a portion of their length. The average peak-to-valley height H2, the average width W2 and the average spacing S2 between the second nanostructures 1008 are schematically illustrated. In some embodiments, W2 is at least 2, 4, 5, or 10 times an average width of the first nanostructures 1003. In some embodiments, S2 is at least 2, 4, or 5 times an average spacing of the first nanostructures 1003. In some embodiments, H2 is less than 0.7 H1 or less than 0.5 H1. In some embodiments, H2 is at least 40, 50, 60, 80, or 100 nm. In some such embodiments or in other embodiments, H2 is no more than 300 nm, or no more than 250 nm.

The first nanostructures of any of FIGS. 8-10 may include a polymeric lower portion and an inorganic upper portion as described further elsewhere herein. The first nanostructures may extend generally normally to the substrate or may extend generally along a direction making an oblique angle to the substrate.

Figure 11:
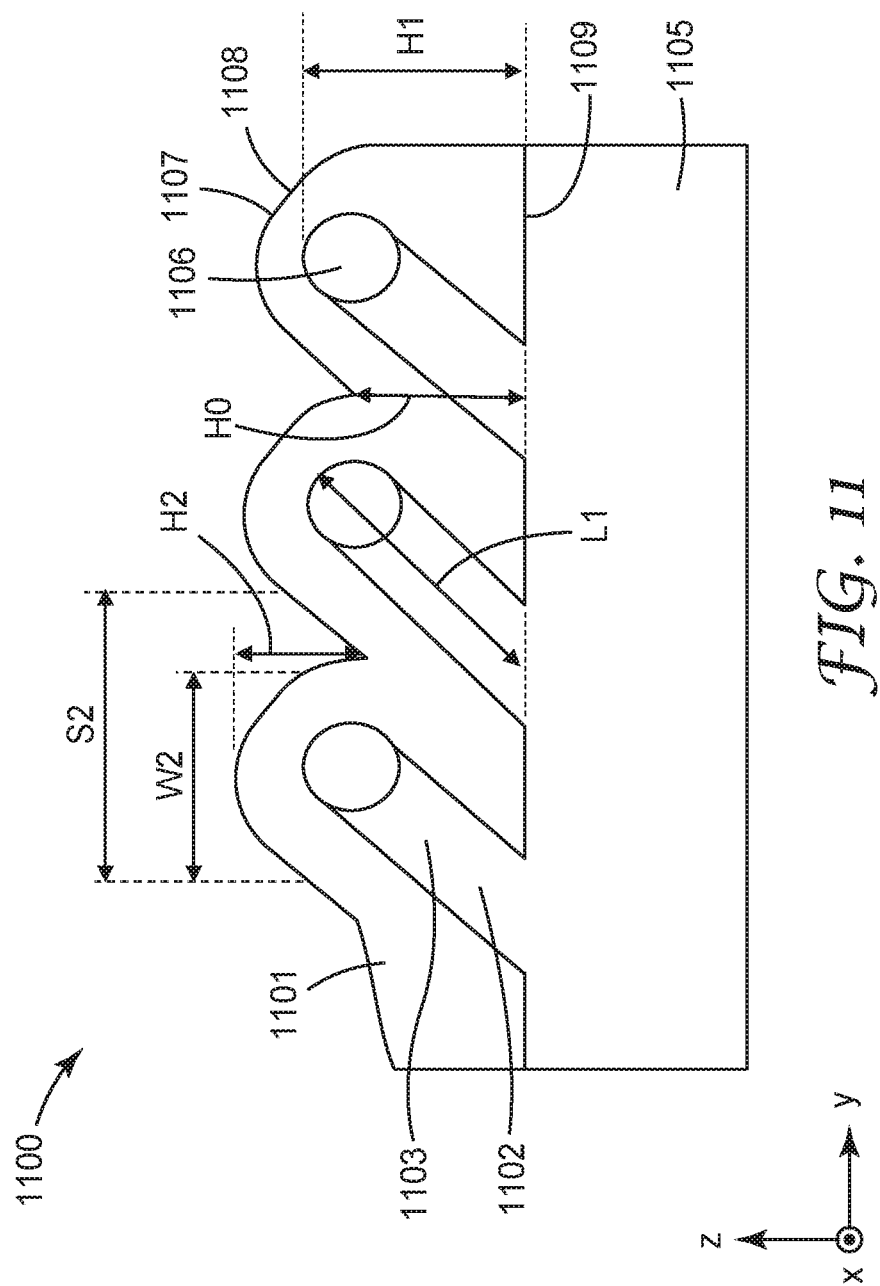

In some embodiments, the first nanostructures generally extend in a direction making an oblique angle with the substrate and a fluorinated and/or low surface energy layer is disposed over the first nanostructures. This is schematically illustrated in FIG. 11 which is a schematic cross-sectional view of nanostructured article 1100 which includes a layer 1101 (e.g., a covalently crosslinked fluorinated polymeric layer) which at least partially fills spaces between the first nanostructures 1103 (the layer 1101 contacts the major surface 1109 of the substrate 1105 or contacts a glass like or DLG-coated, for example, major surface of the substrate 1105) to an average minimum height H0 above the substrate 1105 (measured from the plane of the major surface 1109).

In the illustrated embodiment, the first nanostructures 1103 include a lower portion 1102, which may be a polymeric portion including polyurethane, and an upper portion 1106, which may include an inorganic nanoparticle.

The layer 1101 has a nanostructured surface 1107 defined by the first nanostructures 1103. The nanostructured surface 1107 includes a plurality of second nanostructures 1108 having a peak-to-valley height H2, an average width W2, and an average spacing S2. H2 is measured along a direction (z-direction) perpendicular to substrate and W2 and S2 are measure along the plane of the substrate (x-y plane). In embodiments where the nanostructured article 1100 is disposed on a non-planar surface (e.g., a curved surface), the plane of the substrate can be taken to be a locally defined plane (e.g., the tangent plane at a point of interest).

Figure 12:
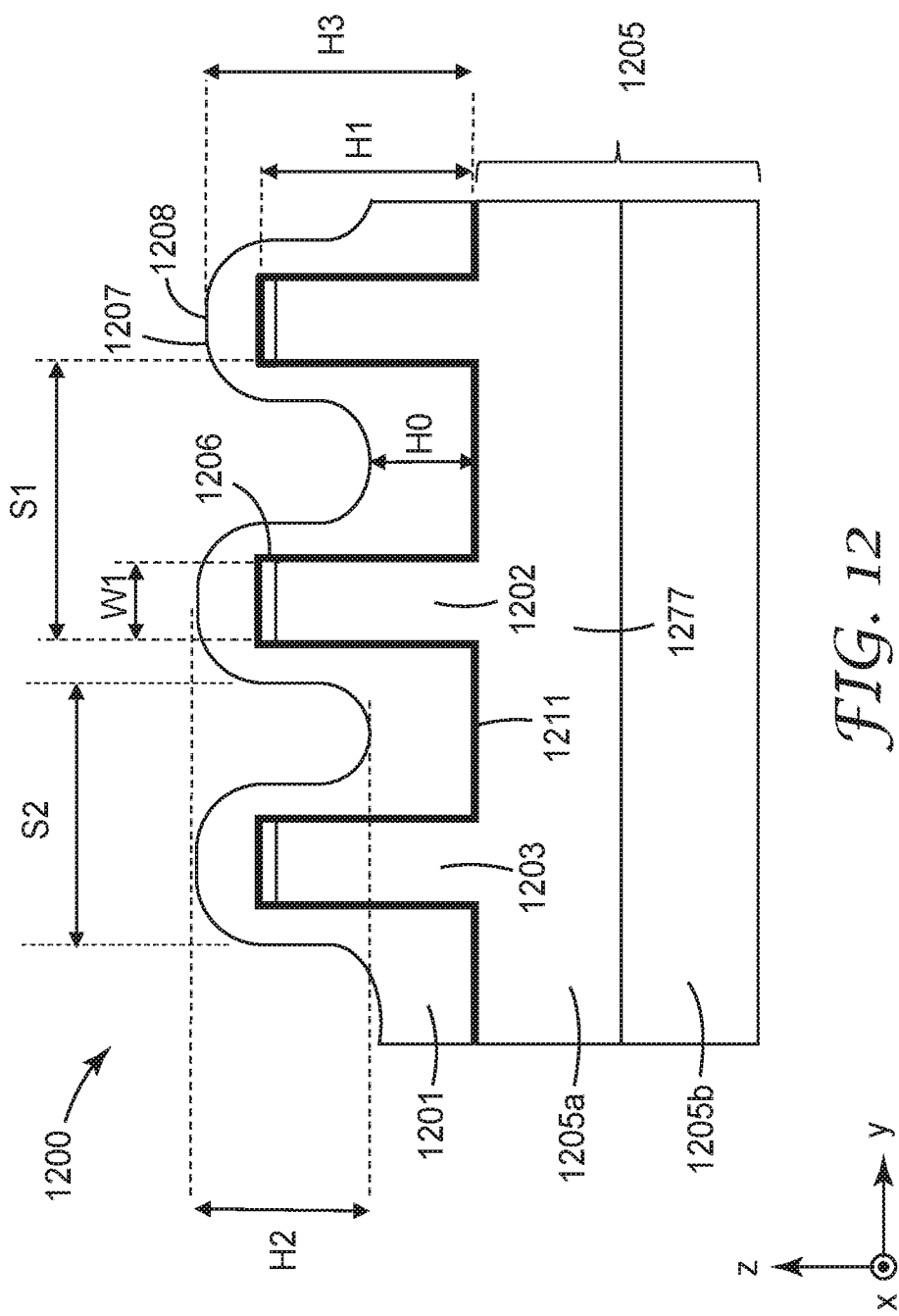

A glass like or DLG layer or other tie layer may be disposed over the first nanostructures before the (e.g., covalently crosslinked fluorinated polymeric) layer is disposed on the first nanostructures. This is schematically illustrated in FIG. 12 which is a schematic cross-sectional view of an article 1200 including first nanostructures 1203 coated with a DLG or other thin glass like layer 1211 (e.g., a tie layer for promoting adhesion) and including a layer 1201 disposed on the coated first nanostructures 1203 and at least partially filling spaces between the first nanostructures to an average minimum height H0 above the substrate 1205 such that the polymeric layer has a nanostructured surface 1207 defined by, and facing away from, the plurality of first nanostructures 1203. The nanostructured surface 1207 includes a plurality of second nanostructures 1208. Elements 1202, 1203, 1205a, 1206, and 1211 may correspond to elements 702, 703, 705, 706, 711, respectively.

In some embodiments, a unitary member includes the substrate or an upper layer of the substrate and the first nanostructures or a lower portion of the first nanostructures. The substrates of the nanostructured articles of the present description may include more than one layer. For example, the substrate may be a multilayer film. In the embodiment illustrated in FIG. 12, the substrate 1205 includes an upper layer 1205a and a lower layer 1205b. In some embodiments, a unitary member 1277 includes the upper layer 1205a of the substrate 1205 and the lower portion 1202 of the first nanostructures 1203. In some embodiments, the substrate 1205 includes a film (e.g. a multilayer film; not illustrated in FIG. 12) with the lower layer 1205b coated onto the film and the upper layer 1205a coated onto the lower layer 1205b.

The first nanostructures (e.g., the first nanostructures of any of FIGS. 1-12) of the nanostructured article may include polyurethane. For example, in some embodiments, the first nanostructures are formed on a polyurethane layer such that the first nanostructures include polyurethane material from the polyurethane layer. In some embodiments, the first nanostructures are formed in a hardcoat layer (which may be a polyurethane hardcoat) disposed on a polyurethane layer. In either case, the polyurethane layer may be an energy dissipation layer and/or a shape memory layer.

The polyurethane may be or include a solvent-based or water-based polyurethane, a melt processed thermoplastic polyurethane, a crosslinked thermoset polyurethane (e.g. a polyurethane containing siloxane groups), or an ultraviolet (UV) curable polyurethane (e.g. an acrylate). In some embodiments, the polyurethane is a polyester-based polyurethane, a polycarbonate-based polyurethane or a combination or blend of both. The water-based polyurethane can be made from an aqueous-based polyurethane dispersion (i.e., PUD), and the solvent-based polyurethane can be made from a solvent-based polyurethane solution (i.e., PUS). Typically, the water and solvent, i.e. liquid, is removed from the polyurethane coating solution to form a polyurethane coating or film. Optionally, the polyurethane may be cured during the liquid removal step and/or after liquid removal, enhancing the properties of the polyurethane coating or film. In some preferred embodiments, the polyurethane is a covalently crosslinked polyurethane. Covalently crosslinked polyurethanes can provide desired chemical resistance and mechanical robustness (e.g., scratch or abrasion or impact resistant). In some such embodiments or in other embodiments, the polyurethane is a covalently crosslinked aliphatic polyurethane and/or a covalently crosslinked urethane acrylate. Suitable polyurethane materials are described in U.S. Pat. Appl. Pub. Nos. 2017/0170416 (Johnson et al.) and 2017/016590 (Leatherdale et al.), for example.

The polyurethane may be characterized in terms of a storage modulus E' (Young's modulus), a loss modulus E", and/or a ratio (tan δ (tan delta) or loss tangent) of the loss modulus E" to the storage modulus E'. The polyurethane layer may have energy dissipating properties and can have a tan δ peak value of at least 0.5, or at least 0.8 or greater, or at least 1.0, or at least 1.2, or at least 1.4, or from 0.5 to 2.5, or from 1 to 2.5, or from 1 to 2. In some embodiments, tan δ at room temperature (e.g., 20° C.) is at least 0.5, or at least 1, or at least 1.2, or at least 1.4. In some such embodiments, the tan δ at room temperature is no more than 2. The polyurethane can have a Young's modulus (E') greater than 0.4 MPa, greater than 0.6 MPa, or greater than 0.9 MPa over the temperature range −40° C. to 70 degrees ° C.

The modulus and tan δ can be determined by dynamical mechanical analysis (DMA), for example. In some embodiments, the modulus and tan δ are determined according to the ASTM D4065-12 or D5026-15 test standards, for example. An oscillation of 0.2 percent strain at 1 Hz throughout a temperature ramp from −50 deg. C. to 200 deg. C. at rate of 2 deg. C. per minute can be used to measure the glass transition temperature, the moduli and the peak tan δ.

In some embodiments, it is desired that the nanostructured article be bendable so that it can conform to a curved surface, for example. In such embodiments, it may be desired that the polyurethane has a suitable elongation to yield and/or elongation at break that allows a suitable bendability or foldability. In some embodiments, the elongation at yield and/or the elongation at break is at least 2%, or at least 3%, or at least 5%, or at least 7%, or at least 10%, or at least 15%, or at least 25%, or at least 50%.

In some embodiments, the polyurethane layer is a covalently crosslinked polyurethane layer. The covalently crosslinked polyurethane layer can include chemically, or covalently crosslinked materials derived from step growth polymerization of isocyanate and polyol oligomers. Selection of reactant isocyanates and polyols may modify the glass transition temperature of the resulting cured polyurethane. The crosslinked polyurethane layer may be coated onto a substrate (e.g., a polymeric substrate) or glass layer (that may be primed) and then be cured or crosslinked to form a thermoset polyurethane layer. Alternatively, the crosslinked polyurethane layer can be produced as a film that is then laminated to a substrate or glass layer in a subsequent process step. Such lamination could be assisted with heat, or vacuum, or through the use of an adhesive, or a combination thereof. The substrate or glass layer may be substantially transparent (e.g., an average optical transmittance of at least 60%, or at least 70%, or at least 80%, or at least 90%).

Polyurethane generally refers to a polymer including organic units joined by carbamate (urethane) links. The polyurethanes described herein are typically thermosetting polymers that do not melt when heated. Polyurethane polymers may be formed by reacting a di- or polyisocyanate with a polyol. Both the isocyanates and polyols used to make polyurethanes contain on average two or more functional groups per molecule. The polyurethanes may have a functionality greater than 2.4 or 2.5.

A wide variety of polyols may be used to form a crosslinked polyurethane. The term polyol includes hydroxylfunctional materials that generally include at least 2 terminal hydroxyl groups. Polyols include diols (materials with 2 terminal hydroxyl groups) and higher polyols such as triols (materials with 3 terminal hydroxyl groups), tetraols (materials with 4 terminal hydroxyl groups), and the like. Typically, the reaction mixture contains at least some diol and may also contain higher polyols. Higher polyols are useful for forming crosslinked polyurethane polymers. Diols may be generally described by the structure HO—B—OH, where the B group may be an aliphatic group, an aromatic group, or a group containing a combination of aromatic and aliphatic groups and may contain a variety of linkages or functional groups, including additional terminal hydroxyl groups. In some embodiments, for example, where optical performance and material optical stability is desired, aliphatic crosslinked polyurethane may be preferred. In other embodiments, aromatic polyurethane may be used.

Polyester polyols are useful for forming crosslinked polyurethane polymers. Among the useful polyester polyols are linear and non-linear polyester polyols including, for example, polyethylene adipate, polybutylene succinate, polyhexamethylene sebacate, polyhexamethylene dodecanedioate, polyneopentyl adipate, polypropylene adipate, polycyclohexanedimethyl adipate, and poly ε-caprolactone. Suitable aliphatic polyester polyols include those available from King Industries, Norwalk, CT, under the trade name "K-FLEX" such as K-FLEX 188 or K-FLEX A308.

A wide variety of polyisocyanates may be used to form the aliphatic crosslinked polyurethane. The term polyisocyanate includes isocyanate-functional materials that generally include at least 2 terminal isocyanate groups. Polyisocyanates include diisocyanates (materials with 2 terminal isocyanate groups) and higher polyisocyanates such as triisocyanates (materials with 3 terminal isocyanate groups), tetraisocyanates (materials with 4 terminal isocyanate groups), and the like. Typically, the reaction mixture contains at least one higher isocyanate if a difunctional polyol is used. Higher isocyanates are useful for forming crosslinked polyurethane polymers. Diisocyanates may be generally described by the structure OCN—Z—NCO, where the Z group may be an aliphatic group, an aromatic group, or a group containing a combination of aromatic and aliphatic groups.

Higher functional polyisocyanates, such as triisocyanates, are useful to form a crosslinked polyurethane polymer. Triisocyanates include, for example, polyfunctional isocyanates, such as those produced from biurets, isocyanurates, or adducts, for example. Some commercially available polyisocyanates include portions of the DESMODUR and MONDUR series from Covestro (Leverkusen, Germany), and the PAPI series from Dow Plastics, a business group of the Dow Chemical Company, Midland, MI Useful triisocyanates include those available from Covestro under the trade designations DESMODUR N3300A and MONDUR 489.

The reactive mixture used to form the aliphatic crosslinked polyurethane typically also contains a catalyst. The catalyst facilitates the step-growth reaction between the polyol and the polyisocyanate. Conventional catalysts generally recognized for use in the polymerization of urethanes may be suitable for use with the present description. For example, aluminum-based, bismuth-based, tin-based, vanadium-based, zinc-based, or zirconium-based catalysts may be used. Tin-based catalysts may be preferred in some embodiments. Tin-based catalysts have been found to significantly reduce the amount of outgassing present in the polyurethane. Most desirable are dibutyltin compounds, such as dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. For example, the dibutyltin dilaurate catalyst DABCO T-12, commercially available from Air Products and Chemicals, Inc., Allentown, PA is suitable. The catalyst is typically included at levels of at least 200 ppm or even 300 ppm or greater. The catalyst may be present in the final formed films at levels of at least 100 ppm or in a range from 100-500 ppm, for example.

The covalently crosslinked polyurethane may have a crosslink concentration of at least 0.1 mol/kg, or at least 0.2 mol/kg, or at least 0.3 mol/kg, or at least 0.34 mol/kg. In some such embodiments, the crosslink concentration is no more than 1.2 mol/kg, or no more than 1.05 mol/kg, or no more than 1 mol/kg, or no more than 0.9 mol/kg, or no more than 0.75 mol/kg, or no more than 0.65 mol/kg. In some embodiments, the covalently crosslinked polyurethane has a crosslink concentration in a range of 0.2 to 1.2 mol/kg. In some preferred embodiments, the covalently crosslinked polyurethane has a crosslink concentration in a range of 0.3 to 1.05 mol/kg.

The crosslink concentration and the gel content of the cured polyurethane can be calculated using the method described in Macromolecules, Vol. 9, No. 2, pages 206-211 (1976). To implement this model, integral values for chemical functionality are used. DESMODUR N3300 is reported to have an average functionality of 3.5 and an isocyanate equivalent weight of 193 g/equiv. This material was represented in the mathematical model as a mixture of 47.5 wt % HDI trimer (168.2 g/equiv.), 25.0 wt % HDI tetramer (210.2 g/equiv.), and 27.5 wt % of HDI pentamer (235.5 g/equiv.). This mixture yields an average equivalent weight of 193 g/equiv. and an average functionality of 3.5. Desmodur N3400 is reported to have an average functionality 2.5 and an equivalent weight of 193, and it is reported to be blend of the HDI isocyanurate trimer and HDI uretdione dimer. This material was represented in the mathematical model as a mixture of 19 wt % HDI isocyanurate trimer, 33 wt % HDI uretdione dimer, and 10 wt % of HDI uretdione trimer and 38 wt % of HDI tetramer having one isocyanurate group and one uretdione group. In the mathematical model, the functionality was determined by the sum the isocyanate groups and the uretdione groups in the cases where there was an excess of hydroxyl groups relative to the sum of the isocyanate and uretdione groups.

To produce a polyurethane layer with a glass transition temperature below 10° C., it can be preferable to limit the amount of the isocyanate component. In some embodiments using HDI-derived isocyanates, it can be preferable to use less than 40 wt % isocyanate component based on the total core layer composition, or less than 38 wt %, or less than 35 wt %. In some embodiments, it is preferable to use an isocyanate component containing uretdione groups. When uretdione groups are included, it can be preferable to use an excess of hydroxyl functional groups relative to isocyanate groups. The excess hydroxyl groups can react with the uretdione groups to form allophanate groups to provide cure and chemical crosslinking. In some embodiments, it is preferable to include only a single polyol component to produce a narrow tan δ peak. In some embodiments, it is preferable to use a polyol component and an isocyanate component that are miscible with each other at room temperature.

The polyurethane may be formed with urethane acrylate oligomers. Urethane acrylate oligomers may be formed from a wide variety of urethane materials with acrylate or methacrylate reactive groups. Urethane acrylate oligomers are commercially available from vendors such as, for example, Sartomer of Exton, PA (a subsidiary of Arkema) and ALLNEX. Suitable aliphatic urethane oligomers include, for example, CN9002, CN9004, CN9893, CN9010 and CN3211 available from Sartomer Company and those available from ALLNEX under the EBECRYL brand name. The urethane acrylate oligomers may be aliphatic or aromatic. In some embodiments, aliphatic is preferred.

The polyurethane may be formed by mixing the polyurethane precursor components with polyacrylate precursor components. The polyurethane and the polyacrylate polymers can be formed via distinct initiators. This allows the polyacrylate polymer to be selectively formed without forming the polyurethane polymer. The polyurethane polymer may be formed with the use of a catalyst (thermal curing) and the polyacrylate may be formed with the use of a photoinitiator (UV or light curing), for example.

The precursor (containing both the polyurethane precursor components with the polyacrylate precursor components with both photoinitiator and catalyst) may be coated onto the polymeric substrate layer (that may be primed) or the glass layer and then the polyacrylate polymer may be selectively polymerized or cross-linked (via UV curing) to form a b-stage layer. Then this b-stage layer can be cured or cross-linked to form the thermoset or crosslinked polyurethane polymer.

In some embodiments, the polyurethane layer contains a blend of polyacrylate polymer and crosslinked polyurethane polymer. The polyurethane layer, or a continuous polymeric phase of the polyurethane layer, may contain from 1 to 49 wt % polyacrylate polymer. The polyurethane layer, or a continuous polymeric phase of the polyurethane layer, may contain from 51 to 99 wt % crosslinked polyurethane polymer. The polyurethane layer, or a continuous polymeric phase of the polyurethane layer, may contain from 1 to 20 wt % polyacrylate polymer, or from 2 to 15 wt % polyacrylate polymer, or from 3 to 10 wt % polyacrylate polymer. The polyurethane layer, or a continuous polymeric phase of the polyurethane layer, may contain from 80 to 99 wt % crosslinked polyurethane polymer, or from 85 to 98 wt % crosslinked polyurethane polymer, or from 90 to 97 wt % crosslinked polyurethane polymer. The polyurethane layer may contain both a photoinitiator and a catalyst.

When the polyurethane layer contains less than about 10 wt % polyacrylate (based on wt % of polyacrylate precursor material in the precursor mixture), it is believed that the polyacrylate defines a mainly a linear or branched polymer. When the polyurethane layer contains about 10 wt % to about 20 wt % polyacrylate (based on wt % of polyacrylate precursor material in the precursor mixture), it is believed that the polyacrylate defines a branched or crosslinked polymer. When the polyurethane layer contains about 20 wt % to about 50 wt % polyacrylate (based on wt % of polyacrylate precursor material in the precursor mixture), it is believed that the polyacrylate defines mainly a crosslinked polymer. Crosslinked polyacrylate may define an interpenetrating network with the crosslinked polyurethane in the polyurethane layer.

The polyacrylate polymer is polymerized or crosslinked. The polyacrylate polymer may be formed of acrylate monomers or oligomers. In some embodiments, the polyacrylate is a polyacrylate homopolymer. The acrylate monomers or oligomers are multifunctional to enable polymerization or cross-linking of the polyacrylate polymer. The polyacrylate polymer may be formed with the aid of an initiator, such as a photo-initiator, for example. The polyacrylate polymer may be formed of oligomers that include acrylate and urethane segments, or acrylate and urethane compatible segments. The polyacrylate polymer may be aliphatic.

The polyacrylate polymer may be formed of multifunctional (meth)acrylic monomers, oligomers, and polymers, where the individual resins can be difunctional, trifunctional, tetrafunctional or higher functionality. Useful multifunctional acrylate monomers and oligomers include:
  (a) di(meth)acryl containing monomers such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;
  (b) tri(meth)acryl containing monomers such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acryl containing monomer such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

Oligomeric (meth)acryl monomers such as, for example, urethane acrylates may also be employed. Such (meth)acrylate monomers are widely available from Sartomer Company (Exton, PA), ALLNEX (Frankfurt am Main, Germany), and Aldrich Chemical Company (Milwaukee, WI), for example.

In some embodiments, the polyacrylate polymer includes a (meth)acrylate monomer including at least three (meth)acrylate functional groups. In some embodiments, the crosslinking monomer includes at least four, five or six (meth)acrylate functional groups. Acrylate functional groups may be favored over (meth)acrylate functional groups.

Preferred functional acrylates include, for example, trimethylolpropane triacrylate (commercially available from Sartomer under the trade designation "SR351"), ethoxylated trimethylolpropane triacrylate (commercially available from Sartomer under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate (from Sartomer under the trade designation "SR494"), dipentaerythritol hexaacrylate, and tris(2-hydroxy ethyl) isocyanurate triacrylate (from Sartomer under the trade designation "SR368").

Aliphatic urethane acrylate oligomers may be utilized to form a preferred polyacrylate polymer to enhance compatibility of the polyacrylate polymer and the cross-linked polyurethane, although other aliphatic polyacrylate monomers may also be useful. The polyacrylates or polyurethane acrylates described herein are typically thermosetting polymers.

The polyacrylate polymer may be formed by free radical polymerization of multifunctional urethane acrylate oligomers. The urethane acrylate oligomer may be mixed with other low molecular weight monofunctional and/or multifunctional acrylates to modify the pre-cured viscosity of the resin for the purposes of processing. The average functionality of the multifunctional acrylate used in the polyurethane layer prior to cure can be less than 3 (i.e. 3 functional acrylate functional groups per molecule) or can be 2 or less. The cured (or crosslinked) material may exhibit stable material properties with respect to the display film use in application, that is, the polyurethane layer may not exhibit appreciable flow.

A urethane acrylate can be used as a shape memory and/or energy dissipating layer (e.g., any of layers 1310, 1410, 1510, or 1610 described elsewhere). In some such embodiments, the urethane acrylate can have a crosslink concentration of 0.3 to 2 mol/kg, for example. In some such embodiments, the urethane acrylate may have a glass transition temperature from −76° C. to 80° C., from −50° C. to 50° C., or from −20° C. to 35° C. In some embodiments, the glass transition temperature may be greater than 30° C., or greater than 50° C., or greater than 80° C. (e.g., in a range of 30° C. to 100° C.). In some embodiments, the urethane acrylate layer may have a Young's modulus (e.g., at 25° C.) of at least 200 MPa, or at least 300 MPa, or at least 500 MPa, or even at least 1000 MPa (e.g., in a range of 200 MPa to 3000 MPa).

A urethane acylate can be used as a harder and/or stiffer, for example, layer at or near the nanostructured surface (e.g., any of layers 1305a, 1405a, 1405b, 1505a, 1605a, or 1605b, described elsewhere). In some such embodiments, the urethane acrylate can have a crosslink concentration of 2 to 7 mol/kg, for example. In some embodiments, the crosslink density of urethane acrylates varies from about 150 g/crosslink to about 500 grams/crosslink. In some embodiments, the average functionality of the multifunctional acrylate used prior to cure can be 2 or greater (i.e., 2 functional acrylate functional groups per molecule) or can be 3 or greater. In some such embodiments, the urethane acrylate may have a glass transition temperature of at least 50° C., or at least 60° C., or at least 70° C., or even at least 80° C. (e.g., in a range of 50° C. to 120° C.). In some embodiments, the urethane acrylate layer may have a Young's modulus (e.g., at 25° C.) of at least 800 MPa, or at least 1000 MPa, or at least 1200 MPa, or even at least 2000 MPa (e.g., in a range of 800 MPa to 8000 MPa).

In some embodiments, the polyurethane has an NCO/OH ratio (also referred to as NCO/OH index) of no more than 1.06, or no more than 1.05 (e.g., in a range from 0.8 to 1.05). In some such embodiments, the polyurethane has a glass transition temperature of no more than 27° C. (e.g., in a range from 11° C. to 27° C.). The glass transition temperature can be determined by dynamic mechanical analysis (DMA), for example. The ASTM E1640-18 test standard, for example, can be used to determine the glass transition temperature by DMA. Alternatively, the glass transition temperature can be determined by differential scanning calorimetry (DSC). The ASTM D3418-15 test standard or the ASTM E1356-08(2014) test standard, for example, can be used to determine the glass transition temperature by DSC.

In some embodiments, the polyurethane is fluorinated. For example, the polyurethane may be formed using an HFPO urethane acrylate (e.g., as described further in the Examples). HFPO urethane acrylates that can be incorporated into a polyurethane hardcoat are described in U.S. Pat. No. 8,147,966 (Klun et al.), for example. "HFPO—" refers to the end group $F(CF(CF_3)CF_2O)_aCF(CF_3)$— of the methyl ester $F(CF(CF_3)CF_2O)_aCF(CF_3)C(O)OCH_3$, where "a" averages 2 to 15. In some embodiments, a averages between 3 and 10 or a averages between 5 and 8. Such species generally exist as a distribution or mixture of oligomers with a range of values for a, so that the average value of a may be non-integer. In some embodiments, a averages 6.2. This methyl ester has an average molecular weight of 1,211 g/mol, and can be prepared according to the method reported in U.S. Pat. No. 3,250,808 (Moore et al.) with purification by fractional distillation. Fluorinated polyurethanes are described in U.S. Pat. No. 7,718,264 (Klun et al.); U.S. Pat. No. 8,147,966 (Klun et al.); U.S. Pat. No. 8,476,398 (Klun et al.); U.S. Pat. No. 8,729,211 (Klun et al.); and U.S. Pat. No. 8,981,151 (Klun et al.), for example.

A nanostructured article may include a layer (e.g., a covalently crosslinked fluorinated polymeric layer) disposed over the first nanostructures (e.g., the layer disposed over the first nanostructures of any of the embodiments of FIGS. 8-12). This layer may be a fluorinated layer and/or a low surface energy layer that improves the hydrophobicity and/or omniphobicity of the nanostructured surface of the nanostructured article. The layer may also improve the durability of the nanostructured surface.

Suitable coating materials for the low surface energy layer can include siloxane-based materials, for example plasma deposited hexamethyldisiloxane (HMDSO), or fluorinated materials like fluorinated silane coupling agents, fluorinated oligomeric materials, or plasma deposited small molecules such as those described in U.S. Pat. No. 8,158,264 (David et al.). In some embodiments, after the surface is treated with such plasma deposited materials or the surface is otherwise plasma activated, a reactive fluorochemical coating is applied over the nanostructures. Suitable fluorochemical coatings include 3M EASY CLEAN COATING ECC-1000, 3M EASY CLEAN COATING ECC-4000, 3M NOVEC 1720 ELECTRONIC GRADE COATING, and 3M NOVEC 2202 ELECTRONIC GRADE COATING, available from 3M Company (St. Paul, MN).

In some embodiments, fluorinated organosilane compounds are utilized to provide a low surface energy layer. Fluorinated organosilane compounds that are suitable are described in U.S. Pat. Appl. Pub. No. 2013/0229378 (Iyer et al.), and include those monopodal fluorinated organosilane compounds that include (a) a monovalent segment selected from polyfluoroalkyl moieties, polyfluoroether moieties, polyfluoropolyether moieties, and combinations thereof (preferably, polyfluoropolyether) and (b) a monovalent endgroup including at least one silyl moiety (preferably, one to about 20; more preferably, one to about 5; most preferably, one or two) including at least one group selected from hydrolyzable groups.

The term "hydrolysable group" in connection with the present description refers to a group which either is directly capable of undergoing condensation reactions under appropriate conditions or which is capable of hydrolyzing under appropriate conditions, thereby yielding a compound which is capable of undergoing condensation reactions. Examples of hydrolysable groups include but are not limited to hydroxyl, halogen groups, such as chlorine, bromine, iodine or fluorine, alkoxy groups (i.e. —OR'), acyloxy groups (i.e. —O(O)CR'), amido groups (i.e. —NR'$_2$), oxime groups (—O—N═CR'$_2$) and thiolato groups (SR'), where R' can be H, alkyl, or aryl.

As used herein, the terms "alkyl" and the prefix "alk" are inclusive of both straight chain and branched chain groups and of cyclic groups, e.g., cycloalkvl. Unless otherwise specified, these groups contain from 1 to 20 carbon atoms. In some embodiments, these groups have a total of up to 10 carbon atoms, up to 8 carbon atoms, up to 6 carbon atoms, or up to 4 carbon atoms. Cyclic groups can be monocyclic or polycyclic and preferably have from 3 to 10 ring carbon atoms.

The term "nonopodal" refers to a molecule that has one silane group per molecule, with the silane group comprising at least one hydrolysable group.

The term "multipodal" refers a molecule that has more than one silane group per molecule, with each silane group comprising at least one hydrolysable group.

The term "alkylene" is the divalent form of the "alkyl" groups defined above.

Unless otherwise indicated, the term "halogen" refers to a halogen atom or one or more halogen atoms, including chlorine, bromine, iodine, and fluorine atoms.

The term "ay" as used herein includes carbocyclic aromatic rings or ring systems optionally containing at least one heteroatom. Examples of aryl groups include phenyl, naphthyl, biphenyl, and pyridinyl.

The term "arylene" is the divalent form of the "aryl" groups defined above.

The term "carbamate" refers to the group —O—C(O)—N(R')— wherein R' is as defined above.

The term "ureylene" refers to the group —N(R')—C(O)—N(R')— wherein R' is as defined above.

The term "substituted aryl" refers to an aryl group as defined above, which is substituted by one or more substituents independently selected from the group consisting of $C_{1-4}$ alkyl, $C_{1-4}$ alkoxy, halogen, hydroxy, amino, and nitro.

The monopodal and multipodal fluorinated organosilane compounds can be used in combination. When the monovalent and/or multivalent segments of the compounds are partially fluorinated rather than perfluorinated, preferably not more than one atom of hydrogen is present for every one carbon atom, more preferably not more than one atoms of hydrogen is present per two carbon atoms, or most preferably not more than two atoms of hydrogen is present per four carbon atoms in the segment.

Suitable fluorinated organosilane compounds also include those multipodal fluorinated organosilane compounds that include (a) a multivalent (preferably, divalent) segment selected from polyfluoroalkylene, polyfluoroetheralkylene, polyfluoropolyetheralkylene, and combinations thereof (preferably, polyfluoropolyetheralkylene) and (b) at least two monovalent endgroups, each monovalent endgroup independently including at least one silyl moiety (preferably, one to about 20; more preferably, one to about 5; most preferably, one or two) including at least one group selected from hydrolyzable groups, hydroxyl, and combinations thereof.

The monovalent and/or multivalent segments are generally comprised of polyfluorocarbon, polyfluoroether, and polyfluoropolyether moieties. The monovalent and/or multivalent segments of the fluorinated organosilane compounds are preferably perfluorinated. Preferably, the monovalent segment of the monopodal compounds include perfluoroalkyl, perfluoroetheralkyl, perfluoropolyetheralkyl, or a combination thereof (more preferably, perfluoroalkyl, perfluoropolyetheralkyl, or a combination thereof, most preferably, perfluoropolyetheralkyl), and/or the multivalent segment of the multipodal compounds includes perfluoroalkylene, perfluoroetheralkylene, perfluoropolyetheralkylene, or a combination thereof (more preferably, perfluoroalkylene, perfluoropolyetheralkylene, or a combination thereof, most preferably, perfluoropolyetheralkylene).

Useful fluorinated organosilane compounds are described in U.S. Pat. No. 8,158,264 (David et al.); and U.S. Pat. No. 9,296,918 (Olson et al.), for example. Fluorinated organosilane compounds may be described by the Formula (I) $R_f[Q-(C(R)_2—Si(Y)_{3-x}(R^{1a})_x)_y]_z$, where $R_f$ is a monovalent or multivalent segment comprised of polyfluorocarbon, polyfluoroether, and polyfluoropolyether moieties, or combinations thereof, Q is a polyvalent (e.g., an organic divalent or trivalent) linking group; each Y is independently a hydrolyzable group; $R^{1a}$ is an alkyl group or aryl group; x is 0 or 1 or 2; y is 1 or 2, and z is 1, 2, 3, or 4.

For certain embodiments, including any one of the above embodiments of Formula I, the monovalent or multivalent polyfluoropolyether segment, $R_f$, comprises perfluorinated repeating units selected from the group consisting of —($C_nF_{2n}$)—, —($C_nF_{2n}$O)—, —(CF(Z))—, —(CF(Z)O)—, —(CF(Z)$C_nF_{2n}$O)—, —($C_nF_{2n}$CF(Z)O)—, —(CF$_2$CF(Z)O)—, and combinations thereof; Z is a perfluoroalkyl group, an oxygen-containing perfluoroalkyl group, a perfluoroalkoxy group, or an oxygen-substituted perfluoroalkoxy group, each of which can be linear, branched, or cyclic, and have 1 to 9 carbon atoms and up to 4 oxygen atoms when oxygen-containing or oxygen-substituted; and n is an integer from 1 to 12. Being oligomeric or polymeric in nature, these compounds exist as mixtures and are suitable for use as such. The perfluorinated repeating units may be arranged randomly, in blocks, or in an alternating sequence. For certain of these embodiments, the polyfluoropolyether segment comprises perfluorinated repeating units selected from the group consisting of —($C_nF_{2n}O$)—, —(CF(Z)O)—, —(CF(Z)$C_nF_{2n}O$)—, —($C_nF_{2n}$CF(Z)O)—, —($CF_2$CF(Z)O)—, and combinations thereof. For certain of these embodiments, n is an integer from 1 to 12, 1 to 6, 1 to 4, or 1 to 3.

For certain embodiments, including any one of the above embodiments, $R_f$ is monovalent, and z is 1. For certain of these embodiments, $R_f$ is terminated with a group selected from the group consisting of $C_nF_{2n+1}$—, $C_nF_{2n+1}$O—, and X'$C_nF_{2n}$O— wherein X' is a hydrogen or chlorine atom. For certain of these embodiments, the terminal group is $C_nF_{2n+1}$— or $C_nF_{2n+1}$O— wherein n is an integer from 1 to 6 or 1 to 3. For certain of these embodiments, the approximate average structure of $R_f$ is $C_3F_7O(CF(CF_3)CF_2O)_pCF(CF_3)$— or $CF_3O(C_2F_4O)_pCF_2$— or wherein the average value of p is 3 to 50. In certain of these embodiments, the structure of $R_f$ is $CF_3(CF_2)_o$— where o is 0-5.

For certain embodiments, including any one of the above embodiments except where $R_f$ is monovalent, $R_f$ is divalent, and z is 2. For certain of these embodiments, $R_f$ is selected from the group consisting of —$CF_2O(CF_2O)_m(C_2F_4O)_pCF_2$—, —CF($CF_3$)—($OCF_2CF(CF_3)$)$_pO$—$R_f'$—O(CF($CF_3$)$CF_2O)_pCF(CF_3)$—, —$CF_2O(C_2F_4O)_pCF_2$—, and —($CF_2)_3O(C_4F_8O)_p(CF_2)$—, and wherein $R_f'$ is a divalent, perfluoroalkylene group containing at least one carbon atom and optionally interrupted in chain by O or N, m is 1 to 50, and p is 3 to 40. For certain of these embodiments, $R_f'$ is ($C_nF_{2n}$), wherein n is 2 to 4. For certain of these embodiments, $R_f$ is selected from the group consisting of —$CF_2O(CF_2O)_m(C_2F_4O)_pCF_2$—, —$CF_2O(C_2F_4O)_pCF_2$—, and —CF($CF_3$)—($OCF_2CF(CF_3)$)$_pO$—($C_nF_{2n}$)—O(CF($CF_3$)$CF_2O)_pCF(CF_3)$— and wherein n is 2 to 4, and the average value of m+p or p+p or p is from about 4 to about 24.

The above described polyfluoropolyether silanes typically include a distribution of oligomers and/or polymers, so p and m may be non-integral. The above structures are approximate average structures where the approximate average is over this distribution. These distributions may also contain perfluoropolyethers with no silane groups or more than two silane groups. Typically, distributions containing less than about 10% by weight of compounds without silane groups can be used.

The organic polyvalent (e.g., divalent or trivalent) linking group, Q, can include linear, branched, or cyclic structures, that may be saturated or unsaturated. The organic divalent or trivalent linking group, Q, optionally contains one or more heteroatoms selected from the group consisting of sulfur, oxygen, silicon, and nitrogen, and/or optionally contains one or more functional groups selected from the group consisting of esters, amides, amines, sulfonamides, carbonyl, carbonates, ureylenes, and carbamates. Q includes not less than 1 carbon atoms and not more than about 25 carbon atoms. Q is preferably substantially stable against hydrolysis. When more than one Q groups are present, the Q groups can be the same or different.

For certain embodiments, including any one of the above embodiments, Q includes organic linking groups such as —C(O)N(R)—$(CH_2)_k$—, —C(O)N[$(CH_2)_k$]—, —S(O)$_2$N(R)—$(CH_2)_k$—, —S(O)$_2$N[$(CH_2)_k$]$_2$—, —$(CH_2)_k$—, —$CH_2$O—$(CH_2)_k$—, —C(O)S—$(CH_2)_k$—, —$CH_2$OC(O)N(R)—$(CH_2)_k$—, C(O)N(R)—$(CH_2)_k$—OC(O)N(R)—$(CH_2)_k$—, —C(O)N(R)—$(CH_2)_k$—N(R)—$(CH_2)_k$— and wherein R is hydrogen or $C_{1-4}$ alkyl, and k is 2 to about 25. For certain of these embodiments, k is 2 to about 15 or 2 to about 10.

In some preferred embodiments, a polyfluoropolyether silane can be utilized which has the formula $R_f[Q-(C(R)_2—Si(Y)_3—X(R^{1a})_x)_y]_z$, where $R_f$ is a divalent polyfluoropolyether of the formula —$CF_2$—($OCF_2CF_2)_m(OCF_2)_p$—$OCF_2$—, Q=C(O)NH$CH_2CH_2$, R=H, Y=$OCH_3$, m is 1 to 50, p is 3 to 40, x=0, y=1, and z=2. Such polyfluoropolyether silanes are available from 3M Company under the tradenames 3M EASY CLEAN COATING ECC-1000, 3M EASY CLEAN COATING ECC-4000, or 3M NOVEC 1720 ELECTRONIC GRADE COATING, for example. A particularly useful form of this type of polyfluoropolyether silane is $(CH_3O)_3Si(CH_2)_3NHCOCF_2(OCF_2CF_2)_{9-10}(OCF_2)_{9-10}OCF_2CONH(CH_2)_3Si(OCH_3)_3$.

In some embodiments, a perfluoroalkyl silane can be utilized which has the formula $R_f[Q-(C(R)_2—Si(Y)_{3-x}(R^{1a})_x)_y]z$, where $R_f$ is perfluoroalkyl, Q=$CH_2$, R=H, Y=$OCH_3$, $R^{1a}$=Methyl, x=0, y=1, and z=1. A specific example of this type of perfluoroalkylsilane is $C_4F_9CH_2CH_2Si(OCH_3)_3$.

In some embodiments, a perfluoroalkyl silane can be utilized which has the formula $R_f[Q-(C(R)_2—Si(Y)_{3-x}(R^{1a})_x)_y]_z$, where $R_f$ is perfluoroalkyl, Q=$CH_2$, R=H, Y=N($CH_3$)$_2$, x=0, y=1, and z=1. A specific example of this type of perfluoroalkylsilane is $C_4F_9CH_2CH_2Si(N(CH_3)_2)_3$.

In some preferred embodiments, a silane can be utilized which has the formula $R_f[Q-(C(R)_2—Si(Y)_{3-x}(R^{1a})_x)_y]_z$, where $R_f$ is perfluoroether with the formula F(CF($CF_3$)$CF_2O)_nCF(CF_3)$—, where a averages 4-120, Q=C(O)NH$CH_2CH_2$, R=H, Y=$OCH_3$, x=0, y=1, and z=1. A specific example of this type of perfluoroether silane is $C_3F_7O[CF(CF_3)CF_2O]_6CF(CF_3)C$—(O)NH$CH_2CH_2CH_2Si(OMe)_3$.

In the some embodiments, a silane can be utilized which has the formula Rf[Q-(C(R)$_2$—Si(Y)$_{3-x}$($R^{1a}$)$_x$)$_y$]$_z$, where Rf is perfluoroether with the formula $CF_3$—(CF($CF_3$)$CF_2O)_aCF(CF_3)$— where a averages 4-120, Q=$CH_2OCH_2CH_2$, R=H, Y=$OCH_3$, x=0, y=1, z=1. A specific example of this type of perfluoroether silane is $C_3F_7O[CF(CF_3)CF_2O]_{40}CF(CF_3)$—$CH_2OCH_2CH_2CH_2Si(OMe)_3$.

In some preferred embodiments, a covalently crosslinked fluorinated polymeric layer is disposed on the nanostructured substrate. In some embodiments, this polymeric layer is preparable from a composition including a fluorinated silane (e.g., disilane) compound (e.g. a crosslinkable fluoropolymer with silane terminal group(s)). In some embodiments, the polymeric layer is preparable from a composition comprising a fluoropolymer comprising at least one hydrolysable terminal silane group. In some embodiments, the polymeric layer is preparable from a composition including a fluoropolymer having at least two trialkoxysilane terminal groups. In some preferred embodiments, the fluoropolymer has two trialkoxysilane terminal groups. In some embodiments, the composition is coated onto the nanostructured surface and the fluoropolymer is then crosslinked to form the covalently crosslinked fluorinated polymeric layer. In some embodiments, the fluorinated disilane compound or the fluoropolymer having at least two trialkoxysilane terminal groups is a perfluoropolyether (PFPE) amido silane compound. Such compounds are described in U.S. Pat. No. 8,158,264 (David et al.). In some embodiments, the Young's modulus (e.g., at 25° C.) of the fluorinated and/or a low surface energy layer is at least 1 MPa, or at least 5 MPa, or at least 10 MPa, or at least 50 MPa. In some embodiments, the Young's modulus (e.g., at 25° C.) of the fluorinated and/or a low surface energy layer is no more than 1000 MPa, or no more than 500 MPa, or no more than 200 MPa, or no more than 100 MPa. For example, the Young's modulus may be in a range from 1 MPa to 100 MPa, or a range of 5 MPa to 500 MPa, or in a range of 10 MPa to 200 MPa. The modulus of the fluorinated and/or a low surface energy layer can be measured by nanoindentation, for example.

In some preferred embodiments, the fluorinated and/or low surface energy layer (e.g., a covalently crosslinked fluorinated polymeric layer) has a fluorine concentration of at least 5/a, or at least 15%, or at least 25%, or at least 40%, or at least 50% on an atomic basis. In some preferred embodiments, the fluorinated and/or low surface energy layer (e.g., a covalently crosslinked fluorinated polymeric layer) has a fluorine concentration of at least 10% wt, or at least 20 wt %, or at least 35 wt %, or at least 50 wt %.

In some preferred embodiments, the fluorinated and/or low surface energy layer includes a silane condensation cure catalyst. The silane condensation cure catalyst may be included to accelerate the silane hydrolysis and/or crosslinking reaction and is especially useful for substrates which should not be subjected to high temperatures. The silane condensation cure catalyst can affect the physical properties of the article, such as fluid contact angles, and resistance to abrasion. Said another way, the choice of the silane condensation cure catalyst can be tuned to the particular fluorinated silane compound in order to optimize the performance of the article, such as the resistance to abrasion. The catalyst is typically used in amounts between about 0.01 and 10 wt % of the coating composition (not including solvents), more preferably between 0.05 and 5 wt %, and most preferably between 0.1 wt % and 5 wt %.

In some embodiments, the catalyst is an acid. Suitable acid catalysts include acetic acid, chloroacetic acid, dichloroacetic acid, trichloroacetic acid, trifluoroacetic acid, citric acid, formic acid, triflic acid, perfluorobutylsulfonic acid, dinonylnaphthalene sulfonic acid, dinonylnaphthalene disulfonic acid, perfluorobutyric acid, p-toluenesulfonic acid, dodecylsulfonic acid, dodecylbenzenesulfonic acid, benzenesulfonic acid, methanesulfonic acid, sulfuric acid, hydrochloric acid, phosphoric acid, and nitric acid, for example. The catalyst can also be of a lewis acid nature, such as boron compounds such as boron trifluoride, boron tribromide, triphenylborane, triethylborane, and tris(pentafluorophenyl) borane, for example.

In some embodiments the catalyst can be a base. Examples of useful base catalysts include alkali metal hydroxides, tetraalkylammonium hydroxides, ammonia, hydoxylamine, imidazole, pyridine, N-methylimidazole, diethylhydroxylamine, and amine compounds. Especially useful are the strong neutral organic bases consisting of amidines, guanidines, phosphazenes, proazaphosphatranes, as described in U.S. Pat. No. 9,175,188 B2 (Buckanin et. al).

In some embodiments, the catalyst can be organometallic compounds. Suitable catalysts include carboxylates, acetyl acetonates, and other chelates of Sn, Al, Bi, Pb, Zn, Ca, V, Fe, Ti, K, Ba, Mn, Ni, Co, Ce, and Zr, for example. Specific examples include dibutyl tin dilaurate, dibutyl tin diacetate, dibutyl tin dichloride, dibutyl tin dibromide, dibutyl tin bis(acetylacetonate), dibutyl tin dioxide, dibutyl tin dioctoate, tin (II) octoate, tin (II) neodecanoate, tetraisopropoxy titanium, tetra-n-butoxytitanium, titanium tetrakis(2-ethylhexoxy), triethanolamine titanate chelate, titanium diisopropoxide (bis-2,4-pentanedionate), aluminum tris(acetylacetonate), aluminum titanate, zinc ethylhexanoate, K-Kat 670 (King Industries, Norwalk CT).

In some embodiments, the product of the hydrolysis reaction can be the catalyst. In some embodiments, a perfluoroalkyl silane can be utilized which has the formula $Rf[Q-(C(R)_2-Si(Y)_{3-x}(R^{1a})_x)_y]_z$, where $R_f$ is perfluoroalkyl, $Q=CH_2$, $R=H$, $Y=N(CH_3)_2$, $R^{1a}=$Methyl, $x=2$, $y=1$, and $z=1$. In this case, $HN(CH_3)_2$ is the reaction product of the perfloroalkyl silane and water, and the $HN(CH_3)_2$ can serve as a condensation catalyst since it is a base.

The fluorinated compositions can be deposited using known coating methods such as dip coating or slot-die coating. In some embodiments, the fluorinated composition is vapor deposited.

If using vapor deposition, the conditions under which the fluorinated composition can be vaporized during chemical vapor deposition can vary according to the structures and molecular weights of the fluorinated compounds. For certain embodiments, the vaporizing can take place at pressures less than about 1.3 Pa (about 0.01 torr), at pressures less than about 0.013 Pa (about 10-4 torr), or even at about 0.0013 Pa to about 0.00013 Pa (about 10-5 torr to about 10-6 torr). For certain of these embodiments, the vaporizing can take place at temperatures of at least about 80° C., at least about 100° C., at least about 200° C., or at least about 300° C. Vaporizing can include imparting energy by, for example, conductive heating, convective heating, and/or microwave radiation heating.

The first nanostructures may be formed on a polyurethane layer as described further elsewhere herein. The polyurethane layer may be a (top) layer of a multilayer film. The polyurethane layer or multilayer film including a polyurethane layer can be made using known techniques. Examples of making a polymeric film include, for example, melt extrusion, melt blowing, or reacting/crosslinking monomeric species. Film manufacturing methods are described in U.S. Pat. No. 8,765,263 (Ho et al.) and U.S. Pat. Appl. Pub. No. 2017/0107398 (Ho et al.), for example.

In some embodiments, a film (e.g., without a polyurethane layer) is prepared and then a polyurethane layer is applied to the film as a coating, cured and then etched to form nanostructures. In some embodiments, a polyurethane solution is coated onto a structural member (e.g., an injection molded part), cured and then etched to form nanostructures.

In some embodiments, a polyurethane film (e.g., a covalently crosslinked shape memory polyurethane) is prepared and then a coating (e.g., a fluorinated polyurethane hard coat solution) is applied to the film, cured and then etched to form nanostructures.

In some embodiments, the nanostructured article includes two or more polyurethane layers. For example, the nanostructures can be formed on a first polyurethane layer that is coated onto a second polyurethane layer. The first and second polyurethane layers may have different properties (e.g., different glass transition temperatures, different crosslinking concentrations, and/or different loss tangents). In some embodiments, each of the first and second polyurethane layers may be a crosslinked polyurethane, a crosslinked polyurethane acrylate, or a crosslinked polyurethane and polyacrylate blend. The description of polyurethane layers described herein may apply to either or both of the first and second polyurethane layers in embodiments where first and second polyurethane layers are included. In embodiments, where more than two polyurethane layers are included in a nanostructured article, the description of polyurethane layers provided herein may apply to any one, or more, or all of the polyurethane layers.

Figure 13:
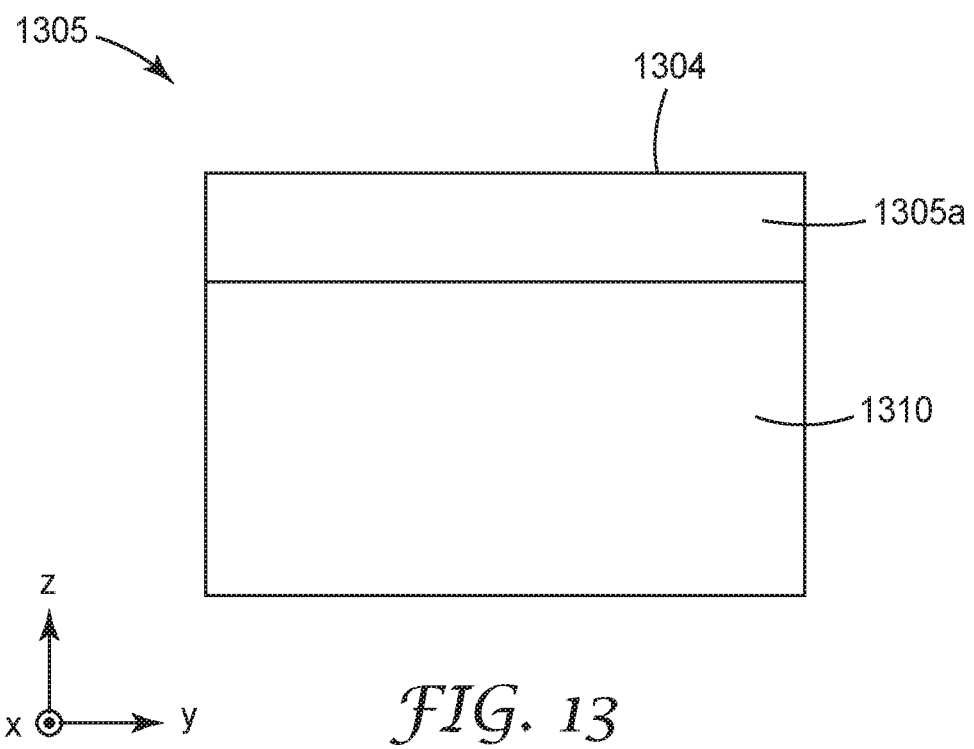
FIGS. 13-15 are schematic cross-sectional views of substrates.

FIG. 13 is a schematic cross-sectional view of a substrate 1305 that can be used to form a nanostructured article by nanostructuring the outer major surface 1304 of the first layer 1305a. The first layer 1305a is disposed on a second layer 1310. In some embodiments, at least one of the first and second layers 1305a and 1310 is a polyurethane layer described herein. In some embodiments, the first layer 1305a includes or is formed from a first polyurethane described herein and the second layer 1310 includes or is formed from a second polyurethane described herein. The first and second polyurethanes may have different compositions and different mechanical properties. For example, the first polyurethane may have a higher crosslinking density and the second polyurethane may have a lower crosslinking density. The first polyurethane may have a crosslinking density in a range of 0.6 to 1.2 mol/kg or 0.65 to 1.05 mol/kg and the second polyurethane may have a crosslinking density in a range of 0.2 to 0.65 mole/kg or 0.35 to 0.65 mol/kg, for example. In some embodiments, the first layer 1305a is a covalently crosslinked polyurethane hardcoat and the second layer 1310 is a covalently crosslinked shape memory polyurethane. Useful polyurethane hardcoats are described in International Appl. Nos. US2019/012677 and IB2018/059725. In some embodiments, the first layer 1305a is a covalently crosslinked urethane acrylate and the second layer 1310 is a covalently crosslinked aliphatic polyurethane. In some embodiments, the first layer 1305a and the second layer 1310 are each covalently crosslinked shape memory polyurethanes. In some embodiments, the first layer 1305a is fluorinated.

Figure 14:
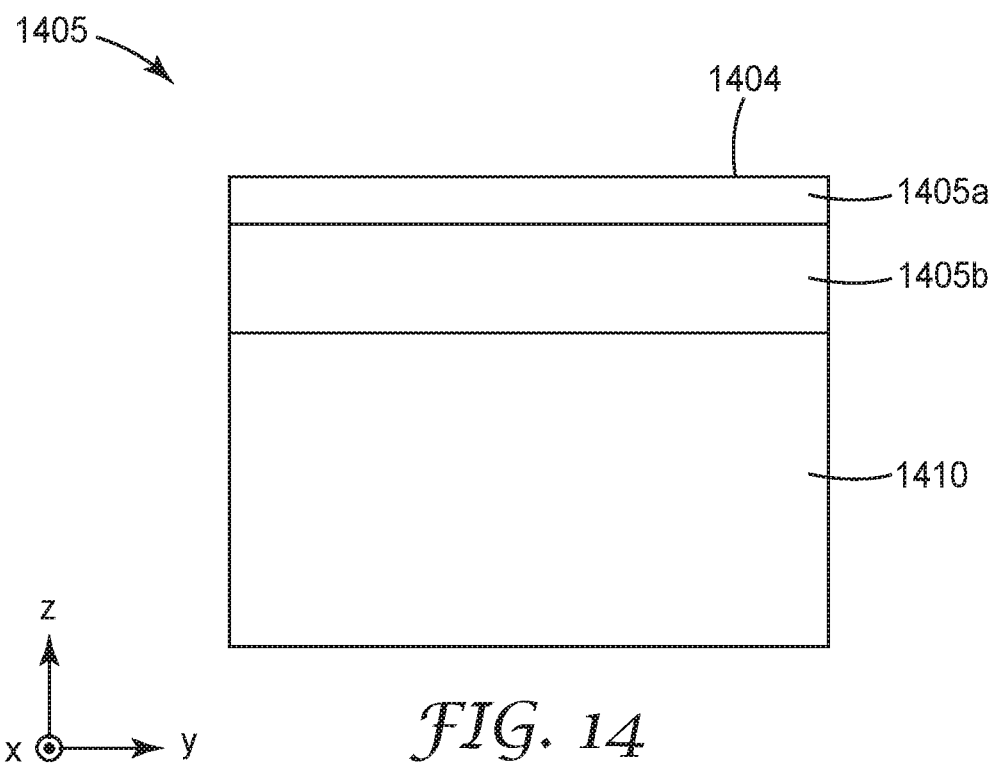

FIG. 14 is a schematic cross-sectional view of a substrate 1405 that can be used to form a nanostructured article by nanostructuring the outer major surface 1404 of the first layer 1405a. The first layer 1405a is disposed on a second layer 1405b which is disposed on a third layer 1410. Layers 1405b and 1410 may be as described for layers 1305a and 1310, respectively. Layer 1405a may be a fluorinated coating (e.g., a fluorinated polyurethane) applied to layer 1405b. In some embodiments, each of the layers 1405a, 1405b and 1410 is a polyurethane layer. In some such embodiments or in other embodiments, the layers 1405a, 1405b and 1410 have different compositions. In some embodiments, the first layer 1405a has a fluorine concentration of at least 2.5%, or at least 5%, or at least 10%, or even at least 20% on an atomic basis. In some embodiments, the first layer 1405a has a fluorine concentration of at least 5%, or at least 10 wt %, or at least 20 wt %, or at least 30 wt %. In some such embodiments or in other embodiments, the second and third layers 1405b and 1410 are not fluorinated or have a fluorine concentration of less than 3% on an atomic basis. In some embodiments, the first layer 1405a is a fluorinated polyurethane hardcoat.

Additional layers can optionally be included between the first and second layers 1305a and 1310 or between the second and third layers 1405b and 1410.

Figure 15:
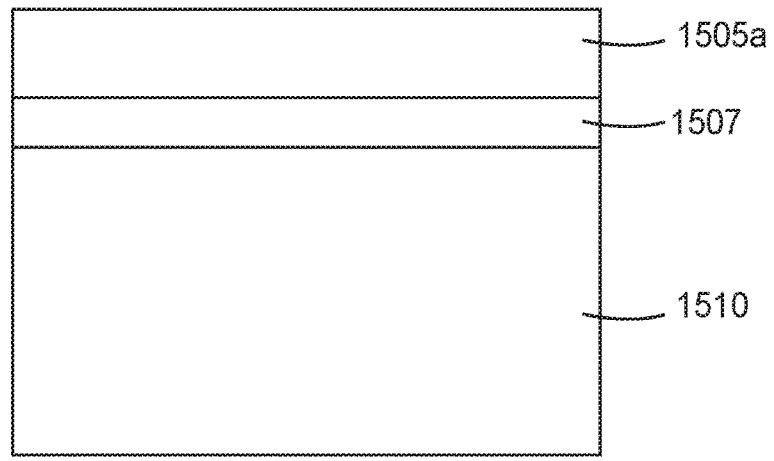

FIG. 15 is a schematic cross-sectional view of a substrate 1505 including first and second layers 1505a and 1507. In the illustrated embodiment, the substrate 1505 further includes an optional third layer 1510. A plurality of first nanostructures may be integrally formed with at least the first layer 1505a as described further elsewhere herein. The layers 1505a and 1510 may correspond to the layers 1305a and 1310 described elsewhere. In some embodiments, the second layer 1507 is electrically conductive. In some embodiments, the second layer 1507 has a sheet resistance of less than $10^{10}$ ohms/sq, or less than $10^6$ ohms/sq, or less than 1000 ohms/sq, or less than 100 ohms/sq. In some embodiments, the second layer 1507 has a sheet resistance in range of 50 ohms/sq to 1000 ohms/sq or to $10^6$ ohms/sq or to $10^8$ ohms/sq. In some embodiments, the second layer 1507 is a substantially transparent antistatic layer. In some embodiments, the second layer 1507 has an antistatic property such that a nanostructured article formed on the substrate 1505 has a charge decay time of less than 10 seconds, or less than 5 seconds or less than 2 seconds, less than 1 second, or even less than 0.5 seconds. The charge decay time can be determined according to the MIL-STD 3010, Method 4046, formerly known as the Federal Test Method Standard 10113, Method 4046, "Antistatic Properties of Materials", for example.

Articles, such as optical articles that typically are composed of electrically insulating materials, may tend to get charged with static electricity. The charges which are present at the surface of the article creates an electrostatic field capable of attracting and fixing small particles (e.g., dust and/or water droplets) moving near the charged surface. An antistatic layer (also referred to as an antistat layer) can be included in the article to induce a high mobility of the charges. This can decrease the number of static charges which are present at the surface of the article which would decrease the intensity of the electrostatic field, thereby decreasing attraction of the particles to the surface.

"Antistatic" generally refers to the property of not retaining and/or developing an appreciable electrostatic charge. An article may be considered to have desired antistatic properties when it does not attract or fix dust or small particles after one of its surfaces has been rubbed with an appropriate cloth. The ability of an article to evacuate a static charge can be quantified by measuring the time for the charge to dissipate (charge decay time). Antistatic optical articles may have a discharge time of less than 1 second (e.g., the discharge time may be on the order of 100-200 milliseconds), while static optical articles have a discharge time on the order of several tens seconds, sometimes even several minutes. A static article having just been rubbed can thus attract surrounding dust particles, for example, until the discharge time has passed.

The charge decay time can be determined using the following method. Sheets of test materials can be cut into 12 cm by 15 cm samples and conditioned at relative humidity (RH) of about 50% for at least 12 hours. The materials can be tested at temperatures that ranged from 22 to 25° C. The static charge dissipation time can be measured according to MIL-STD 3010, Method 4046, using an ETS Model 406D Static Decay Test Unit (manufactured by Electro-Tech Systems, Inc.). This apparatus induces an initial static charge (Average Induced Electrostatic Charge) on the surface of the flat test material by using high voltage (5000 volts), and a field meter allows observation of the decay time of the surface voltage from 5000 volts (or whatever the induced electrostatic charge was) to 10 percent of the initial induced charge. This is the static charge dissipation time. The lower the static charge dissipation time, the better the antistatic properties are of the test material.

Transparent antistatic coatings may be obtained by vapor deposition of metals or metal-oxides like indium tin oxide or vanadium oxide. Other transparent conductive layers can also be used to provide antistatic properties. Coated Silver nanowire coatings and patterned nanowire coatings can be used. Patterned metal mesh coatings may be used as well. Patterned conductive coating may also have the benefit of being used for resistive heating elements in addition to having antistatic properties.

Antistatic coatings may be applied by wet route, i.e., by applying a flowable composition that is subsequently cured. Antistatic properties in such coatings are typically obtained by incorporation of specific additives into an aqueous based composition (e.g., a hard coating composition). Conductive polymers, for example, may be used as the additives in wet coatings.

These polymers can build a percolating network allowing for charge dissipation. A useful transparent conductive polymer is poly(3,4-ethylenedioxythiophene) (PEDOT) which can be modified to be added in aqueous compositions, which can be desirable for environmental and health reasons. For example, PEDOT can be grafted with Poly Styrene Sulfonate (PSS), allowing for good dispersion in water. To further enhance conductivity, various additives may be used such as sulfonate surfactant as described in U.S. Pat. Appl. Pub. No. 2011/0248223 (Zheng), for example. Other conductive additives like carbon nanotubes can also be used.

Another method to provide electrical conductivity in aqueous based compositions is to incorporate very light charge holders, such as positively charged lithium cations, in the composition.

Another approach to proving a substantially transparent electrically conductive layer is to include an ionic liquid in a polymeric layer as described in JP Pat. Appl. Pub. No. 2008/184556, for example.

Another approach to proving a substantially transparent electrically conductive layer is to include a polymerizable onium salt as described in U.S. Pat. Appl. Pub. Nos. 2012/0225301 (Hunt et al.) or 2012/0288675 (Klun et. al.), for example.

The nanostructure article may optionally include other layers. The substrate may be or include a multilayer film. In some embodiments, the multilayer film includes at least a polyurethane layer and an adhesive layer. In some such embodiments, the adhesive layer may bond the nanostructured article to an exterior surface. In some embodiments, the multilayer film includes layers corresponding to layers 1405a and 1405b and/or includes a layer corresponding to the layer 1507 and/or includes an additional polymeric layer.

Figure 16:
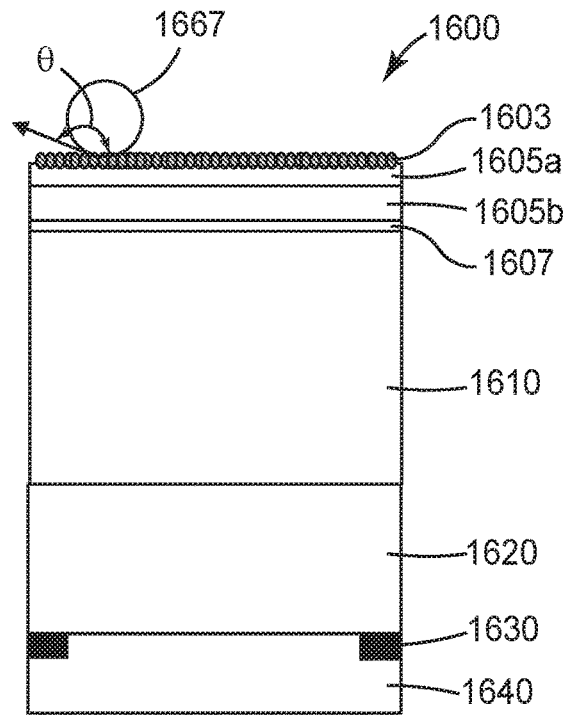
FIG. 16 is a schematic cross-sectional view of a nanostructured article including a multilayer film substrate.

FIG. 16 is a schematic cross-sectional view of a nanostructured article 1600 including a plurality of nanostructures 1603 disposed on a multilayer film substrate. A contact angle θ (e.g., advancing, static, or receding) of a droplet 1667 (e.g., a water or hexadecane droplet) with the nanostructured surface is schematically illustrated. The nanostructures 1603 may correspond to first or second nanostructures described elsewhere herein. The nanostructured article 1600 may be a flexible film. The substrate may be regarded as the stack of layers under the nanostructures 1603, or the layer 1605a and optionally one or more additional layers under the layer 1605a may be regarded as the substrate and the remaining layers may be regarded as additional layers disposed on the substrate. The layers 1605a and 1605b may correspond to layers 1405a and 1405b described elsewhere. In other embodiments, the layers 1605a and 1605b may be replaced by a single layer which may, for example, correspond to layer 1305a described elsewhere. The layer 1607, which may be omitted in some embodiments, may correspond to layer 1507 and may be a substantially transparent antistatic layer, for example. The layer 1610 may correspond to any of layers 1310, 1410 or 1510, for example, and may be a polyurethane layer as described elsewhere herein. Any of the layers 1310, 1410, 1510, or 1610 may be one or more of a covalently crosslinked aliphatic urethane layer, a covalently crosslinked urethane acrylate layer, a covalently crosslinked shape memory layer, or an energy dissipation layer.

The thickness of the layers 1605a or 1605b or a combined thickness of the layers 1605a and 1605b may be in a range of 1 to 50 micrometers, or 2 to 20 micrometers, or 3 to 13 micrometers, for example. The thickness of the layers 1610 or 1620 or a combined thickness of the layers 1610 and 1620 may be in a range of 50 to 500 micrometers, or to 200 micrometers, or to 150 micrometers, or to 100 micrometers, for example. The thickness of the layer 1607 may be in a range of 50 nm to 1 micrometer, or 80 nm to 500 nm, or 80 nm to 200 nm, for example.

The layer 1620 may have a yield stress value greater than 70 MPa, or greater than 90 MPa, or greater than 120 MPa, or greater than 160 MPa. The yield stress in this context refers to the 0.2% offset yield stress and can be determined according to the ASTM D638-14 test standard, for example. The layer 1620 may be formed of any useful polymeric material that provides the desired mechanical properties (such as dimensional stability) and optical properties (such as light transmission and clarity). Examples of materials suitable for use in the layer 1620 include polymethylmethacrylate, polycarbonate, polyamides, polyimide, polyesters (e.g., polyethylene terephthalate (PET), polyethylene naphthalate (PEN)), polycyclic olefin polymers, and thermoplastic polyurethanes. One useful polymeric material for forming the layer 1620 is polyimide. In some embodiments the polyimide substrate layer is colorless or substantially colorless. Colorless polyimide can be formed via chemistry or via nanoparticle incorporation. Some exemplary colorless polyimides formed via chemistry are described in U.S. Pat. Appl. Pub. No. 2015/0322223 (Woo et al.), for example. In some cases, the layer 1620 may include a multilayer optical film construction which has desired optical functions or properties. For example, the optical film may include a wavelength selective filter. In cases where transparency over the visible range is not desired, the layer 1620 may be or include a colored film that may be partially transparent or non-transparent film. For example, the film may be a white or colored film.

The layer 1620 may be primed or treated to impart some desired property to one or more of its surfaces. For example, the layer 1620 can be primed to improve adhesion to the layer 1620 or to the layer 1640 which may bean optically clear adhesive layer. Examples of such treatments include corona, flame, plasma and chemical treatments such as, acrylate or silane treatments.

The layer 1640, which may be omitted in some embodiments, may be an adhesive layer which may be one or more of an optical adhesive layer, a pressure sensitive adhesive layer, or a hot melt adhesive layer. The adhesive may be formed of acrylate, silicone, silicone polyoxamide, silicone polyurea, polyolefin, polyester, polyurethane or polyisobutylene. In some cases, the adhesive layer used in conjunction with a sensor assembly, or with a surface to be protected, may be a self-wetting layer adapted to wet out to the surface to which it is attached. In some cases, the nanostructured article may be attached to a surface using a liquid adhesive layer that may or may not cure following application. Release liners may be disposed on the outer major adhesive surface of any nanostructured article including an adhesive layer. The release liners may also be referred to as premask layers that may be easily removed for application to a surface.

In some embodiments, the adhesive layer may have high transmittance and low haze with respect to one or more specific wavelengths of electromagnetic radiation, e.g. visible radiation (visible light), infrared radiation, ultraviolet radiation, sound and radio waves. In some embodiments, the adhesive layer may be wavelength selective (e.g., the adhesive layer may include dyes and/or pigments).

In some embodiments, the transmittance of the nanostructured article 1600 to one or more radiation wavelengths may be at least 80%, at least 85%, at least 90%, or at least 92%. For example, in some embodiments, the transmittance of the nanostructured article 1600 with respect to visible light (average optical transmittance) may be in any of these ranges. In some embodiments, it is a benefit to have the nanostructured article 1600 to maintain a haze measurement of less than 5%, less than 3%, less than 2%, or even less than 1% with respect to one or more specific wavelengths of electromagnetic radiation. In some embodiments, the haze of the nanostructured article 1600 with respect to visible light (optical haze) may be less than 5%, less than 3%, less than 2%, or even less than 1%. In some embodiments, it is a benefit to have the nanostructured article 1600 to maintain a clarity measurement of at least 95%, at least 98%, or at least 99% with respect to one or more specific wavelengths of electromagnetic radiation. In some embodiments, the clarity of the nanostructured article 1600 with respect to visible light (optical clarity) may be at least 95%, at least 98%, or at least 99%. In some embodiments, the average optical transmittance, optical haze and/or optical clarity is in any of these ranges after the nanostructured surface of the nanostructured article 1600 has been abraded for 10 cycles at a rate of 60 cycles/min with an AATCC (American Association of Textile Chemists and Colorists) Crockmeter Standard Rubbing Cloth using a 1-inch diameter circular abrading head and a 350 g force, as described further in the Examples. The nanostructured surface may have contact angles (advancing or receding, for water or for hexadecane) in any of the ranges described elsewhere herein, and/or water roll-off angles in any of the ranges described elsewhere herein, before and after it has been abraded.

In some cases, an optional additional border print material 1630 may be included. In the illustrated embodiment, the border print material 1630 is disposed between the layers 1620 and 1640. For example, the border print material 1630 may be printed onto layer 1620 before adhesive layer 1640 is applied. In other embodiments, the layer 1620 may be omitted and the border print material 1630 may be printed onto layer 1610.

The nanostructured article 1600 may include additional substrate layers such as those described, for example, in U.S. Pat. Appl. Pub. No. 2017/0107398 (Ho et al.).

In some embodiments, the nanostructured article 1600 includes an additional layer that includes printing (e.g., ink printing) and/or a graphic, for example.

In some embodiments, a nanostructured article includes a polyurethane layer and a plurality of first nanostructures integrally formed with the polyurethane layer. For example, any of layers 1310, 1410, 1510, or 1610 may be a polyurethane layer and the first nanostructures may be integrally formed with the polyurethane layer by applying one or more coatings to the polyurethane layer (e.g., each of layers 1605a, 1605b, and 1607 may be applied to layer 1610 as a coating), drying and/or curing the coating(s), and then etching nanostructures into the outer coating layer as described further elsewhere herein. The polyurethane layer preferably includes covalently crosslinked polyurethane having a crosslink concentration in a range from 0.3 to 1.05 mol/kg, or in a range of 0.3 to 0.65. In some embodiments, the covalently crosslinked polyurethane has a peak tan δ greater than 1, or greater than 1.2, or greater than 1.3, or greater than 1.4, or greater than 1.5. In some embodiments, the plurality of first nanostructures extend away from the polyurethane layer along a length of the first nanostructures, the plurality of first nanostructures having an average length L1 and an average width W1, W1 being in a range of 5 nm to 500 nm, L1/W1 being at least 1. W1, L1, and L1/W1 may be in any of the ranges described elsewhere herein. A fluorinated and/or low surface energy layer (e.g., a covalently crosslinked fluorinated polymeric layer) may be disposed over the first nanostructures as described further elsewhere herein.

In some embodiments, the nanostructured article is one or more of a polymeric film, a protective film, a multilayer film, or a flexible film. For example, in some embodiments, the nanostructured article is a flexible film than can be bent 180 degrees around a cylindrical mandrel having a diameter of 10 cm, or 3 cm, or 1 cm, or 5 mm, or 3 mm, or even 1 mm without breaking or cracking. The films described herein can be added (e.g., bonded) to a surface to be protected using methods known in the art. For example, a premask may be used to assist in the application process. Specifically, applying the film to a substrate (e.g. an exterior surface of a vehicle sensor system) using a layer of premask material including a polymeric cover sheet or layer and a layer of removable pressure-sensitive adhesive firmly adhered to one surface of the cover sheet with the layer of premask material, where the premask is removed after placement. Additionally, the film may be die-cut to match a desired surface to be protected.

Figure 17A:
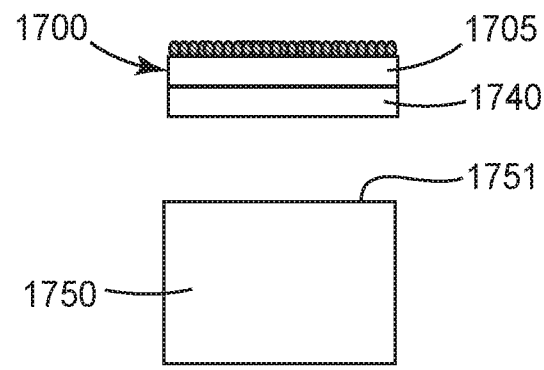
FIGS. 17A-17B schematically illustrate applying a first nanostructured article to a surface to form a second nanostructured article.
Figure 17B:
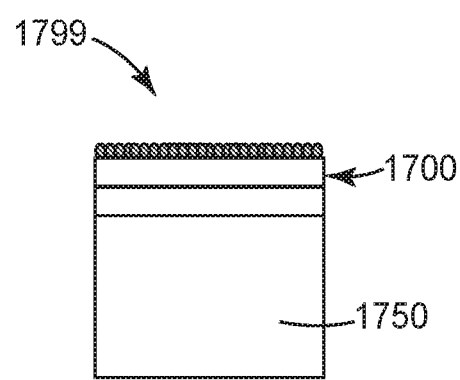

FIGS. 17A-17B schematically illustrate applying a first nanostructured article 1700 to a member 1750 (e.g., a structural member) having a surface 1751 that is to be protected by the first nanostructured article 1700 to form a second nanostructured article 1799. First nanostructured article 1700, which may be a flexible film, includes a nanostructured substrate 1705 disposed on an adhesive layer 1740 (FIG. 17A). Second nanostructured article 1799 includes the first nanostructured article 1700 bonded to the member 1750 (FIG. 17B). The surface 1751 may be planar or non-planar (e.g., curved).

In some embodiments, the nanostructured article is disposed on, and integrally formed with, a structural member. As used herein, a first element "integrally formed" with a second element means that the first and second elements are manufactured together rather than manufactured separately and then subsequently joined. Integrally formed includes manufacturing the second element followed by manufacturing the first element on the second element. For example, a structural member may be manufactured by injection molding and then the nanostructured article may be manufactured on the structural member by coating an exterior surface of the structural member with a polyurethane solution, for example, curing the polyurethane, etching nanostructures into the cured polyurethane, and optionally coating the nanostructures with a layer that is subsequently cured to form a covalently crosslinked fluorinated polymeric layer.

A structural member is a member or element capable of substantially maintaining its shape when subject to external forces. A structural member may be, for example, one or more of an injection molded part, a housing for an electronic device, a housing of a lighting assembly such as an automotive headlight or taillight housing, an optical lens, a device cover, a window (e.g., an architectural widow or automobile window (e.g., an automobile windshield)), a windshield, a mirror, and a mirror housing assembly (e.g., automotive sideview mirror housing assembly).

Figure 18A:
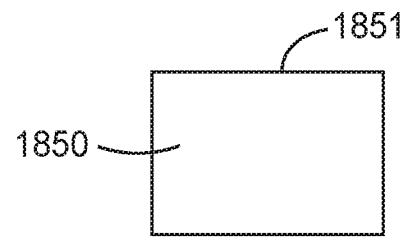
FIGS. 18A-18C schematically illustrate integrally forming a nanostructured article with a structural member.
Figure 18B:
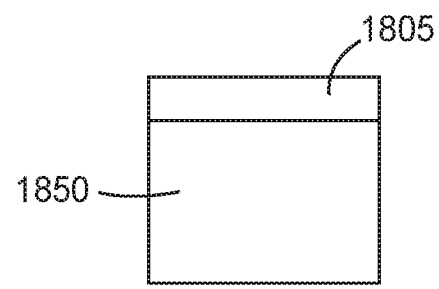
Figure 18C:
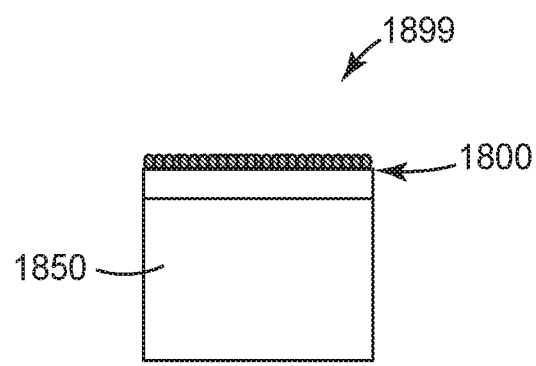

FIGS. 18A-18C schematically illustrate integrally forming a nanostructured article with a structural member. A structural member 1850 is provided (FIG. 18A). Structural member 1850 may be made by injection molding, for example. A coating 1805 is applied to a surface 1851 of structural member 1850 that is to be protected (FIG. 18B). The coating 1805 is then cured and etched (and optionally coated with a fluorinated and/or low surface energy layer) as described elsewhere herein to form a first nanostructured article 1800 disposed on, and integrally formed with, structural member 1850 (FIG. 18C). A second nanostructured article 1899 includes the first nanostructured article 1800 and the structural member 1850. The surface 1851 may be planar or non-planar (e.g., curved).

The nanostructured article (e.g., 1700 or 1800) may be disposed on any surface where a hydrophobic surface is desired to reduce water droplet build up, for example. Example applications include detectable markers, signs or logos, emblems, windows, windshields, mirrors (e.g., side mirrors, rear view mirror, bathroom mirror), eyeglasses, surfaces of optical systems (e.g., virtual or augmented reality systems), and light sources such as search lights or beacons, airport runway lighting, street lighting, traffic lights, exterior or interior lighting, and exterior surface of a sensor system, for example. A detectable marker may be a road sign, for example. A nanostructured surface may be disposed on the road sign to protect the sign from build-up of snow or ice, for example. In some embodiments, a road sign is provided that includes a retroreflective article and a nanostructured article described elsewhere disposed on the retroreflective article. Retroreflectors are described in U.S. Pat. Appl. Publ. No. 2008/0212181 and 2004/0174601 (Smith), for example, and in U.S. Pat. No. 5,417,515 (Hachey et al.); and U.S. Pat. No. 6,677,028 (Lasch et al.), for example.

In some embodiments, member 1750 or member 1850 is a housing (e.g., a device enclosure). For example, member 1750 or 1850 may be hollow such that an electronic device can be housed within the member. In some embodiments, member 1750 or member 1850 is a device cover. For example, member 1750 or 1850 may be solid cover layers for an electronic device (e.g., a cover disposed over a sensor). In some embodiments, the nanostructured article 1799 or 1899 is a housing or a device cover.

Figure 19:
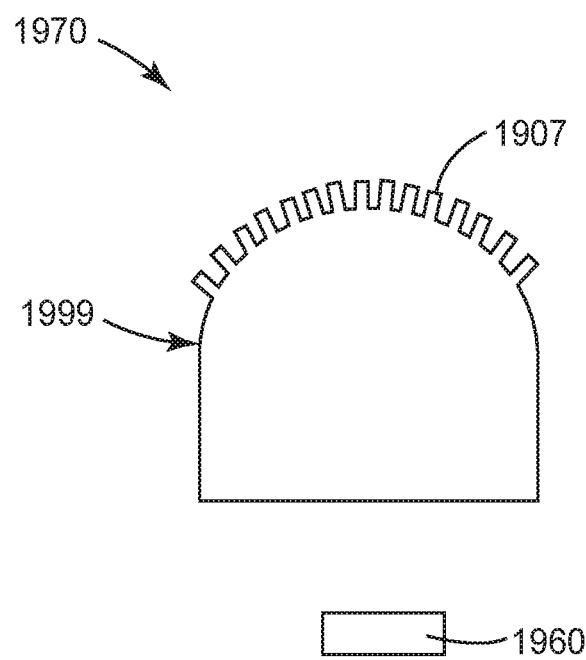
FIG. 19 is a schematic cross-sectional view of a system including a nanostructured article and an electronic device.

FIG. 19 is a schematic cross-sectional view of a system 1970 including a nanostructured article 1999 and an electronic device 1960 disposed proximate the nanostructured article 1999. In the illustrated embodiment, the nanostructured article 1999 has a curved, nanostructured surface 1907. The nanostructured article 1999 may be an optical lens, for example. In other embodiments, the nanostructured article 1999 may have a different shape depending on its intended use.

The electronic device 1960 may be configured to emit or receive energy (e.g., electromagnetic energy (e.g., ultraviolet, visible or infrared) or acoustic energy (e.g., ultrasonic, sonic, or subsonic)). In some embodiments, the electronic device 1960 is or includes one or more of an electromagnetic radiation emitter, an electromagnetic radiation sensor, an acoustic emitter, and an acoustic sensor. In some embodiments, the electronic device 1960 is or includes one more of a camera, a LIDAR (light detection and ranging) unit, a radar unit, and a sonar unit. The camera can be any suitable type of camera for a given application and may detect wavelengths in any suitable range (e.g., ultraviolet, visible, and/or infrared).

In some embodiments, a system includes a nanostructured article anywhere in the system in the path (e.g., optical or acoustical path) from an energy emitter to a target to a sensor. In other words, the nanostructured article can be disposed on any intervening element along the energy's round-trip journey from source to object to detector. For example, in some embodiments, the system includes an electronic device which may include an emitter having a light source including a focusing optic and/or a module cover over the light source and which may include a camera having a camera housing or camera lens covering a camera sensor. In some such embodiments, the system includes a nanostructured article described herein disposed on any one or more of a focusing optic, a module cover, a windshield (e.g., if optical or acoustic energy is transmitted through the windshield), a bumper (e.g., if optical or acoustic energy is transmitted through the bumper), a retroreflective material (e.g., in a road sign), a camera housing, or a camera lens.

In some embodiments, the nanostructured article 1999 and the electronic device 1960 are proximate to, and spaced apart from, one another. For example, the nanostructured article 1999 may be disposed in one area of an automobile while the electronic device is disposed in another area of the automobile. In some such embodiments or in other embodiments, the nanostructured article 1999 is disposed such that electromagnetic or acoustic energy passes through the nanostructured article to and/or from the electronic device 1960. In some embodiments, an element or body is disposed between the nanostructured article 1999 and the electronic device 1960. In some embodiments, the nanostructured article 1999 is a housing and the electronic device 1960 is disposed in the housing. In some embodiments, the nanostructured article 1999 includes the electronic device 1960 within a housing having the nanostructured surface 1907. Similarly, in some embodiments, an electronic device is disposed within structural member 1750 or 1850. In some such embodiments, the nanostructured article (1999, 1899, or 1799) is one or more of a sensor, a camera, a LIDAR unit, a radar unit, and a sonar unit.

In some embodiments, the nanostructured article is an optical lens. The nanostructures may be disposed on a curved surface of the lens as schematically illustrated in FIG. 19, for example. Alternatively, an optical lens may have a plurality of planar facets and a nanostructure may be disposed on the facets. Faceted lenses are described in US 2017/0122524 (Wu et al.), for example.

In some embodiments, the nanostructured article includes more than one nanostructured surface. For example, the nanostructured article may be a vehicle sensor that includes an exterior surface of a housing and a lens disposed in the housing where both the exterior surface and the lens surface are nanostructured as described herein. As another example, in the case of a transparent housing element, the inside and outside surface of the transparent housing may both be nanostructured.

The nanostructured article may have a spatially variant nanostructure geometry. For example, one facet of a faceted lens may have a nanostructured surface as schematically depicted in any one of FIGS. 1-12 and a different facet may have a nanostructured surface as schematically depicted in any different one of FIGS. 1-12. As another example, the nanostructured surface may include holes or microchannels (regions without nanostructures) which may aid in water runoff, for example. In some embodiments, the nanostructures may have a variable directionality. For example, the nanostructures may be posts (e.g., nano-pillars or nano-columns) that extend generally normal to a curved surface. In other embodiments, the nanostructures may extend generally along a same direction that is not normal to at least portions of the curved surface. The direction that the nanostructures extend can be controlled by the etching technique used to make the nanostructures (e.g., in embodiments where the nanostructures are formed by reactive ion etching, the direction of the nanostructures can be controlled by controlling the direction of the ion beam). In some embodiments, the nanostructured surface of the nanostructured article is patterned such that some regions of the surface include the nanostructures and other regions do not. This may be desired, for example, in some embodiments where is it is desired for nanostructured surface to be (super)hydrophobic or (super)omniphobic in a plurality of discrete regions (e.g., spaced apart regions covering different sensor apertures) and to provide other protection (e.g., abrasion resistance) between the discrete regions. Regions including the nanostructures may have the contact angles, average optical transmittance, optical haze, and/or optical clarity described elsewhere herein.

In some embodiments, the nanostructured article is used in a vehicle. The use of sensor technology in vehicles has increased. For example, autonomous and semi-autonomous vehicles have the potential to be used in an increasing number of applications. Such autonomous vehicles include at least one vehicle sensor system configured to receive information regarding, for example, the surrounding terrain, upcoming obstacles, a particular path, etc. In some instances, the vehicle sensor system is configured to automatically respond to this information in place of a human operator by commanding a series of maneuvers so that the vehicle is able to negotiate the terrain, avoid the obstacles, or track a particular path with little or no human intervention. Examples of various types of sensors used to detect objects in the surroundings may include lasers or LIDAR, sonar, ultrasonic sensors, radar, cameras, and other devices which have the ability to scan and record data from the vehicle's surroundings. Such scans are initiated or received through an exterior facing element. The exterior facing element may be part of the scanning sensor itself or may be an additional part of the vehicle sensor system that shields or protects more fragile parts. Examples of such exterior facing elements include a windshield (if a sensor is placed behind the windshield), a headlight (if sensor is placed behind the headlight), a protective housing and the surface of a camera lens. The exterior facing element has a surface (the exterior surface) which is exposed to elements, for example temperature, water, other weather, dirt and debris. Any of these elements can interfere with the exterior facing element, and can compromise the scan going out or the data coming in to the vehicle sensor system. A nanostructured article of the present description can be disposed on the exterior surface to protect the surface from the build-up of water, ice, dirt and/or debris, for example.

Figure 20:
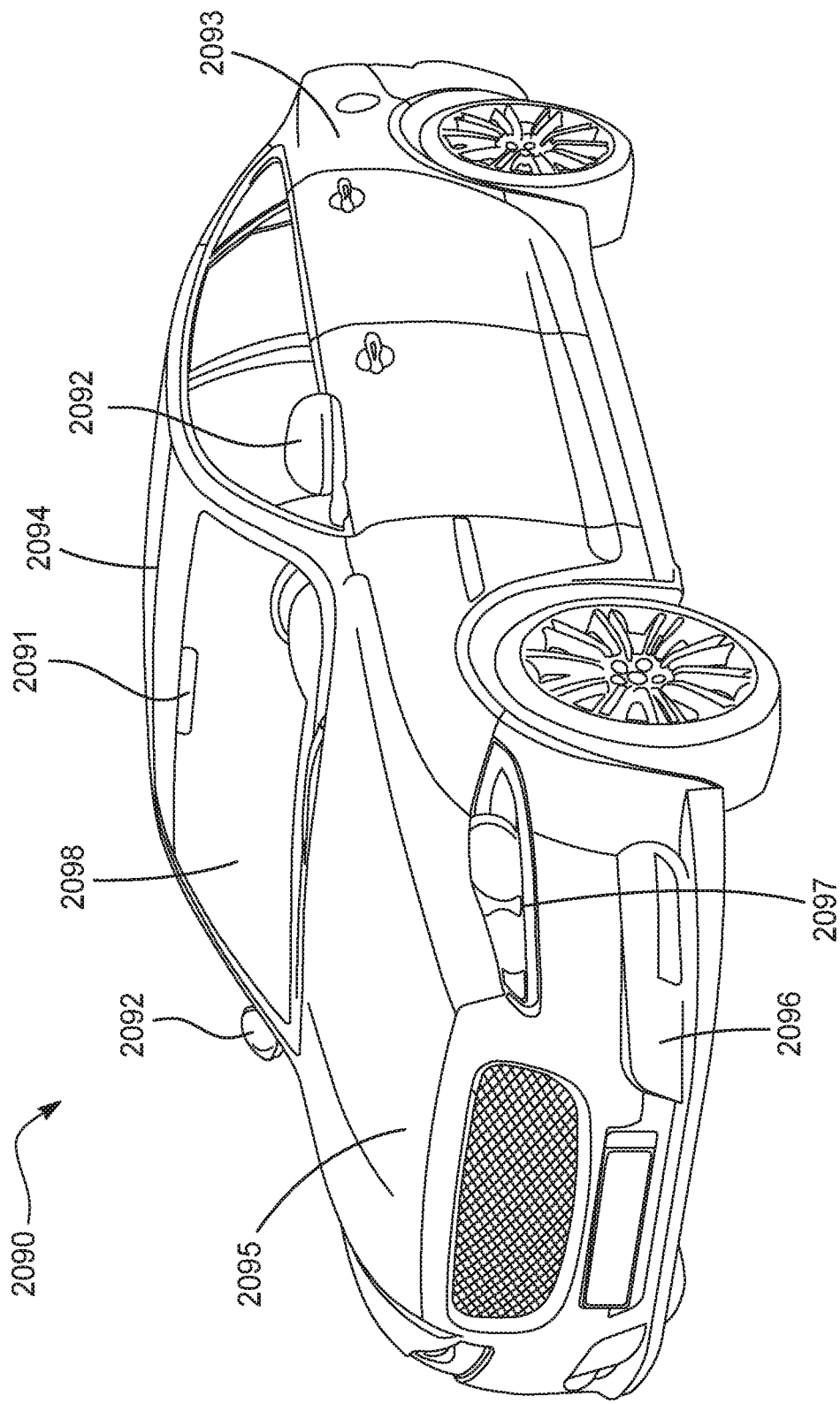
FIG. 20 is a schematic front perspective view of an automobile.
Figure 21:
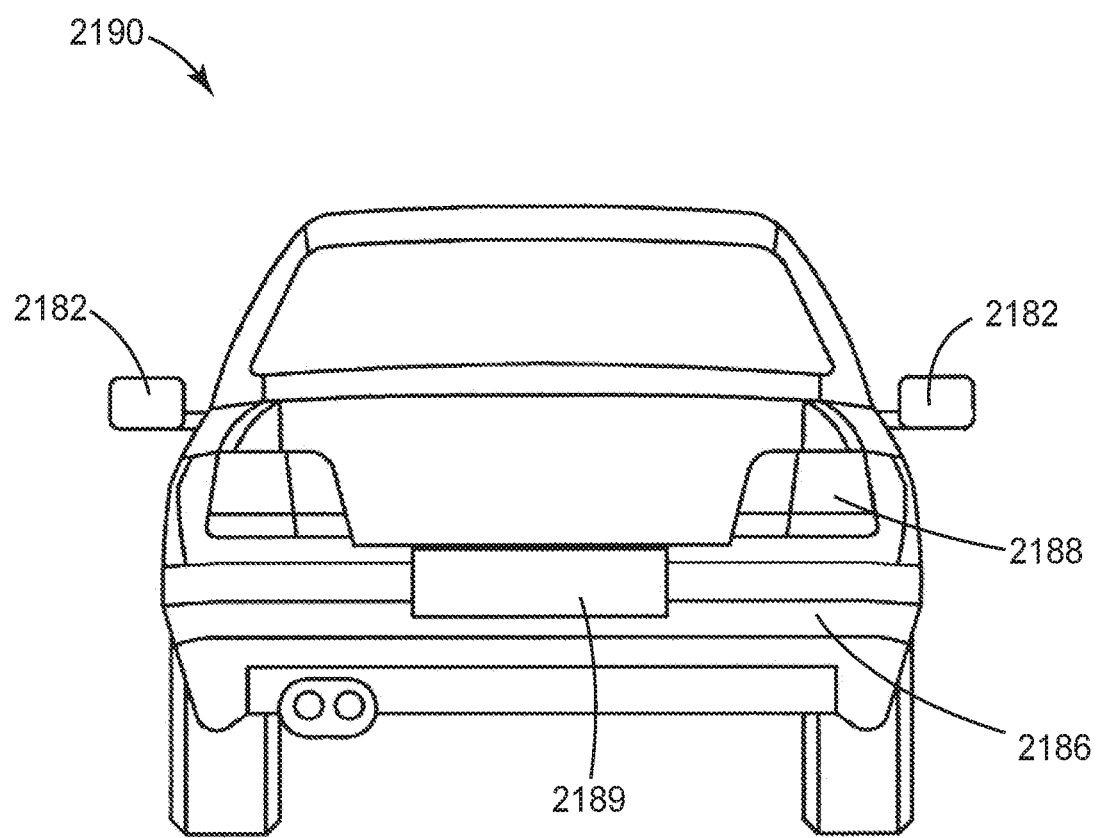
FIG. 21 is a schematic rear view of an automobile.

FIGS. 20-21 schematically illustrate possible surfaces where a nanostructure of the present description can be advantageously utilized.

FIG. 20 is a schematic front perspective view of an automobile 2090 including a rear-view mirror assembly 2091, side view mirror assemblies 2092, a rear quarter panel 2093, front bumper 2096, headlight assembly 2097, and windshield 2098.

FIG. 21 is a schematic rear view of an automobile 2190 including side view mirrors 2182, rear bumper 2186, taillight assembly 2188, and backup camera 2189.

In some embodiments, a sensor system (e.g., including a sensor and an emitter) is included in the headlight assembly 2097 and/or taillight assembly 2188 and a nanostructured surface described herein is disposed on at least a portion of the outer surface of the lighting assembly (2097 and/or 2188) covering the sensor system. In some embodiments, the nanostructured surface covers at least a majority (e.g., all or substantially all) of the outer surface of the lighting assembly. In some embodiments, a nanostructured surface is provided on a lens or cover glass of the sensor system.

In some embodiments, a sensor system is incorporated in the rear-view mirror assembly 2091. At least a portion of the windshield 2098 that is disposed in front of the rear-view mirror assembly 2091 may include a nanostructured surface described herein to prevent elements (e.g., water or ice) from building up on the windshield 2098 that could interfere with the functioning of the sensor system.

In some embodiments, a sensor system, such as a LIDAR system, a radar system, or a sonar system, is disposed under hood location 2095, or in a roof location 2094, or within front bumper 2096 or rear bumper 2186, or within side view mirror assemblies 2092, or under rear quarter panel 2093. In some embodiments, the sensor system includes a nanostructured surface described herein on a cover or lens of the sensor system. In some embodiments, the exterior vehicle surface includes a nanostructured surface described herein. For example, any one or more of the front bumper 2096, the rear bumper 2186, the side view mirror assemblies 2092, or the rear quarter panel 2093 may include a nanostructured surface described herein. In some embodiments, a nanostructured article is integrally formed with any one or more of the front bumper 2096, the rear bumper 2186, the side view mirror assemblies 2092, or the rear quarter panel 2093. In some embodiments, a nanostructured article is a flexible film bonded to any one or more of the front bumper 2096, the rear bumper 2186, the side view mirror assemblies 2092, or the rear quarter panel 2093. In some embodiments, a nanostructured surface described here is applied (e.g., integrally formed with or applied as a film) to the side-view mirrors 2182 or an outer lens of the backup camera 2189, for example.

In some embodiments, the nanostructured article is a sensor (e.g., backup camera 2189), a window (e.g., windshield 2098), a lighting assembly (e.g., headlight assembly 2097 or taillight assembly 2188), a mirror (e.g., side view mirror 2182), an automotive side-view mirror assembly (e.g., side-view mirror assembly 2092), or a vehicle body panel (e.g., quarter panel 2093, or bumper 2186 or 2096).

EXAMPLES

TABLE 1

| Materials | | |
|---|---|---|
| Material | Description | Supplier |
| Polyol 1 | Aliphatic polyester polyol, commercially available from King Industries, Norwalk, CT under the trade name "K-FLEX 188". | King Industries, Norwalk, CT |
| Polyol 2 | Hydroxyl terminated saturated linear polyester available from Chemtura, Middlebury, CT under the trade name "FOMREZ 55-112" | Chemtura, Middlebury, CT |

TABLE 1-continued

Materials

| Material | Description | Supplier |
|---|---|---|
| Polyisocyanate 1 | Aliphatic polyisocyanate, commercially available from Covestro under the trade name "DESMODUR N3300A". | Covestro (Leverkusen, Germany) |
| Polyisocyanate 2 | Aliphatic polyisocyanate, commercially available from Covestro under the trade name "DESMODUR N3400". | Covestro (Leverkusen, Germany) |
| Catalyst | Dibutyltin dilaurate catalyst, commercially available from Air Products and Chemicals, Inc., Allentown, PA, under the trade name "DABCOT-12". | Air Products and Chemicals, Inc., Allentown, PA |
| HFPO-UA | 10% HFPO urethane acrylate, 30% solids in MEK described | Prepared as described below |
| DESOMODUR N100 | Aliphatic polyisocyanate (HDI biuret) | Covestro (Leverkusen, Germany) |
| APTMS | Aminopropyltrimethoxysilane Aldrich (St. | Sigma-Aldrich (St. Louis, MO) |
| CN9010 | Polyurethane acrylate Polymer | Sartomer Arkema Group (Exton, PA) |
| CN9004 | Aliphatic polyurethane acrylate oligomer, commercially available from Sartomer Arkema Group, Exton, PA. | Sartomer Arkema Group (Exton, PA) |
| CN3211 | Aliphatic polyester polyurethane acrylate oligomer, commercially available from Sartomer Arkema Group, Exton, PA. | Sartomer Arkema Group (Exton, PA) |
| CD9043 | Alkoxylated neopentyl glycol diacrylate, commercially available from Sartomer Arkema Group, Exton, PA. | Sartomer Arkema Group (Exton, PA) |
| SR501 | Propoxylated trimethylolpropane triacrylate, commercially available from Sartomer Arkema Group, Exton, PA. | Sartomer Arkema Group (Exton, PA) |
| SR531 | Cyclic trimethylol formal acrylate, commercially available from the Sartomer Arkema Group, Exton, PA. | Sartomer Arkema Group (Exton, PA) |
| SR415 | Ethoxylated trimethylolpropane triacrylate, commercially available from Sartomer Arkema Group, Exton, PA. | Sartomer Arkema Group (Exton, PA) |
| SR344 | polyethylene glycol 400 diacrylate | Sartomer Arkema Group (Exton, PA) |
| SR399 | dipentaerythritolpentaacrylate | Sartomer Arkema Group (Exton, PA) |
| SR444c | pentaerythritol triacrylate and pentaerythritol tetmacrylate mixture | Sartomer Arkema Group (Exton, PA) |
| SR9035 | ethoxylated trimethylolpropane triacrylate Sartomer | Sartomer Arkema Group (Exton, PA) |
| SR494 | Ethoxylated (4) pentaerythritol tetraacrylate, commercially available from Sartomer, Exton, PA. | Sartomer Arkema Group (Exton, PA) |
| IRGACURE TPO-L | Liquid photoinitiator, BASF | BASF |
| IRGACURE 184 | Photoinitiator, BASF | BASF |
| ESACURE ONE | photoinitiator | IGM Resins USA Inc. (St. Charles, IL) |
| TK-1791 | Monopodal silane with the nominal formula $C_3F_7O[CF(CF_3)CF_2O]_{5.6}CF(CF_3)C(O)NHCH_2CH_2CH_2SiOCH_3)_3$ | |
| C4TDMA | Nonafluorohexyltris(dimethylamino)silane | Gelest (Morrisville, PA) |
| ECC-1000 | Perfluorinated polyether disilane | 3M Co. St Paul, MN |
| TFT | α,α,α-trifluorotoluene | Acros Organics, Morris Plains, NJ) |
| MEK | methylethylketone | OmniSolv (Billerica, MA) |
| Ethanol | 200 proof Ethanol | Koptec (King of Prussia, PA) |
| IPA | Isopropyl alcohol | Acros Organics, Morris Plains, NJ) |
| EtOAc | Ethyl acetate | Alfa Aesar, Tewksbury, MA) |
| 85/15 TFT/EtOH | A mixture of 85 wt % TFT and 15% EtOH | |
| 90/10 EtOAc/EtOH | A mixture of 90 wt % EOAc and 10 wt % EtOH | |
| pTSA | Para-toluenesulfonic acid monohydrate | Alfa Aesar, (Haverhill, MA) |
| 5% pTSA | A solution of 5 wt % pTSA in EtOH | |
| Premask | Tredegar RS-011118-14 | Tredegar, KR |
| M64K7 | Silicone release liner | Mitsubishi |
| POS-1 | (Acryloyloxyethyl)-N,N,N-trimethylammonium bis(trifluoromethanesulfonyl)imide as described in International Appl. Pub. No. WO 2011/025963 Al (Hunt et al.) Examples, page 19 line 24, Polymerizable Onium Salt 1 (POS-1) | |
| CLEVIOS P | PEDOT conductive Polymer Hanau, | Heraeus, Hanau, Germany |
| BHT | 2,6-Di-tert-butyl-4-methylphenol | Sigma-Aldrich (St. Louis, MO) |

PREPARATORY EXAMPLES

Preparation of HFPO—C(O)NH—(CH$_2$)$_3$—Si(OCH$_3$)$_3$ (TK-1791)

A 250 mL round bottom flask was charged with 100 g of HFPO—C(O)OCH$_3$ (0.084 mol, 1190.2 MW, as prepared in U.S. Pat. No. 3,250,808 (Moore et al.)) was reacted with 15.06 g APTMS (0.084 mol) and was stirred overnight at room temperature. An aliquot was analyzed by FTIR and showed no peak corresponding to the methyl ester at 1794 cm$^{-1}$ and a large peak at 1710 cm$^{-1}$ corresponding to the amide was found indicating complete reaction. The reaction was concentrated at 50° C. at 1.5 torr to remove methanol giving a clear colorless liquid.

Preparation of HFPO-UA

A 500 mL round bottom flask equipped with magnetic stirbar was charge with 25.0 g (0.131 equivalents, 191 equivalent weight) Desmodur N100, and 128.43 g MEK. The reaction mixture was swirled to dissolve all of the reactants and the flask was placed in an oil bath at 55° C. and was fitted with an adapter under dry air. Next, 0.10 g of a 10% by weight solids solution in MEK of dibutyltin dilaurate was added to the reaction. Via an addition funnel, 17.50 g (0.0131 equivalents, 1344 equivalent weight) of HFPO—C(O)N(H)CHCH—OH was added to the reaction over about 20 min. (The HFPO alcohol (HFPO—C(O)N(H)CHCH—OH) can be made by a similar procedure to that described in U.S. Pat. Pub. No. 2004/0077775 A1 (Audenaert et al.), titled "Fluorochemical Composition Comprising a Fluorinated Polymer and Treatment of a Fibrous Substrate Therewith". The HFPO alcohol was made using an HFPO methyl ester $F(CF(CF_3)CF_2))_aCF(CF_3)C(O)OCH_3$ where a=6.67. The HFPO methyl ester can be prepared according to the method reported in U.S. Pat. No. 3,250,808 (Moore et al.).) The addition funnel was rinsed with ~15 g of MEK. Two hours after the addition was complete, 0.52 g of BHT was added directly into the reaction, followed by dispensing 61.46 g (0.1243 equivalents, 494.3 equivalent weight) of Sartomer SR444c from a beaker. The beaker was rinsed with ~30 g of MEK. The reaction was monitored by Fourier-transform infrared spectroscopy (FTIR) for the disappearance of —NCO. The reaction was deemed complete when the FTIR spectrum showed no peak due to an —NCO functional group at ~2265 $cm^{-1}$ after 20 h of additional reaction. The reaction flask and contents were weighed, and the reaction was then adjusted to 30% solids by addition of 2.23 g of MEK to provide a clear light yellow solution.

Preparation of 5% pTSA in Ethanol

In 250 mL amber glass jar was added 5 g of pTSA in 95 g of Ethanol. The mixture was stirred using a vortex mixer for 30 seconds.

Preparation of 85/15 TFT/EtOH

Into a 1 liter bottle was added 680 g of TFT and 120 g of Ethanol. The solution was swirled to mix the two solvent for 5 minutes.

Preparation of 90/10 EtOAc/EtOH

Into a 1 liter bottle was added 720 g of EtOAc and 80 g of Ethanol. The solution was swirled to mix the two solvent for 5 minutes.

Thermoplastic Polyurethane Film 1

Thermoplastic polyurethane film 1 used in the example below is a film construction having a 125 μm extruded thermoplastic polyurethane film with a 50 μm pressure sensitive adhesive and an ~52 μm silicone release liner on the PSA side opposite the thermoplastic polyurethane layer. Films are readily available and can be made as described in U.S. Pat. No. 8,765,263 (Ho et al.)

Preparation of POS-1 Polymerizable Onium Salt

Polymerizable Onium Salt 1, (Acryloyloxyethyl)-N,N,N-trimethylammonium bis(trifluoromethanesulfonyl)imide, was prepared as described in PCT Pub. No. WO 2011/025963 A1 (Hunt et al.) Examples, page 19 line 24, Polymerizable Onium Salt 1 (POS-1)

Preparatory Substrate Examples S1-S22

Aliphatic Polyurethane Film Preparative Substrate Examples S1-S6

Samples of shape memory polyurethane were prepared in a roll to roll process where the isocyanate and polyol with catalyst were mixed using an inline dynamic mixer. The solutions were applied to a moving web between two silicone release liners at an appropriate flow rate to achieve the desired final sample thickness. The polyurethane between films were heated at 70° C. and wound into a roll. The films were postbaked at 70° C. for 24 hours prior to lamination to glass. Samples had a range of equivalents of NCO reacted with 1.0 equivalents of —OH, as shown in Table 2 in order to achieve the desired glass transition temperature and crosslink concentration. Relative proportions by mass of Polyol 1 and Polyisocyanate 1 for samples 1-6 are shown in Table 2. The coated materials contained about 350 ppm dibutyltin dilaurate catalyst.

TABLE 2

Coating compositions and theoretical crosslink concentration

| Example | Polyol 1 with catalyst (g) | Polyisocyanate 1 (g) | NCO/OH Ratio | Theoretical Gel Content | Theoretical Crosslink Concentration (mol/kg) |
|---|---|---|---|---|---|
| S1 | 32.8 | 20.74 | 0.8 | 96.67% | 0.34 |
| S2 | 32.8 | 22.03 | 0.85 | 98.31% | 0.42 |
| S3 | 32.8 | 23.33 | 0.9 | 99.32% | 0.49 |
| S4 | 32.8 | 24.62 | 0.95 | 99.85% | 0.57 |
| S5 | 32.8 | 25.92 | 1 | 100% | 0.65 |
| S6 | 32.8 | 27.22 | 1.05 | 100% | 0.61 |

Polyurethane Film Preparative Substrate Examples S7-S10

The polyurethanes for Examples S7-S10, were composed of a polyol 1 (K-FLEX 188) reacted with a blend of multifunctional isocyanates, Polyisocyanate 1 and Polyisocyanate 2, prepared in the same manner as samples S1-S6. The weight ratio Polyol 1 to Polyisocyanate 1 to Polyisocyanate 2 for samples S7-S10 are shown in Table 3. Polyisocyanate 2 contains a uretdione unit that can react with excess OH in the polyol component at elevated temperature to form an allophanate group. For this reason, the table contains two stoichiometric ratio columns. The first calculates the NCO/OH ratio based on only existing NCO content in Polyisocyanate 1 and Polyisocyanate 2 at the beginning of the reaction. The NCO+UD/OH ratio accounts for the ratio after the uretdione is reacted with excess OH of the polyol. The theoretical gel content and crosslink concentration are reported in Table 3.

TABLE 3

Mix ratios for polyurethanes for Examples S7-S10

| Ex. | Polyol 1 | Polyisocyanate 1 | Polyisocyanate 2 | NCO/OH Ratio | (NCO + UD)/OH Ratio | Theo. Gel Content | Theo. Crosslink Conc. (mol/kg) |
|---|---|---|---|---|---|---|---|
| S7 | 62.8 | 0 | 37.2 | 0.75 | 1.03 | 100% | 0.74 |
| S8 | 62.4 | 18.8 | 18.8 | 0.76 | 0.91 | 99.3% | 0.55 |
| S9 | 65.2 | 17.4 | 17.4 | 0.67 | 0.80 | 96.5% | 0.37 |
| S10 | 62.5 | 25.0 | 12.5 | 0.76 | 0.85 | 98.3% | 0.45 |

Polyurethane Film Preparative Substrate Example S11

Polyurethane Substrate Example S11 coating was made with an alternative polyol, Fomrez 55-112 in order to provide a film having a lower glass transition temperature. The polyurethane was composed of polyol 2 reacted with Polyisocyanate 1, prepared in the same manner as samples S1-S6. The weight ratio Polyol 2 to Polyisocyanate 1 for sample S11 is shown in Table 4. Ovens were run at 70° C. and the samples were post-cured for 24 hours at 70° C.

TABLE 4

Coating composition and theoretical crosslink concentration

| Example | Polyol 2 with catalyst (g) | Polyisocyanate 1 (g) | NCO/OH Ratio | Theoretical Gel Content | Theoretical Crosslink Concentration (mol/kg) |
|---|---|---|---|---|---|
| S11 | 72.0 | 28.05 | 1.00 | 100.0% | 0.41 |

Polyurethane Film Substrate Characterization

The glass transition temperature of the polyurethane coatings was characterized using Q800 DMA from TA Instruments. Samples were cut into strips 6.35 mm wide and about 4 cm long. The thickness of each film was measured. The films were mounted in the tensile grips of a Q800 DMA from TA Instruments with an initial grip separation between 16 mm and 19 mm. The samples were then tested at an oscillation of 0.2% strain and 1 Hz throughout a temperature ramp from −50° C. to 200° C. at a rate of 2° C. per minute. The results are shown in Table 5. The onset of the glass transition was determined by location of peak for E". The temperature at which the Tan Delta signal reached a maximum was recorded as the peak Tan Delta temperature.

TABLE 5

Thermal and mechanical properties of the coatings alone

| | Dynamic Mechanical Analysis | | | |
|---|---|---|---|---|
| Example | Tg by E" (° C.) | Storage Modulus @ 0° C. (GPa) | Peak Tan Delta | Temp at Peak Tan Delta (° C.) |
| S1 | 25.2 | 1.47 | 1.79 | 39.4 |
| S2 | 30.9 | 1.47 | 1.66 | 43.9 |
| S3 | 37.5 | 1.4 | 1.68 | 47.5 |
| S4 | 40.8 | 1.43 | 1.61 | 49.8 |
| S5 | 38.6 | 1.54 | 1.46 | 47.5 |
| S6 | 42.1 | 0.93 | 1.57 | 51.5 |

TABLE 5-continued

Thermal and mechanical properties of the coatings alone

| | Dynamic Mechanical Analysis | | | |
|---|---|---|---|---|
| Example | Tg by E" (° C.) | Storage Modulus @ 0° C. (GPa) | Peak Tan Delta | Temp at Peak Tan Delta (° C.) |
| S7 | 9.32 | 1.36 | 1.76 | 16.1 |
| S8 | 13.5 | 1.62 | 1.76 | 25.6 |
| S9 | 8.7 | 1.54 | 1.87 | 20.5 |
| S10 | 6.2 | 1.75 | 1.48 | 18.5 |
| S11 | −25 | 0.003 | 1.32 | −11 |

Polyurethane Acrylate Film Preparative Substrate Examples S12-S19

Polyurethane acrylate substrate films were made as described in examples S12-S19 below. Physical property data for the materials is shown in Table 6.

Preparative Example S12: Polyurethane Acrylate Resin and Film

Into a Flacktek Inc. size 20 speedmixer cup was added 99.5 g of CN9004 and 0.5 g of IRGACURE TPO-L catalyst. The contents were mixed using a Flacktek DAC 150 FVZ-K speedmixer and were mixed at 3100 rpm for 1 min. The resulting solution was homogeneous near colorless viscous solution. The resulting solution was then placed into a vacuum oven at 40° C. and was degassed to remove all dissolved air and bubbles from the viscous solution. The solution had a viscosity of ~50000 cP at room temperature. Film samples were made from this resin by coating the resin between a 2 mil thick cycloolefin polymer (COP) film (available from Zeon Specialty Materials (San Jose, CA)) and a 2 mil thick silicone release coated polyester liner. The solution between films was drawn under a notch bar such a 175 μm film was cast. The coating between liners was irradiated under low power 350 nm black light bulbs for 15 minutes to give a cured film with elastic properties.

Preparative Example S13: Polyurethane Acrylate Resin and Film

Into a Flacktek Inc. size 20 speedmixer cup was added 99.5 g of CN3211 and 0.5 g of IRGACURE TPO-L catalyst. The contents were mixed using a Flacktek DAC 150 FVZ-K speedmixer and were mixed at 3100 rpm for 1 min. The resulting solution was homogeneous near colorless viscous solution. The resulting solution was then placed into a vacuum oven at 40° C. and was degassed to remove all dissolved air and bubbles from the viscous solution. The solution had a viscosity of ~25000 cP at room temperature. Film samples were made from this resin by coating the resin between a 2 mil thick cycloolefin polymer (COP) film (available from Zeon Specialty Materials (San Jose, CA)) and a 2 mil thick silicone release coated polyester liner. The solution between films was drawn under a notch bar such a 175 μm film was cast. The coating between liners was irradiated under low power 350 nm black light bulbs for 15 minutes to give a cured film with elastic properties.

Preparative Example S14: Polyurethane Acrylate Resin (90/10) and Film

Into a Flacktek Inc. size 20 speedmixer cup was added 79.60 g of CN3211 and 19.90 g of SR501. The contents were mixed using a Flacktek DAC 150 FVZ-K speedmixer and were mixed at 3100 rpm for 1 min. The resulting solution was homogeneous near colorless viscous solution. To the speedmixer cup was added 0.5 g of IRGACURE TPO-L catalyst. The contents were again mixed at 31000 rpm for 1 min. The resulting solution was then placed into a vacuum oven at 40° C. and was degassed to remove all dissolved air and bubbles from the viscous solution. The solution had a viscosity of ~8500 cP at room temperature. Film samples were made from this resin by coating the resin between a 2 mil thick cycloolefin polymer (COP) film (available from Zeon Specialty Materials (San Jose, CA)) and a 2 mil thick silicone release coated polyester liner. The solution between films was drawn under a notch bar such a 175 μm film was cast. The coating between liners was irradiated under low power 350 nm black light bulbs for 15 minutes to give a cured film with elastic properties.

Preparative Example S15: Polyurethane Acrylate Resin (80/20) and Film

Into a Flacktek Inc. size 20 speedmixer cup was added 79.60 g of CN3211 and 19.90 g of CD9043. The contents were mixed using a Flacktek DAC 150 FVZ-K speedmixer and were mixed at 3100 rpm for 1 min. The resulting solution was homogeneous near colorless viscous solution. To the speedmixer cup was added 0.5 g of IRGACURE TPO-L catalyst. The contents were again mixed at 31000 rpm for 1 min. The resulting solution was then placed into a vacuum oven at 40° C. and was degassed to remove all dissolved air and bubbles from the viscous solution. The solution had a viscosity of ~5800 cP at room temperature. Film samples were made from this resin by coating the resin between a 2 mil thick cycloolefin polymer (COP) film (available from Zeon Specialty Materials (San Jose, CA)) and a 2 mil thick silicone release coated polyester liner. The solution between films was drawn under a notch bar such a 175 μm film was cast. The coating between liners was irradiated under low power 350 nm black light bulbs for 15 minutes to give a cured film with elastic properties.

Preparative Example S16: Polyurethane Acrylate Resin (80/20) and Film

Into a Flacktek Inc. size 20 speedmixer cup was added 79.60 g of CN3211 and 19.90 g of SR415. The contents were mixed using a Flacktek DAC 150 FVZ-K speedmixer and were mixed at 3100 rpm for 1 min. The resulting solution was homogeneous near colorless viscous solution. To the speedmixer cup was added 0.5 g of IRGACURE TPO-L catalyst. The contents were again mixed at 31000 rpm for 1 min. The resulting solution was then placed into a vacuum oven at 40° C. and was degassed to remove all dissolved air and bubbles from the viscous solution. The solution had a viscosity of ~5500 cP at room temperature. Film samples were made from this resin by coating the resin between a 2 mil thick cycloolefin polymer (COP) film (available from Zeon Specialty Materials (San Jose, CA)) and a 2 mil thick silicone release coated polyester liner. The solution between films was drawn under a notch bar such a 175 μm film was cast. The coating between liners was irradiated under low power 350 nm black light bulbs for 15 minutes to give a cured film with elastic properties.

Preparative Example S17: Polyurethane Acrylate Resin (70/30) and Film

Into a Flacktek Inc. size 20 speedmixer cup was added 69.65 g of CN3211 and 29.85 g of SR531. The contents were mixed using a Flacktek DAC 150 FVZ-K speedmixer and were mixed at 3100 rpm for 1 min. The resulting solution was homogeneous near colorless viscous solution. To the speedmixer cup was added 0.5 g of IRGACURE TPO-L catalyst. The contents were again mixed at 31000 rpm for 1 min. The resulting solution was then placed into a vacuum oven at 40° C. and was degassed to remove all dissolved air and bubbles from the viscous solution. The solution had a viscosity of ~4000 cP at room temperature. Film samples were made from this resin by coating the resin between a 2 mil thick cycloolefin polymer (COP) film (available from Zeon Specialty Materials (San Jose, CA)) and a 2 mil thick silicone release coated polyester liner. The solution between films was drawn under a notch bar such a 175 μm film was cast. The coating between liners was irradiated under low power 350 nm black light bulbs for 15 minutes to give a cured film with elastic properties.

Preparative Example S18: Polyurethane Acrylate Resin (80/20) and Film

Into a Flacktek Inc. size 20 speedmixer cup was added 79.60 g of CN3211 and 19.90 g of SR531. The contents were mixed using a Flacktek DAC 150 FVZ-K speedmixer and were mixed at 3100 rpm for 1 min. The resulting solution was homogeneous near colorless viscous solution. To the speedmixer cup was added 0.5 g of IRGACURE TPO-L catalyst. The contents were again mixed at 31000 rpm for 1 min. The resulting solution was then placed into a vacuum oven at 40° C. and was degassed to remove all dissolved air and bubbles from the viscous solution. The solution had a viscosity of ~5000 cP at room temperature. Film samples were made from this resin by coating the resin between a 2 mil thick cycloolefin polymer (COP) film (available from Zeon Specialty Materials (San Jose, CA)) and a 2 mil thick silicone release coated polyester liner. The solution between films was drawn under a notch bar such a 175 μm film was cast. The coating between liners was irradiated under low power 350 nm black light bulbs for 15 minutes to give a cured film with elastic properties.

Preparative Example S19: Polyurethane Acrylate Resin (90/10) and Film

Into a Flacktek Inc. size 20 speedmixer cup was added 89.55 g of CN3211 (Sartomer, Inc.) and 9.95 g of SR531 (Sartomer, Inc.). The contents were mixed using a Flacktek DAC 150 FVZ-K speedmixer and were mixed at 3100 rpm for 1 min. The resulting solution was homogeneous near colorless viscous solution. To the speedmixer cup was added 0.5 g of IRGACURE TPO-L catalyst. The contents were again mixed at 31000 rpm for 1 min. The resulting solution was then placed into a vacuum oven at 40° C. and was degassed to remove all dissolved air and bubbles from the viscous solution. The solution had a viscosity of ~6000 cP at room temperature. Film samples were made from this resin by coating the resin between a 2 mil thick cycloolefin polymer (COP) film (available from Zeon Specialty Materials (San Jose, CA)) and a 2 mil thick silicone release coated polyester liner. The solution between films was drawn under a notch bar such a 175 μm film was cast. The coating between liners was irradiated under low power 350 nm black light bulbs for 15 minutes to give a cured film with elastic properties.

TABLE 6

Properties of crosslinked polyurethane core layer materials

| Example | Oligomer/Diluent | Oligomer to Diluent Ratio | Tg (° C.) (Peak Tan δ) | Tan δ | Tg by E" (° C.) (from DMA Storage Modulus) | Storage Modulus (MPa) (23° C./−20° C.) |
|---|---|---|---|---|---|---|
| S12 | CN9004/NA | 100/0 | −67 | 0.614 | −73.6 | 7.42/9.86 |
| S13 | CN3211/NA | 100/0 | −20.7 | 1.473 | −29.7 | 2.87/27.4 |
| S14 | CN3211/SR501 | 80/20 | −5.24 | 0.639 | −25.1 | 7.74/515.9 |
| S15 | CN3211/CD9043 | 80/20 | −24.1 | 1.390 | −32.3 | 3.59/15.99 |
| S16 | CN3211/SR415 | 80/20 | −21.5 | 1.334 | −28.8 | 5.09/31.22 |
| S17 | CN3211/SR531 | 70/30 | −5.5 | 1.334 | −22.9 | 1.80/711.9 |
| S18 | CN3211/SR531 | 80/20 | −11.0 | 1.359 | −24.9 | 2.23/360.1 |
| S19 | CN3211/SR531 | 90/10 | −16.7 | 1.398 | −27.3 | 2.39/97.4 |

Dynamic Mechanical Analysis Test Method Used for Characterization of Examples S12-S19

Samples were cut into strips 6.35 mm wide and about 4 cm long. The thickness of each film was measured. The films were mounted in the tensile grips of a Q800 DMA from TA Instruments with an initial grip separation between 16 mm and 19 mm. The samples were then tested at an oscillation of 0.2% strain and 1 Hz throughout a temperature ramp from −70° C. to 200° C. at a rate of 2° C. per minute. The temperature at which the Tan Delta signal reached a maximum was recorded as the peak Tan Delta temperature. Glass transition temperatures were taken from peak of E".

Aliphatic Polyurethane/Polyacrylate Blend Film Preparative Substrate Examples S20-S22

The following materials descriptions provide examples of aliphatic polyurethane/acylate blends which can be useful for providing dual cure function to a polyurethane layer (e.g., layer 1310, 1410, 1510, and/or 1610) in the constructions of the present description. Dual cure capability can be used to affect processing parameters and, in some cases, can be used to improve coating caliper and incidence of coating defects by quickly "locking in" or gelling the coated material with a low temperature UV exposure step prior to thermal curing of the thermally cured aliphatic polyurethane.

Preparation of Polyol 1 with Catalyst

In an air mixer at 93° C. were mixed 470 grams of Polyol 1 and 4 drops of Catalyst (DABCO T-12). To reduce air bubbles introduced during mixing, the polyol mixture was placed in a vacuum oven overnight at 60° C.

Preparative Examples S20 to S22 and Reference Example S6

Three aliphatic polyurethane precursor solutions with added acrylate were prepared using the amounts shown in examples S20, S21, and S22 below. One reference aliphatic polyurethane precursor solution without acrylate was also prepared as shown in Reference Example S6.

For all of the polyurethane precursor solutions with acrylate, the desired amounts of acrylate and photoinitiator were added to the Polyol 1 with catalyst. These were mixed until a uniform clear solution was achieved. Polyisocyanate 1 was then added and the solution was mixed in a speed mixer (available for Flaktek). The solutions were coated immediately between two 50 μm thick silicone release liners (UV-30 from CP Films Inc. Fieldale, VA). The films were made by pouring the solution onto the lower liner film and then pulling the solution between liner films under a notch bar with a gap set to produce a 5 mil (125p m) coating of the polyurethane solutions between the liner films. The coated film was then exposed to a first stage cure using ultraviolet (UV) radiation using a Clearstone UV LED lamp with output wavelength of 385 nm for 30 seconds with power set to 100%. Following this UV exposure, the films were placed into a 70° C. oven for 16 hours to perform the second stage (thermal) cure. Prior to testing, the release liner film was removed to produce a stand-alone film that could be used for material characterization.

For the reference solution S6, Polyol 1 and Polyisocyanate 1 were mixed in speedmixer and coated immediately. The film was placed into a 70° C. oven for 16 hours to perform the second stage (thermal) cure. Prior to testing, the release liner film was removed to produce a stand-alone film that could be used for material characterization by DMA. A Reference Example S6, was made with the same composition as Aliphatic Polyurethane Preparative Substrate Example S6 described previously.

Preparative Example S20: Aliphatic Polyurethane Layer with 5% CN9893

| Chemical | Wt % |
|---|---|
| Polyol 1 with Catalyst | 55.0% |
| Polyisocyanate 1 | 39.2% |
| IRGACURE TPO-L (photoinitiator) | 1.0% |
| CN9893 (acrylate) | 4.9% |
| Total | 100% |

Preparative Example S21: Aliphatic Polyurethane Layer with 2% SR494

| Chemical | Wt % |
|---|---|
| Polyol 1 with Catalyst | 56.7% |
| Polyisocyanate 1 | 40.3% |
| IRGACURE TPO-L (photoinitiator) | 1.1% |
| SR494 (acrylate) | 2.0% |
| Total | 100% |

Preparative Example S22: Aliphatic Polyurethane Layer with 5% SR494

| Chemical | Wt % |
|---|---|
| Polyol 1 with Catalyst | 55.0% |
| Polyisocyanate 1 | 39.2% |

-continued

| Chemical | Wt % |
|---|---|
| IRGACURE TPO-L (photinitiator) | 0.9% |
| SR494 (acrylate) | 4.9% |
| Total | 100% |

Reference Example S6: Aliphatic Polyurethane Layer

| Chemical | Wt % |
|---|---|
| Polyol 1 with Catalyst | 58.0% |
| Polyisocyanate 1 | 42.0% |
| Total | 100% |

The test methods below were used to characterize examples S20-S22 and S6.

Static Fold Recovery 2.125"×4.0" samples of the protective films were placed into a test tube rack with spacing between the posts of 1 cm, thereby creating an effective bend radius of 5 mm. The samples were placed into a 60° C. temperature 93% relative humidity controlled chamber for 24 hrs and then removed from the rack and hung in a vertical position for 24 hours. The angle that the protective film samples unfolded to was then recorded with respect to a flat plane. 180 degrees means that the sample remained completely folded. 0 degrees means the sample completely unfolded back to a flat film.

Transmission/Haze/Clarity Testing

Luminous transmission, haze, and clarity using a BYK-Gardner Haze-Gard Plus model 4725 (available from BYK-Gardner Columbia, MD). Each result reported in Table 7 is the average of three measurements on a given sample.

Dynamic Mechanical Testing

The glass transition temperature of the energy dissipation coatings was characterized using Q800 DMA from TA Instruments. Samples were cut into strips 6.35 mm wide and about 4 cm long. The thickness of each film was measured. The films were mounted in the tensile grips of a Q800 DMA from TA Instruments with an initial grip separation between 16 mm and 19 mm. The samples were then tested at an oscillation of 0.2% strain and 1 Hz throughout a temperature ramp from −50° C. to 200° C. at a rate of 2° C. per minute. The onset of the glass transition was determined by location of peak for E". The temperature at which the Tan Delta signal reached a maximum was recorded as the peak Tan Delta temperature and is reported in Table 8.

Results and Discussion

As can be seen in Table 7, adding an acrylate did not significantly change the transmission, haze, or clarity of the native polyurethane films. In all cases where an acrylate was added the haze of the film actually showed a slight improvement and clarity remained similar or increased; in many applications of sensor protection films, low haze and high clarity/good film caliper is highly desirable. Additionally, it can be seen that the addition of the acrylates did not negatively affect static fold recovery; all films recovered completely demonstrating that the native Shape Memory behavior of the aliphatic polyurethane film is retained. Table 6 also shows that the addition of the acrylate and UV exposure allows control over the range of rheology modification or viscosity increase prior to thermal curing ranging from partial gelation to a completely gelation. This determination was made by exposing an open face sample of each material to the same UV exposure conditions and qualitative evaluation of the film following the UV exposure step by poking at the resulting exposed material.

Table 8 shows that addition of the acrylate did not significantly change the Tan Delta peak or the temperature at which this Tan Delta peak occurs. This further indicates that the acrylate modified polyurethane shape memory formulations allow for viscosity/rheology modification which can be used for improved manufacturing without degrading the shape memory and energy dampening properties of the urethane material.

TABLE 7

Summary of Results for Dual Cured Polyurethane Films

| Sample ID | Acrylate Added | Static Fold Recovery | T % | H % | C % | Gelled After UV? |
|---|---|---|---|---|---|---|
| Example S20 | 5% CN9893 | 0 | 90.7 | 1.17 | 97.3 | slight gel |
| Example S21 | 2% SR494 | 0 | 91.2 | 1.26 | 98.5 | some gel |
| Example S22 | 5% SR494 | 0 | 90.8 | 1.31 | 98.9 | gelled |
| Example S6 (comparative) | None | 0 | 90.7 | 2.24 | 98.5 | no |

TABLE 8

Summary of DMA Results for Energy Dissipation Films (no substrate)

| Sample ID | Acrylate Added | Peak Tan Delta | Temp Tan Delta Max (° C.) |
|---|---|---|---|
| Example S20 | 5% CN9893 | 1.54 | 43.3 |
| Example S21 | 2% SR494 | 1.41 | 44.5 |
| Example S22 | 5% SR494 | 1.24 | 40.0 |
| Example S6 (comparative) | None | 1.48 | 45.9 |

Examples 1-19 and Comparative Examples C1-C3

Example 1: 1.05 Index Shape Memory Polyurethanes with Nanostructured Surface

The shape memory polyurethane of example 1 was prepared in a roll to roll process where the isocyanate and polyol with catalyst were mixed using an inline dynamic mixer. The solution was applied to a moving web between two silicone release liners at an appropriate flow rate to achieve the desired final sample thickness of ~210 µm. The polyurethane coating between release liners was heated at 70° C. to cause reaction of the isocyanate and polyol components to produce a gelled/crosslinked polyurethane film between liners and wound into a roll. The film was postbaked at 70° C. for 24 hours to finish the chemical reaction. The sample had an NCO/OH ratio of 1.05. The relative ratio on a mass basis, NCO—OH ratio, theoretical gel content and theoretical crosslink concentration are shown in preparative substrate example S6 in Table 2 above. The NCO/OH ratio can be modified to produce a range of glass transition temperatures and moduli, as shown in Table 2.

The shape memory polyurethane sample, disposed between liners, was then processed using plasma processing techniques. General plasma processing techniques can be found in U.S. Pat. No. 5,888,594 (David et al.) and U.S. Pat. Appl. Pub. No. 2017/0067150 (David et al.). Plasma treatment was carried out by using a homebuilt plasma treatment system described in detail in U.S. Pat. No. 5,888,594 (David et al.) with some modifications. The width of the drum electrode was increased to 42.5 inches (108 cm) and the separation between the two compartments within the plasma system was removed so that all the pumping was carried out by means of the turbo-molecular pump and thus operating at a process pressure of around 1-50 mTorr.

A film sample of the shape memory coating had one of the two silicone release liners removed and the film was affixed to a polyester web mounted within the chamber using tape. The film was mounted such that the surface of the polyurethane was exposed to the atmosphere. The PET film was wrapped around the drum electrode and was secured to the take up roll on the opposite side of the drum. The unwind and take-up tensions were 8 and 14 lbs., respectively. The chamber door was closed and the chamber pumped down to a base pressure of $5 \times 10^{-4}$ torr. Once at pressure, multiple passes through the chamber were carried out by moving the substrates back and forth, enabling multiple treatments on the same samples. The film thickness was ~287 μm; 77 μm for the silicone release liner and ~210 μm for the polyurethane film. Specific plasma processing conditions are shown in Table 9 and results are presented in Tables 10A and 10B.

Examples 2-6: 1.05 Index Shape Memory Polyurethanes with Nanostructured Surfaces The shape memory polyurethane of examples 2-6 were prepared in a roll to roll process where the isocyanate and polyol with catalyst were mixed using an inline dynamic mixer. The solutions were applied to a moving web between two silicone release liners at an appropriate flow rate to achieve the desired final polyurethane sample thickness of ~143 μm. The polyurethane coatings between release liners were heated at 70° C. to cause reaction of the isocyanate and polyol components to produce a gelled/crosslinked polyurethane film between liners and wound into a roll. The films were postbaked at 70° C. for 24 hours prior to finish the chemical reaction. The samples all had an NCO/OH ratio of 1.05. The relative ratio for examples 2-6 on a mass basis, NCO—OH ratio, theoretical gel content and theoretical crosslink concentration are shown in Example S6 shown in Table 2 above. The NCO/OH ratio can be modified to produce a range of glass transition temperatures and moduli, as shown in Table 2.

The shape memory polyurethane samples between liners were then processed using plasma processing techniques as described in example 1.

The roll of film of the shape memory coating had one of the two silicone release liners removed and was mounted within the chamber such that the shape memory polyurethane surface was exposed to atmosphere, i.e. opposite the surface of the drum electrode. The film was wrapped around the drum electrode and was secured to the take up roll on the opposite side of the drum. The unwind and take-up tensions were 8 and 14 lbs., respectively. The chamber door was closed and the chamber pumped down to a base pressure of $5 \times 10^{-4}$ torr. Once at pressure, multiple passes through the chamber were carried out by moving the substrates back and forth, enabling multiple treatments on the same samples. The film thickness was ~196 μm; 52.5 μm for the silicone release liner and ~143 μm for the polyurethane film. Specific plasma processing conditions are shown in Table 9. Results are presented in Tables 10A and 10B.

Processing conditions similar to those of examples 1 to 6 applied to polymeric films is known to result in nanostructures having a diameter of roughly 10-100 nanometers, and a height of roughly 200-800 nanometers.

Comparative Example C1

A sample of Substrate Film S6 was provide as a comparative example and was measured with no plasma treatment. Data for film S6 is shown in Tables 10A and 10B under Example C1.

TABLE 9

Plasma Processing Conditions for Examples 1-6

| Ex. | Plasma Pass Number | Gas 1 | Gas 2 | Gas 1 Flow Rate (sccm) | Gas 2 Flow Rate (sccm) | Rf Power (watts) | Line Speed (ft/min) | Exposure Time (s) | Pressure (mTorr) |
|---|---|---|---|---|---|---|---|---|---|
| 1 | 1 | HMDSO | $O_2$ | 12 | 750 | 7500 | 2.5 | 120 | 7.6 |
|  | 2 | HMDSO | — | Open | — | 2000 | 30 | 11.25 | 9.3 |
| 2 | 1 | HMDSO | $O_2$ | 24 | 750 | 7500 | 2.5 | 120 | 8.1 |
| 3 | 1 | HMDSO | $O_2$ | 20 | 750 | 7500 | 2.5 | 120 | 8.2 |
| 4 | 1 | HMDSO | $O_2$ | 16 | 750 | 7500 | 2.5 | 120 | 8.1 |
| 5 | 1 | HMDSO | $O_2$ | 8 | 750 | 7500 | 1.25 | 240 | 8.2 |
|  | 2 | HMDSO | — | Open | — | 2000 | 30 | 11.25 | 7.5 |
| 6 | 1 | HMDSO | $O_2$ | 8 | 750 | 7500 | 2.5 | 120 | 6.3 |
|  | 2 | HMDSO | — | Open | — | 2000 | 30 | 11.25 | 7.5 |

TABLE 10A

Measured Properties for Examples 1-6

Contact Angle
(average of minimum of 3 measurements per sample)
*values rounded to nearest whole number

| Example | Thickness SMPU & Liner (μm) | Static Contact Angle ($\theta_{sta}$) | Does water droplet roll freely? | Advancing Contact Angle* ($\theta_{adv}$) | Receding Contact Angle* ($\theta_{rec}$) | Hysteresis ($\theta_{adv} - \theta_{rec}$) |
|---|---|---|---|---|---|---|
| 1 | 287 | 150.2 | yes | 159 | 141 | 18 |
| 2 | 196 | 149.7 | yes | 158 | 139 | 19 |
| 3 | 196 | 137.5 | no | 151 | 124 | 27 |
| 4 | 196 | 131.5 | no | 148 | 115 | 33 |
| 5 | 196 | 150.4 | yes | 157 | 143 | 14 |

TABLE 10A-continued

Measured Properties for Examples 1-6

| Example | Thickness SMPU & Liner (μm) | Static Contact Angle ($\theta_{sta}$) | Does water droplet roll freely? | Advancing Contact Angle* ($\theta_{adv}$) | Receding Contact Angle* ($\theta_{rec}$) | Hysteresis ($\theta_{adv} - \theta_{rec}$) |
|---|---|---|---|---|---|---|
| 6 | 196 | 151 | yes | 156 | 140 | 16 |
| C1 | 196 | 81.2 | no | 85 | <55 | >30 |

Contact Angle (average of minimum of 3 measurements per sample) *values rounded to nearest whole number

TABLE 10B

Measured Properties for Examples 1-6

Haze-Gard Plus Optical Measurements (avg of 3 measurements per sample)

| Example | Thickness SMPU & Liner (μm) | Transmission (%) | Haze (%) | Clarity (%) |
|---|---|---|---|---|
| 1 | 287 | 93.3 | 1.24 | 99.5 |
| 2 | 196 | 93.3 | 1.66 | 99.0 |
| 3 | 196 | 94.2 | 3.36 | 98.9 |
| 4 | 196 | 94.7 | 2.21 | 98.9 |
| 5 | 196 | 94.7 | 12.80 | 99.0 |
| 6 | 196 | 94.3 | 3.69 | 98.9 |
| C1 | 196 | 92.7 | 0.88 | 99.0 |

Example 7: Protective Film and Data

A hardcoat (HC) solution was made by mixing 1 gram of ESACURE ONE, 87.54 grams of HFPO-UA (10% HFPO, 30% solids), 64.78 grams of CN9010 in 97.16 grams of methyl ethyl ketone (Fisher scientific). The solution was stirred until all components were dissolved. The resulting solution was essentially homogeneous with a clear appearance. The hardcoat solution was applied to Thermoplastic Polyurethane Film 1 in a roll to roll process where the solution was metered through a slot die onto the moving web. Thickness was controlled by the use of a metering pump and a mass flow meter. The volatile components of the coating were dried in a three-zone air floatation zone oven (ovens temperatures set to 140° F., 160° F., 180° F.). The dried coating was cured with an in-line 600 W/in Fusion UV curing station with a dichroic reflector, H bulb, nitrogen inerting, at 100% Power and with backup roll temperature set to 110° F. The cured coating on Polyurethane Film 1 had a thickness of approximately 5p m and the film was wound into a roll.

The HC on Thermoplastic Polyurethane Film 1 was then processed using plasma processing techniques. General plasma processing techniques can be found in U.S. Pat. No. 5,888,594 (David et al.) and U.S. Pat. Appl. Pub. No. 2017/0067150 (David et al.). Plasma treatment was carried out by using a homebuilt plasma treatment system described in detail in U.S. Pat. No. 5,888,594 (David et al.) with some modifications. The width of the drum electrode was increased to 42.5 inches (108 cm) and the separation between the two compartments within the plasma system was removed so that all the pumping was carried out by means of the turbo-molecular pump and thus operating at a process pressure of around 1-50 mTorr.

The roll of HC on Thermoplastic Polyurethane Film 1 was mounted within the chamber such that the hardcoat (HC) surface was exposed to atmosphere; i.e., the HC surface was opposite the surface of the drum electrode. The film was wrapped around the drum electrode and was secured to the take up roll on the opposite side of the drum. The unwind and take-up tensions were 8 and 14 lbs., respectively. The chamber door was closed and the chamber pumped down to a base pressure of $5\times10^{-4}$ torr. Once at pressure, multiple passes through the chamber were carried out by moving the substrates back and forth, enabling multiple treatments on the same samples. The film thickness was ~230 μm; 52.5 μm for the silicone release liner, 50 μm for a PSA layer, 125 μm for polyurethane layer, and ~5 μm for the hardcoat layer. Specific plasma processing conditions are shown in Table 11.

TABLE 11

Plasma Processing Conditions for Example 7

| Example | Plasma Pass Number | Gas 1 | Gas 2 | Gas 1 Flow Rate (sccm) | Gas 2 Flow Rate (sccm) | Rf Power (watts) | Line Speed (ft/min) | Exposure Time (s) | Pressure (mTorr) |
|---|---|---|---|---|---|---|---|---|---|
| 7 | 1 | TMS | Ar | 80 | 500 | 600 | 37 | 8 | 6 |
|   | 2 |     | O$_2$ |    | 2000 | 2000 | 10 | 30 | PV |
|   | 3 |     | O$_2$ |    | 100 | 7500 | 2.5 | 120 | 3.1 |
|   | 4 | HMDSO | Open |  | 2000 | 2000 | 20 | 15 | 9 |
|   | 5 | TMS | O$_2$ | 500 | 2000 | 2000 | 30 | 11.25 | 35.8 |

After etching (plasma passes 1-3) and the application of a thin carbon containing silica layer (DLG layer, in plasma passes 4 and 5) for adhesion, a fluorosilane solution was prepared by mixing 7 grams ECC-1000, 418.8 g alpha, alpha, alpha-trifluorotoluene (Acros Organics, Morris Plains, N.J.), 70 g dry ethanol (200 proof from Koptec, King of Prussia, PA), and 4.2 grams of a 5 wt % solution of para-toluenesulfonic acid monohydrate (Alfa Aesar, Tewksbury, MA) in ethanol (200 proof from Koptec, King of Prussia, PA). The solution was applied to the above hardcoated/etched/DLG film in a roll to roll process where the solution was metered through a slot die onto the moving web. Thickness was controlled by the use of a syringe pump. The volatile components of the coating were dried in a two-zone oven (oven temperatures set to 200° F., 200° F.) to give a very thin coating over the nanostructured surface with an approximate overcoat thickness of from about 50 nm-90 nm. The film was wound into a roll. A protective liner/premask (Tredegar RS-011118-14) was applied individually to 3 ft cut sections of the film using a hand laminator. Data for the film is shown in Table 12. Additional data is shown in Table 20 and Table 21.

TABLE 12

Optical Measurements and Water Contact Angle Measurements

| Example | Transmission/ Haze/ Clarity (%) | Static Contact Angle (deg) | Advancing Contact Angle (deg) | Receding Contact Angle (deg) | Hysteresis (deg) | Water Droplet rolls freely? |
|---|---|---|---|---|---|---|
| 7 | 96.4/2.34/ 93.8 | >150 | 168 | 166 | 2 | Yes |

The protective film of example 7 was put into evaluation for in use performance testing. Rectangular samples of the film were applied to both the surface of a windshield of a Suburu Crosstrek and on the surface of the Font and Rear bumper of the same vehicle. The samples were applied on Feb. 3, 2019 in St. Paul, MN and remained on the vehicle unit until Mar. 10, 2019. The St. Paul, MN region experienced substantial snow and ice during this period (Weather and precipitation conditions for this timeframe can be found at the National Weather Service Forecast Office).

The car with film samples was driven in inclement weather and the film samples were subjected to daily driving conditions. During this time, the weather conditions included periods of snow and ice and sleet. The vehicle was subjected to all of these conditions as well as dirty and salt laden snow, ice and water from the road. In one specific instance the film sample mounted on the rear bumper of the vehicle was subjected to dirty, salt containing snow/ice/slush ejected from a snow plow. On the fourth day (February $6^{th}$), the film on the windshield of the vehicle was exposed to a period of 2 hours of sleet conditions. After the 2 hours of sleet the windshield was covered in a solid sheet of rough ice. The example film, however, was completely free of any ice accumulation and demonstrated anti-icing behavior. On the $6^{th}$ day (February $8^{th}$) on the vehicle the sample films on the Front and rear bumpers of the vehicle were inspected for dirt and salt accumulation. The native vehicle bumper was covered in a white film of salt, but the film sample was substantially free of any salt or dirt accumulation. On the $6^{th}$ day (February $8^{th}$) on the vehicle after 6 days of normal everyday driving under inclement weather conditions sample films on the Front and rear bumpers of the vehicle were inspected for dirt and salt accumulation in comparison to the native vehicle bumper onto which the film samples were applied. The native vehicle bumper was covered in a white film of salt, but the film samples were substantially free of any salt or dirt accumulation. On the 8th day (February $10^{th}$) the film on the rear bumper of the vehicle was subjected to a blast of snow ejected from the plow of a passing snow plow. The snow that hit the rear bumper of the car was wet and stuck the bumper in a large clump over the entire bumper. Upon touching the packed snow in the region of the rear bumper the snow over the area of the film sample fell off of the film and the film appeared free of any snow, while the rest of the bumper was still covered in snow. The vehicle with film samples was driven for another 20 days until March $10^{th}$ and the films samples were still substantially free of any dirt, ice, salt or other debris.

Example 8: Protective Film and Data

A conductive polymer solution was made by mixing 21.6 g of CLEVIOS P conductive polymer premix which is 40% in DI water (Heraeus, Hanau, Germany), 4.3 g Tomadol 25-9 premix, which is 60.6% in DI water (Evonik Industries, Essen, Germany), 4.3 g N-Methyl-2-Pyrrolidone (Sigma-Aldrich) and 1169.6 g DI water. The solution was stirred until all components were dissolved. The resulting solution was essentially homogeneous with a dark blue appearance. The conductive polymer solution was applied to Thermoplastic Polyurethane Film 1 in a roll to roll process where the solution was metered through a slot die onto the moving web. Thickness was controlled by the use of a metering pump and a mass flow meter. The volatile components of the coating were dried in a three-zone air floatation zone oven (ovens temperatures set to 160° F., 180° F., 200° F.). The Conductive coating had a thickness of approximately 18-20 nm film was wound into a roll.

Next, a hardcoat solution was made by mixing 1 gram of ESACURE ONE, 87.54 grams of HFPO-UA (10% HFPO, 30% solids), 64.78 grams of CN9010 in 97.16 grams of methyl ethyl ketone (Fisher scientific). The solution was stirred until all components were dissolved. The resulting solution was essentially homogeneous with a clear appearance. The hardcoat solution was applied to the conductive polymer layer in a roll to roll process where the solution was metered through a slot die onto the moving web. Thickness was controlled by the use of a metering pump and a mass flow meter. The volatile components of the coating were dried in a three-zone air floatation zone oven (ovens temperatures set to 140° F., 160° F., 180° F.). The dried coating was cured with an in-line 600 W/in Fusion UV curing station with a dichroic reflector, H bulb, nitrogen inerting, and with backup roll temperature set to 110° F. The cured coating had a thickness of approximately 5 µm and was wound into a roll.

The HC on Thermoplastic Polyurethane Film 1 was then processed using general plasma processing techniques as described previously.

The roll of HC on Thermoplastic Polyurethane Film 1 was mounted within the chamber such that the hardcoat (HC) surface was exposed to atmosphere; i.e., the HC surface was opposite the surface of the drum electrode. The film was wrapped around the drum electrode and was secured to the take up roll on the opposite side of the drum. The unwind and take-up tensions were 8 and 14 lbs., respectively. The chamber door was closed and the chamber pumped down to a base pressure of $5\times10^{-4}$ torr. Once at pressure, multiple passes through the chamber were carried out by moving the substrates back and forth, enabling multiple treatments on the same samples. The film thickness was ~230 µm; 52.5 µm for the silicone release liner, 50 µm for PSA layer, 125 µm for polyurethane layer, 18-20 nm conductive antistat layer and an ~5 µm hardcoat layer. Specific plasma processing conditions are shown in Table 13.

TABLE 13

Plasma Processing Conditions for Example 8

| Example | Plasma Pass Number | Gas 1 | Gas 2 | Gas 1 Flow Rate (sccm) | Gas 2 Flow Rate (sccm) | Rf Power (watts) | Line Speed (ft/min) | Exposure Time (s) | Pressure (mTorr) |
|---|---|---|---|---|---|---|---|---|---|
| 8 | 1 | TMS | Ar | 80 | 500 | 600 | 37 | 8 | 5.9 |
|   | 2 |   | $O_2$ |   | 100 | 7500 | 2.5 | 120 | 2.4 |
|   | 3 | HMDSO |   | Open |   | 2000 | 30 | 11.25 | 9 |
|   | 4 | TMS | $O_2$ | 500 | 2000 | 2000 | 30 | 11.25 | 35.7 |
|   | 5 |   | $O_2$ |   | 2000 | 2000 | 30 | 11.15 | 12.5 |

After etching and the application of a thin DLG layer for adhesion, a fluorosilane solution was prepared by mixing 7 grams ECC-1000, 418.8 g alpha, alpha, alpha-trifluorotoluene (Acros Organics, Morris Plains, N.J.), 70 g dry ethanol (200 proof from Koptec, King of Prussia, PA), and 4.2 grams of a 5 wt % solution of para-toluenesulfonic acid monohydrate (Alfa Aesar, Tewksbury, MA) in dry ethanol ((200 proof from Koptec, King of Prussia, PA). The solution was applied to the above hardcoated/etched/DLG film in a roll to roll process where the solution was metered through a slot die onto the moving web. Thickness was controlled by the use of a syringe pump. The volatile components of the coating were dried in a two-zone oven (oven temperatures set to 200° F., 200° F.). The dried and cured coating had a thickness of approximately 100 nm. A protective liner (Tredegar RS-011118-14) was applied individually to 3 ft cut sections of the film using a hand laminator. Data for the sample is shown in Table 20 and Table 21. The addition of the antistat layer to this construction resulted in improved resistance to pinning of water droplets on the surface of the film from fine misting water and the sample also demonstrated anti-icing behavior. Water droplets in contact angle measurement for the as made protective film roll off freely and water sprayed at the surface bounces off of the surface with no sticking of small water droplets.

Example 9: Protective Film and Data

An anti-static solution was made by mixing 1 gram of ESACURE ONE, 15.84 grams of POS-1 (Polymerizable Onium Salt 1), 23.76 grams of SR9035 in 120 grams of methyl ethyl ketone and 40 grams of isopropyl alcohol (Fisher scientific). The solution was stirred until all components were dissolved. The resulting solution was essentially homogeneous with a clear appearance. The anti-static solution was applied to Thermoplastic Polyurethane Film 1 in a roll to roll process where the solution was metered through a slot die onto the moving web. Thickness was controlled by the use of a metering pump and a mass flow meter. The volatile components of the coating were dried in a 3 zone air floatation zone oven (ovens temperatures set to 140° F., 160° F., 180° F.). The dried coating was cured with an in-line 600 W/in Fusion UV curing station with a dichroic reflector, H bulb, nitrogen inerting, and with backup roll temperature set to 110° F. The cured coating was approximately 5 μm thick and film was wound into a roll.

Next, a hardcoat solution was made by mixing 1 gram of ESACURE ONE, 87.54 grams of HFPO-UA (10% HFPO, 30% solids), 64.78 grams of CN9010 in 87.75 grams of methyl ethyl ketone (Fisher scientific) and 9.41 g of cyclopentanone. The solution was stirred until all components were dissolved. The resulting solution was essentially homogeneous with a clear appearance. The hardcoat solution was applied to the conductive polymer layer in a roll to roll process where the solution was metered through a slot die onto the moving web. Thickness was controlled by the use of a metering pump and a mass flow meter. The volatile components of the coating were dried in a three-zone air floatation zone oven (ovens temperatures set to 140° F., 160° F., 180° F.). The dried coating was cured with an in-line 600 W/in Fusion UV curing station with a dichroic reflector, H bulb, nitrogen inerting, and with backup roll temperature set to 110° F. The cured coating was approximately 5 μm thick and the film was wound into a roll.

The HC on Thermoplastic Polyurethane Film 1 was then processed using general plasma processing techniques as described previously.

The roll of HC on Thermoplastic Polyurethane Film 1 was mounted within the chamber such that the hardcoat (HC) surface was exposed to atmosphere; i.e., the HC surface was opposite the surface of the drum electrode. The film was wrapped around the drum electrode and was secured to the take up roll on the opposite side of the drum. The unwind and take-up tensions were 8 and 14 lbs., respectively. The chamber door was closed and the chamber pumped down to a base pressure of $5 \times 10^{-4}$ torr. Once at pressure, multiple passes through the chamber were carried out by moving the substrates back and forth, enabling multiple treatments on the same samples. The film thickness was ~238 μm; 52.5 μm for the silicone release liner, 50 μm for PSA layer, 125 μm for polyurethane layer, an ~5 μm antistat layer and an ~5 μm hardcoat layer. Specific plasma processing conditions are shown in Table 14.

TABLE 14

Plasma Processing Conditions for Example 9

| Example | Plasma Pass Number | Gas 1 | Gas 2 | Gas 1 Flow Rate (sccm) | Gas 2 Flow Rate (sccm) | Rf Power (watts) | Line Speed (ft/min) | Exposure Time (s) | Pressure (mTorr) |
|---|---|---|---|---|---|---|---|---|---|
| 9 | 1 | TMS | Ar | 80 | 500 | 600 | 37 | 8 | 5.9 |
|   | 2 |   | $O_2$ |   | 100 | 7500 | 2.5 | 120 | 2.4 |
|   | 3 | HMDSO |   | Open |   | 2000 | 30 | 11.25 | 9 |

TABLE 14-continued

Plasma Processing Conditions for Example 9

| Example | Plasma Pass Number | Gas 1 | Gas 2 | Gas 1 Flow Rate (sccm) | Gas 2 Flow Rate (sccm) | Rf Power (watts) | Line Speed (ft/min) | Exposure Time (s) | Pressure (mTorr) |
|---|---|---|---|---|---|---|---|---|---|
| | 4 | TMS | $O_2$ | 500 | 2000 | 2000 | 30 | 11.25 | 35.7 |
| | 5 | | $O_2$ | | 2000 | 2000 | 30 | 11.15 | 12.5 |

After etching and the application of a thin DLG layer for adhesion, a fluorosilane solution was prepared by mixing 7 grams ECC-1000, 418.8 g alpha, alpha, alpha-trifluorotoluene (Acros Organics, Morris Plains, N.J.), 70 g dry ethanol (200 proof from Koptec, King of Prussia, PA), and 4.2 grams of a 5 wt % solution of para-toluenesulfonic acid monohydrate (Alfa Aesar, Tewksbury, MA) in dry ethanol ((200 proof from Koptec, King of Prussia, PA). The solution was applied to the above hardcoated/etched/DLG film in a roll to roll process where the solution was metered through a slot die onto the moving web. Thickness was controlled by the use of a syringe pump. The volatile components of the coating were dried in a two-zone oven (oven temperatures set to 200° F., 200° F.). The dried and cured coating had a thickness of approximately 100 nm. A protective liner (Tredegar RS-011118-14) was applied individually to 3 ft cut sections of the film using a hand laminator. Data for the sample is shown in Table 20 and Table 21. The addition of the antistat layer to this construction resulted in improved resistance to pinning of water droplets on the surface of the film from fine misting water and the sample also demonstrated anti-icing behavior. Water droplets in contact angle measurement for the as made protective film roll off freely and water sprayed at the surface bounces off of the surface with no sticking of small water droplets.

dried coating was cured with an in-line 600 W/in Fusion UV curing station with a dichroic reflector, H bulb, nitrogen inerting, at 100% Power and with backup roll temperature set to 110° F. The cured coating on the Thermoplastic Polyurethane Film 1 had a thickness of ~5 µm and was wound into a roll.

The HC on Thermoplastic Polyurethane Film 1 was then processed using general plasma processing techniques as described previously.

The roll of HC on Thermoplastic Polyurethane Film 1 was mounted within the chamber such that the hardcoat (HC) surface was exposed to atmosphere; i.e., the HC surface was opposite the surface of the drum electrode. The film was wrapped around the drum electrode and was secured to the take up roll on the opposite side of the drum. The unwind and take-up tensions were 8 and 14 lbs., respectively. The chamber door was closed and the chamber pumped down to a base pressure of $5\times10^{-4}$ torr. Once at pressure, multiple passes through the chamber were carried out by moving the substrates back and forth, enabling multiple treatments on the same samples. The film thickness was ~230 µm; 52.5 µm for the silicone release liner, 50 µm for PSA layer, 125 µm for polyurethane layer, and ~5 µm for the hardcoat layer. Specific plasma processing conditions are shown in Table 15.

TABLE 15

Plasma Processing Conditions for Comparative Example C2

| Example | Plasma Pass Number | Gas 1 | Gas 2 | Gas 1 Flow Rate (sccm) | Gas 2 Flow Rate (sccm) | Rf Power (watts) | Line Speed (ft/min) | Exposure Time (s) | Pressure (mTorr) |
|---|---|---|---|---|---|---|---|---|---|
| C2 | 1 | TMS | Ar | 80 | 500 | 600 | 37 | 8 | 6 |
| | 2 | | $O_2$ | | 2000 | 2000 | 10 | 30 | 2.4 |
| | 3 | | $O_2$ | | 100 | 7500 | 2.5 | 120 | 3.1 |
| | 4 | HMDSO | | Open | | 2000 | 20 | 15 | 9 |
| | 5 | TMS | $O_2$ | 500 | 2000 | 2000 | 30 | 11.25 | 35.8 |

Comparative Example C2: Nanostructured/DLG Coated Polyurethane Film and Film Input for Examples 10-19

A hardcoat solution was made by mixing 1 gram of ESACURE ONE, 87.54 grams of HFPO-UA (10% HFPO, 30% solids), 64.78 grams of CN9010 in 97.16 grams of methyl ethyl ketone (Fisher scientific). The solution was stirred until all components were dissolved. The resulting solution was essentially homogeneous with a clear appearance. The hardcoat solution was applied to Thermoplastic Polyurethane Film 1 in a roll to roll process where the solution was metered through a slot die onto the moving web. Thickness was controlled by the use of a metering pump and a mass flow meter. The volatile components of the coating were dried in a three-zone air floatation zone oven (ovens temperatures set to 140° F., 160° F., 180° F.). The Comparative Example C2 resulted from etching plasma passes 1-3 and the application of a thin DLG layer (plasma passes 4 and 5). Data for C2 can be found in Table 20 and Table 21. This etched and DLG coated substrate was used as an input for making examples 10-19, where various fluorosilane coatings were applied to the Film to produce superomniphobic films.

Coating solutions were prepared by mixing various fluorinated trialkoxy silanes with solvents and catalyst. Each coating solution was mixed in a glass vial according to the amounts shown in Table 16. The vials were mixed using a vortex mixer (VWR, Radnor, PA), and coated the same day that the solutions were prepared.

TABLE 16

Fluorosilane Coating Solutions
Coating Solution Components

| Coating Solutions for examples | 85/15 TFT/ EtOH (g) | 90/10 EtOAc/ EtOH (g) | Heptane (g) | ECC-1000 (g) | C4TDMA (g) | TK-1791 (g) | 5% pTSA (g) |
|---|---|---|---|---|---|---|---|
| 10 | 9.94 | | | 0.05 | | | 0.012 |
| 11 | 9.88 | | | 0.1 | | | 0.02 |
| 12 | 9.81 | | | 0.16 | | | 0.03 |
| 13 | 9.88 | | | 0.23 | | | 0.05 |
| 14 | | | 9.85 | | 0.13 | | |
| 15 | | | 9.75 | | 0.21 | | |
| 16 | | | 9.66 | | 0.28 | | |
| 17 | | 19.71 | | | | 0.24 | 0.05 |
| 18 | | 19.53 | | | | 0.39 | 0.08 |
| 19 | 19.35 | | | | | 0.54 | 0.11 |

Examples 10-19: Fluorosilane Coatings on Comparative Example C2

Coatings were made with the above coating solutions 10-19 on the DLG coated nanostructured film C2 using a wire size 05 Mayer rod (0.0005" wet film thickness, from Diversified Enterprises, Claremont, NH) at variable solution concentrations. The films were heated at 80° C. for 5 minutes after coating. Additional details related to the coating solutions and estimated coating thicknesses are shown in Table 17. The densities of the silanes reported in Table 17 were measured by weighing 1 mL of silane liquid in a 10 mL volumetric cylinder. The densities of solvent mixtures were measured by weighing 10 mL of mixture in a 10 mL volumetric cylinder, and the pure solvent densities were taken from literature values.

TABLE 17

Additional details of coating solutions and estimate coating thickness

| Coating Solutions for Examples | Fluorosilane | Concentration (wt %) | Solvent Density | Silane Density (g/mL) | Est. Coating Thickness (nm) |
|---|---|---|---|---|---|
| 10 | ECC-1000 | 0.50% | 1.09 | 1.63 | 42 |
| 11 | ECC-1000 | 1.00% | 1.09 | 1.63 | 85 |
| 12 | ECC-1000 | 1.60% | 1.09 | 1.63 | 136 |
| 13 | ECC-1000 | 2.26% | 1.09 | 1.63 | 192 |
| 14 | C4TDMA | 1.30% | 0.68 | 1.2 | 94 |
| 15 | C4TDMA | 2.11% | 0.68 | 1.2 | 152 |
| 16 | C4TDMA | 2.82% | 0.68 | 1.2 | 203 |
| 17 | TK-1791 | 1.20% | 0.87 | 1.64 | 81 |
| 18 | TK-1791 | 1.95% | 0.87 | 1.64 | 131 |
| 19 | TK-1791 | 2.70% | 0.87 | 1.64 | 182 |

TABLE 18

Fluorochemical formulas with weight percent and atomic percent fluorine in fully condensed form

| Material | Expected formula of fully condensed silane | Est. Fluorine wt %/ atomic % condensed silane |
|---|---|---|
| ECC | $O_{3/2}Si(CH_2)_3NHCOCF_2(OCF_2CF_2)_{9.5}(OCF_2)_{9.5}OCF_2CONH(CH_2)_3SiO_{3/2}$ | 55% / 42.8% |
| TK-1791 | $C_3F_7O[CF(CF_3)CF_2O]_{5.6}CF(CF_3)C(O)NHCH_2CH_2CH_2SiO_{3/2}$ | 62% / 50.4% |
| C4TDMA | $O_{3/2}Si(CH_2)_2(CF_2)_3CF_3$ | 57% / 41.9% |

Comparative Example C3: Trimethylsilyl-Treated Superhydrophobic Nanostructured Polyurethane Film A hardcoat solution was made by mixing 1 gram of ESACURE ONE, 87.54 grams of HFPO-UA (10% HFPO, 30% solids), 64.78 grams of CN9010 in 97.16 grams of methyl ethyl ketone (Fisher scientific). The solution was stirred until all components were dissolved. The resulting solution was essentially homogeneous with a clear appearance. The hardcoat solution was applied to Thermoplastic Polyurethane Film 1 in a roll to roll process where the solution was metered through a slot die onto the moving web. Thickness was controlled by the use of a metering pump and a mass flow meter. The volatile components of the coating were dried in a three-zone air floatation zone oven (ovens temperatures set to 140° F., 160° F., 180° F.). The dried coating was cured with an in-line 600 W/in Fusion UV curing station with a dichroic reflector, H bulb, nitrogen inerting, at 100% Power and with backup roll temperature set to 110° F. The cured coating on the Thermoplastic Polyurethane Film 1 had a thickness of ~5 µm and was wound into a roll.

The HC on Thermoplastic Polyurethane Film 1 was then processed using general plasma processing techniques as described previously.

The roll of HC on Thermoplastic Polyurethane Film 1 was mounted within the chamber such that the hardcoat (HC) surface was exposed to atmosphere; i.e., the HC surface was opposite the surface of the drum electrode. The film was wrapped around the drum electrode and was secured to the take up roll on the opposite side of the drum. The unwind and take-up tensions were 8 and 14 lbs., respectively. The chamber door was closed and the chamber pumped down to a base pressure of $5 \times 10^{-4}$ torr. Once at pressure, multiple passes through the chamber were carried out by moving the substrates back and forth, enabling multiple treatments on the same samples. The film thickness was ~230 µm; 52.5 µm for the silicone release liner, 50 µm for PSA layer, 125 µm for polyurethane layer, and ~5 µm for the hardcoat layer. Specific plasma processing conditions are shown in Table 19.

TABLE 19

Plasma Processing Conditions for Comparative Example C3

| Example | Plasma Pass Number | Gas 1 | Gas 2 | Gas 1 Flow Rate (sccm) | Gas 2 Flow Rate (sccm) | Rf Power (watts) | Line Speed (ft/min) | Exposure Time (s) | Pressure (mTorr) |
|---|---|---|---|---|---|---|---|---|---|
| C3 | 1 | TMS | Ar | 80 | 500 | 600 | 37 | 8 | 6.9 |
|  | 2 |  | O$_2$ |  | 100 | 7500 | 2.5 | 120 | 2.8 |
|  | 3 | HMDSO |  | Open |  | 2000 | 20 | 15 | 10.0 |

Comparative Example C3 resulted from plasma passes 1-3 and produced a superhydrophobic film sample with trimethylsilyl-treated nanostructures. Data for C3 can be found in Table 20 and Table 21.

Test Methods for Examples 10-19 and Comparative Examples C2 and C3

For testing of film examples 10-19 and comparative examples C2 and C3 the film samples were affixed to glass slides. The glass slides were 2"×3"×1 mm glass microscope slides (VWR) and were cleaned with isopropyl alcohol and wiped clean with polynit cloths (PN-99, Contect, Spartanburg, SC) prior to use. The films were adhered to the slides by wetting the slide with water, detaching the backing from the adhesive side of the film, and placing the adhesive side to the wet glass slide. The backing was then placed over the front (superhydrophobic) side of the film, and then a rubber squeegee was swept over the film backing to press excess water out from between the film adhesive and the slide. Care was taken not to allow the backing to slide over the coated surface. Once the films had been adhered to the slides, the backing was removed, and the slides were allowed to stand overnight.

Transmittance and Haze Measurement Test Method

Transmission, haze and clarity were measured on the films of examples 7-19 mounted to the glass microscope slides using a BYK-Gardner Haze-Gard i (Columbia, MD). Films were measured with the glass side of the microscope slide facing the instrument orifice. Reported measurements were the average of three separate measurements on various parts of the slides. Samples with obvious optical defects in film preparation were not used in optical testing.

Fluid Contact Angle Test Method

For examples 1-6 and comparative example C1, an approximately 1.5"×3" (3.8 cm×7.6 cm) sections of the coatings described were cut with a scissors and affixed to a glass slide with double sided tape. Fluid contact angles of each film sample were measured using a Ramé-Hart goniometer (Ramé-Hart Instrument Co., Succasunna, New Jersey). Advancing ($\theta_{adv}$) and receding ($\theta_{rec}$) angles were measured as fluid was supplied via a syringe into or out of sessile droplets (drop volume about 5 µL). Measurements were taken at three different spots on each film sample surface, and the reported measurements are the averages of the six values for each sample (a left-side and right-side measurement for each drop). The probe fluid used in this test was deionized water. Contact Angle hysteresis ($\theta_{hys}$) was determined using the following equation: $\theta_{hys}=\theta_{adv}-\theta_{rec}$.

For examples 7-19 and Comparative examples C2 and C2 samples were mounted to a glass slide as described above in the Transmission and Haze section. A Model 500 advanced contact angle goniometer (Ramé-hart, Succasunna, NJ) was utilized for contact angle measurements. Advancing and receding contact angles were measured as described in Korhonen et. al (Langmuir, 2013, 29, 3858-3863).

The test fluids were deionized water or n-hexadecane.

Static Contact Angle Test

Static Contact Angle measurements were made on examples 1-6 and Comparative example C1. Measurements were made using as-received, reagent-grade, filtered deionized water on a Kruss video contact angle analyzer available as product number DSA 100S from Kruss GmbH (Hamburg, Germany). Static contact angle ($\theta_{sta}$) was measured as fluid was supplied via a syringe to the substrate with drop volumes of approximately 4-5 microliters for static water contact angle measurements. The film sample was brought into contact with the bottom of the drop of water; then, the syringe and film sample were separated causing the drop to be only in contact with the film sample. Once the drop was on the substrate, the contact angle was measured. Measurements were taken at two to three different spots on each film sample surface, and the reported measurements are the averages of the values for each sample. For some samples the water droplet rolled freely on the surface of the film.

Water Roll-Off Angle Test

A water-roll off angle test was performed on examples 7-19. A section of film was cut to approximately 75 mm×38 mm. A small amount of water was applied to a glass microscope slide (75 mm×38 mm×1 mm, VWR, Radnor, PA) and the film backing was removed, and the film was laid over the glass and allowing the film to adhere to the slide without touching the front (superhydrophobic) face. Excess water was removed with a paper towel (not touching the sample) and the sample was allowed to air dry. Once the slide and samples were adhered, they were attached with a binder clip to the stage of the goiniometer (Ramé-hart model 290-F4, Succasunna, NJ). A 14 microliters droplet was applied to the film and the tilt stage was rotated to 90 degrees, and the angle that the drop rolled out of the camera view was recorded. If the drop rolled off immediately, a value of 1 degree was recorded. The samples were abraded with a Taber 5900 reciprocating abraser using 4 layers of PN99 polynit wipe (Contec, Spartanburg SC) with a 1" diameter head, 2N normal force, 60 cycles/min for 10 cycles and the roll off angle was measured again.

Taber Abrasion Test and Spray Test Evaluation

The example films 7-19 and comparative example C3 mounted on glass slides were abraded using a Taber linear abrader Model 5750 (Taber Industries, North Tonawanda NY), using a 1" diameter circular abrading head, with a 1" diameter piece of foam (5 mm thick white polyurethane foam from Dance, Inc. Strongsville, OH) affixed by 2-sided tape. Another piece of double-sided tape was affixed the other side of the foam, and then an AATCC Crockmeter Standard Rubbing Cloth (Testfabrics, Inc., West Pittston, PA) was adhered to the foam. Abrasion was done using 10 cycles with a 350 g force, 60 cycles/min. Samples were evaluated for durability by looking at the optical haze of the samples using a water spray test and looking for differences in haze due to fine water droplets adhering to the film surface before and after abrasion.

The spray test was performed by spraying distilled water from a Prevail aerosol sprayer (Nakoma Products, Bridgeview, Illinois) at a distance of ~12" for 5 seconds at the coating side of the slide, which was held in a vertical orientation (i.e. so loose drops could fall off). The backside of the slide was dried with a paper towel, and transmission, haze, and clarity were measured starting at 30 seconds from the beginning of the spray with the dry backside of the slide facing the instrument orifaces. An average of 3 measurements were taken with the last measurement being no later than 90 seconds after the initial spray. The slide was in a vertical orientation throughout the testing. An increase in the haze measurement correlated with the presence of water droplets sticking to the surface of the film.

TABLE 20

Fluid Contact Angles for Example 7-19, C2 and C3; NM indicates not measured

| Film Examples | Fluorosilane overcoat | $\theta_{adv}$ water (deg) | $\theta_{rec}$ water (deg) | $\theta_{adv}$ Hexadecane (deg) | Water Roll-off Angle Initial (deg) | Water Roll-off Angle After Abrasion (deg) |
|---|---|---|---|---|---|---|
| C2 | NA | <30 | <30 | <30 | NM | NM |
| C3 | NA | 163 | 161 | <30 | NM | NM |
| 7 | ECC-1000 | 168 | 166 | 109 | NM | NM |
| 8 | ECC-1000 | 170 | 166 | 112 | NM | NM |
| 9 | ECC-1000 | 164 | 162 | 111 | NM | NM |
| 10 | ECC-1000 | 163 | 162 | 107 | 1 | 2 |
| 11 | ECC-1000 | 165 | 165 | 104 | 1 | 2 |
| 12 | ECC-1000 | 164 | 163 | 105 | 1 | 7 |
| 13 | ECC-1000 | 166 | 164 | 99 | 11 | 28 |
| 14 | C4TDMA | 156 | 153 | 112 | 5 | 16 |
| 15 | C4TDMA | 166 | 160 | 115 | 3 | 7 |
| 16 | C4TDMA | 161 | 158 | 112 | 2 | 4 |
| 17 | TK-1791 | 166 | 164 | 110 | 1 | 3 |
| 18 | TK-1791 | 165 | 165 | 107 | 4 | 14 |
| 19 | TK-1791 | 168 | 166 | 104 | 5 | 73 |

TABLE 21

Optical Data for Examples 7-19, C2, C3 and bare glass (Reference) and durability test results using spray test

| Film Examples | Fluorosilane overcoat | Initial Optical Properties | | | Spray test Results | |
|---|---|---|---|---|---|---|
| | | % T | % H | % C | % H before Abrasion | % H After Abrasion |
| Reference | NA | 93.9 | 0.14 | 100 | NM | NM |
| C2 | NA | 96.6 | 0.65 | 99.9 | NM | NM |
| C3 | NA | 96.7 | 0.55 | 99.9 | 1.04 | 41.2 |
| 7 | ECC-1000 | 96.4 | 2.34 | 93.8 | 3.00 | 3.2 |
| 8 | ECC-1000 | 95.6 | 0.71 | 99.1 | 0.89 | 6.4 |
| 9 | ECC-1000 | 96.4 | 1.49 | 99.1 | 1.58 | 6 |
| 10 | ECC-1000 | 96.5 | 0.58 | 99.9 | 0.8 | 1.96 |
| 11 | ECC-1000 | 96.5 | 0.73 | 99.9 | 2.6 | 4.8 |
| 12 | ECC-1000 | 96.4 | 0.78 | 99.9 | 0.96 | 2.7 |
| 13 | ECC-1000 | 96 | 1.25 | 99.8 | 1.27 | 8.8 |
| 14 | C4TDMA | 96.5 | 0.58 | 99.9 | 54.1 | 48.1 |
| 15 | C4TDMA | 96.5 | 0.64 | 99.9 | 7.11 | 17.3 |
| 16 | C4TDMA | 96.5 | 0.6 | 99.9 | 3.63 | 8.1 |
| 17 | TK-1791 | 96.3 | 0.74 | 99.9 | 62.5 | 5.5 |
| 18 | TK-1791 | 96.1 | 0.76 | 99.9 | 0.86 | 15.2 |
| 19 | TK-1791 | 95.7 | 0.89 | 99.9 | 0.87 | 28.9 |

From the data presented in Tables 19-21 and in use testing, it can be seen that the application of crosslinked highly fluorinated overcoats to the nanostructured surface produce films that demonstrate superomniphobicity and good durability in actual use and in abrasion testing, where samples show ability maintain omniphobicity and water repellency. This is in contrast to Comparative Examples C2 and C3, where the nanostructured film C2 does not exhibit superhydrophobic performance and for nanostructured film C3 which shows good superhydrophobicity, but not omniphobicity, and does not maintain water repellency when subjected to the abrasion test.

The nanostructured protective film constructions described in the above examples with highly fluorinated overcoats having constructions as described elsewhere herein may use any suitable polyurethane substrate. For example, the substrates described in the polyurethane substrate preparative examples S1-S22 may be used.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A nanostructured article comprising:
  a substrate;
  a plurality of first nanostructures disposed on, and extending away from, the substrate, the plurality of first nanostructures comprising polyurethane; and
  a covalently crosslinked fluorinated polymeric layer disposed on the plurality of first nanostructures and partially filling spaces between each pair of adjacent first nanostructures to an average minimum height above the substrate of at least 30 nm such that the polymeric layer comprises a nanostructured surface defined by, and facing away from, the plurality of first nanostructures,
  wherein the first nanostructures extend to an average height H1 from the substrate and have an average width W1, the nanostructured surface comprising a plurality of second nanostructures having an average peak-to-valley height H2 and an average width W2, H2<0.95 H1.

2. The nanostructured article of claim 1, wherein the plurality of first nanostructures extends away from the substrate along a length of the first nanostructures, the plurality of first nanostructures having an average length L1 and an average width W1, W1 being in a range of 5 nm to 500 nm, L1/W1 being at least 1.

3. The nanostructured article of claim 1, wherein the polyurethane comprises covalently crosslinked polyurethane having a crosslink concentration in a range from 0.3 to 1.05 mol/Kg.

4. The nanostructured article of claim 1, wherein H2/W2 is no more than 0.95 H1/W1.

5. The nanostructured article of claim 1, wherein the polymeric layer is preparable from a composition comprising a fluoropolymer comprising at least one hydrolysable terminal silane group.

6. The nanostructured article of claim 1, wherein the polymeric layer is preparable from a composition comprising a fluoropolymer comprising at least two trialkoxysilane terminal groups.

7. The nanostructured article of claim 1, wherein the nanostructured surface has an advancing water contact angle of at least 130 degrees.

8. The nanostructured article of claim 1, wherein the nanostructured surface has an advancing hexadecane contact angle of at least 70 degrees.

9. The nanostructured article of claim 1, wherein the nanostructured surface has an advancing water contact angle of at least 150 degrees and an advancing hexadecane contact angle of at least 90 degrees, and wherein the nanostructured article has an average optical transmittance of at least 90%, and an optical haze of less than 5%.

10. The nanostructured article of claim 1, wherein the substrate comprises first and second layers, the plurality of first nanostructures being integrally formed with the first layer, the second layer having an antistatic property such that the nanostructured article has a charge decay time of less than 1 second.

11. A system comprising the nanostructured article of claim 1 disposed proximate an electronic device configured to emit or receive energy.

12. A nanostructured article comprising:
a substrate; and
a plurality of first nanostructures disposed on the substrate, the plurality of first nanostructures comprising covalently crosslinked polyurethane having a crosslink concentration in a range from 0.3 to 1.05 mol/kg, the plurality of first nanostructures extending away from the substrate along a length of the first nanostructures, the plurality of first nanostructures having an average length L1 and an average width W1, W1 being in a range of 5 nm to 500 nm, L1/W1 being at least 1; and
a covalently crosslinked fluorinated polymeric layer disposed on the plurality of first nanostructures and at least partially filling spaces between the first nanostructures to an average minimum height above the substrate of at least 30 nm such that the polymeric layer comprises a nanostructured surface defined by, and facing away from, the plurality of first nanostructures,
wherein the nanostructured surface of the polymeric layer comprises a plurality of second nanostructures, each second nanostructure in at least a majority of the second nanostructures at least partially surrounding a plurality of the first nanostructures,
wherein the first nanostructures extend to an average height H1 from the substrate and the plurality of second nanostructures have an average peak-to-valley height H2, H2 being less than 0.7 H1.

13. A system comprising the nanostructured article of claim 12 disposed proximate an electronic device configured to emit or receive energy.

14. A nanostructured article comprising a polyurethane layer and a plurality of first nanostructures integrally formed on the polyurethane layer, the polyurethane layer comprising covalently crosslinked polyurethane having a crosslink concentration in a range from 0.3 to 1.05 mol/kg, the plurality of first nanostructures extending away from the polyurethane layer along a length of the first nanostructures, the plurality of first nanostructures having an average length L1 and an average width W1, W1 being in a range of 5 nm to 500 nm, L1/W1 being at least 1; and
a covalently crosslinked fluorinated polymeric layer disposed on the plurality of first nanostructures and at least partially filling spaces between the first nanostructures to an average minimum height above the substrate of at least 30 nm such that the polymeric layer comprises a nanostructured surface defined by, and facing away from, the plurality of first nanostructures,
wherein the nanostructured surface of the polymeric layer comprises a plurality of second nanostructures, each second nanostructure in at least a majority of the second nanostructures at least partially surrounding a plurality of the first nanostructures,
wherein the first nanostructures extend to an average height H1 from the substrate and the plurality of second nanostructures have an average peak-to-valley height H2, H2 being less than 0.7 H1.

15. A system comprising the nanostructured article of claim 14 disposed proximate an electronic device configured to emit or receive energy.

* * * * *